United States Patent
Tiefenthaler et al.

(10) Patent No.: US 12,497,434 B2
(45) Date of Patent: Dec. 16, 2025

(54) IL-37 FUSION PROTEINS AND USES THEREOF

(71) Applicants: Hoffmann-La Roche Inc., Little Falls, NJ (US); Monash University, Clayton (AU)

(72) Inventors: Georg Tiefenthaler, Penzberg (DE); Alexander Bujotzek, Penzberg (DE); Laurent Lariviere, Penzberg (DE); Felix Schumacher, Basel (CH); Andrew Ellisdon, Clayton (AU); Claudia Nold, Clayton (AU); Marcel Nold, Clayton (AU); James Whisstock, Clayton (AU)

(73) Assignees: Hoffmann-La Roche Inc., Little Falls, NJ (US); Monash University, Clayton (AU)

( * ) Notice: Subject to any disclaimer, the term of this patent is extended or adjusted under 35 U.S.C. 154(b) by 830 days.

(21) Appl. No.: 17/787,168

(22) PCT Filed: Dec. 18, 2020

(86) PCT No.: PCT/EP2020/087031
§ 371 (c)(1),
(2) Date: Jun. 17, 2022

(87) PCT Pub. No.: WO2021/123173
PCT Pub. Date: Jun. 24, 2021

(65) Prior Publication Data
US 2023/0192793 A1 Jun. 22, 2023

(30) Foreign Application Priority Data
Dec. 20, 2019 (EP) .................... 19218657

(51) Int. Cl.
*C07K 14/54* (2006.01)
*A61K 47/68* (2017.01)
*C12N 15/85* (2006.01)

(52) U.S. Cl.
CPC .......... *C07K 14/54* (2013.01); *A61K 47/6811* (2017.08); *C12N 15/85* (2013.01)

(58) Field of Classification Search
None
See application file for complete search history.

(56) References Cited

U.S. PATENT DOCUMENTS

| | | | |
|---|---|---|---|
| 7,112,660 B1 * | 9/2006 | Domingues | A61P 37/08 424/85.2 |
| 2003/0045474 A1 * | 3/2003 | Sailer | A61P 19/08 514/8.8 |
| 2014/0154743 A1 * | 6/2014 | Levy | C07K 16/00 435/69.6 |

FOREIGN PATENT DOCUMENTS

| | | |
|---|---|---|
| CN | 108948178 A | 12/2018 |
| WO | WO-2016/201503 A1 | 12/2016 |
| WO | WO-2018/175403 A1 | 9/2018 |

OTHER PUBLICATIONS

Tokuriki et al., 2009, Curr. Opin. Struc. Biol. 19:596-604.*
Fenton et al. (2020, Medicinal Chemistry Research 29:1133-1146).*
Bhattacharya et al. (2017, Plos One 12(3): e0171355, https://doi.org/10.1371/journal.pone.0171355).*
Alaoui-Ismaili (2009, Cytokine Growth Factor Rev. 20(5-6):501-7).*
Guo et al. (2004, PNAS USA 101(25):9205-10).*
Ulloa-Aguirre et al. (2004, Traffic 5:821-837).*
Bernier et al. (2004, Curr. Opin. Pharmacol. 4:528-533).*
Zhang et al. (2021, PNAS 118(1):e2009217118; https://doi.org/10.1073/pnas/2009217118; pp. 1-6; accessed May 29, 2025).*
Eisenmesser et al. (2019, PNAS 116(12):5514-5522).*
Bujotzek et al., "Protein engineering of a stable and potent anti-inflammatory IL-37-Fc fusion with enhanced therapeutic potential," Cell Chem Biol. 29(4):586-596.e4 (2022) (16 pages).
Dinarello et al., "Suppression of Innate Inflammation and Immunity by Interleukin Family Member Interleukin-37," available in PMC May 1, 2017, published in final edited form as: Eur J Immunol. 46(5):1067-81 (2016) (30 pages).
Eisenmesser et al., "Interleukin-37 monomer is the active form for reducing innate immunity," Proc Natl Acad Sci U S A. 116(12):5514-5522 (Feb. 28, 2019).
Ellisdon et al., "Homodimerization attenuates the anti-inflammatory activity of interleukin-37," Sci Immunol. 2(8): eaaj1548. DOI: 10.1126/sciimmunol.aaj1548 (2017) (13 pages).
Garlanda et al., "The Interleukin-1 Family: Back to the Future," Immunity. 39(6):1003-18 (2013).

(Continued)

*Primary Examiner* — Elizabeth C. Kemmerer
(74) *Attorney, Agent, or Firm* — Clark & Elbing LLP; Karen L. Elbing

(57) ABSTRACT

The present invention relates to polypeptides, particularly fusion protein variants comprising interleukin-37 (IL-37) and related therapeutics and compositions thereof. More particularly, the invention relates to fusion proteins comprising a mutant IL-37 polypeptide and an Fc region of an antibody. The biophysical stability such as thermal stability of said fusion proteins can be improved compared to a reference IL-37 construct, such as a wild-type IL-37 polypeptide or a mutant variant of an IL-37 polypeptide. It also relates to the fusion polypeptide variants and compositions for use in treating inflammatory diseases or conditions. In addition, the present invention relates to nucleic acid molecules encoding such fusion proteins, and vectors and host cells comprising such nucleic acid molecules.

16 Claims, 9 Drawing Sheets
Specification includes a Sequence Listing.

(56) References Cited

OTHER PUBLICATIONS

Li et al., "Role for nuclear interleukin-37 in the suppression of innate immunity," Proc Natl Acad Sci U S A. 116(10):4456-4461 (Feb. 21, 2019).
UniProt Database Accession No. A0A3Q7S6S4, uploaded Dec. 11, 2019 (1 page).
International Search Report for International Patent Application No. PCT/EP2020/087031, mailed Mar. 9, 2021 (6 pages).
Written Opinion for International Patent Application No. PCT/EP2020/087031, mailed Mar. 9, 2021 (6 pages).

* cited by examiner

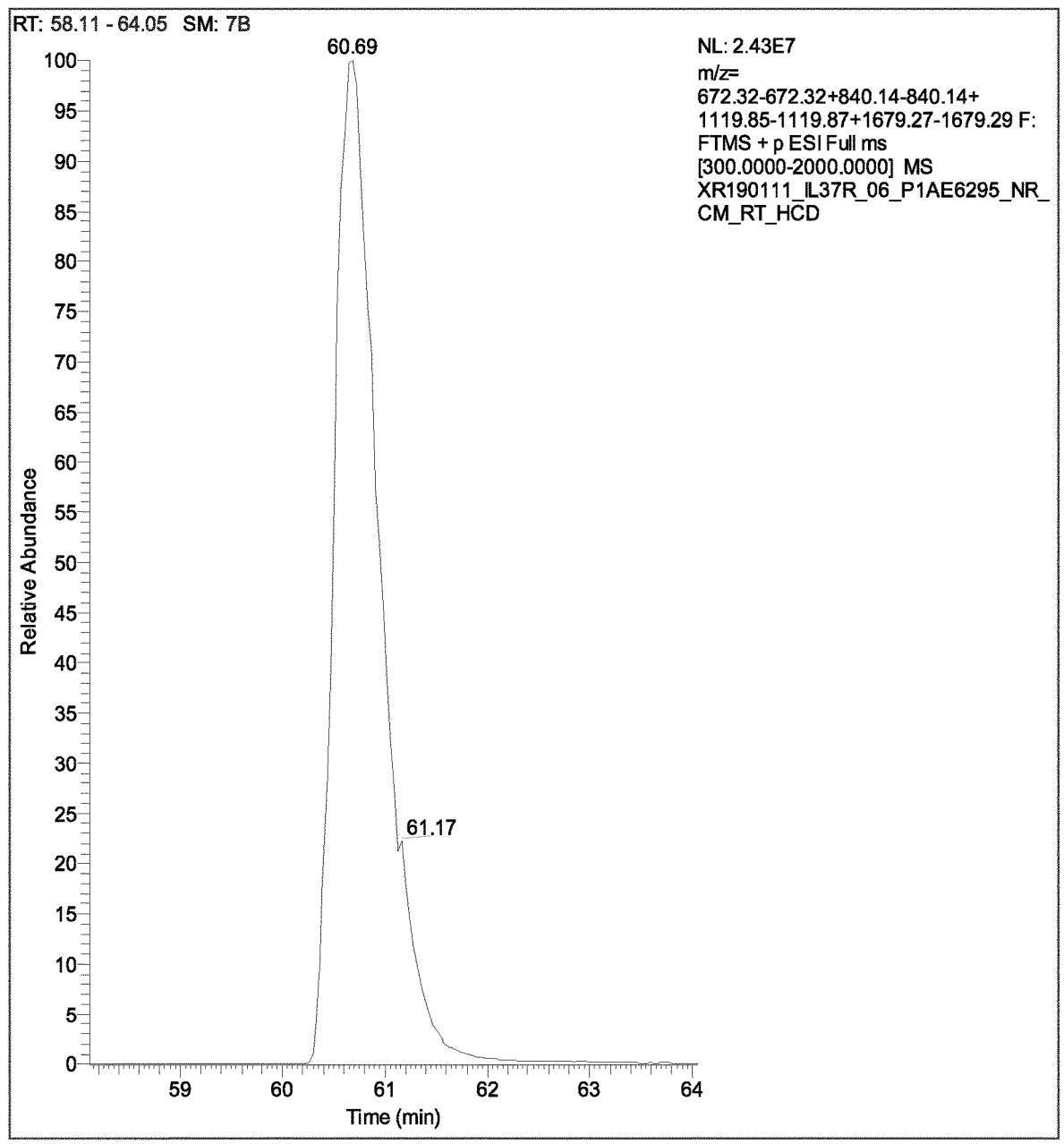
[Figure 1]

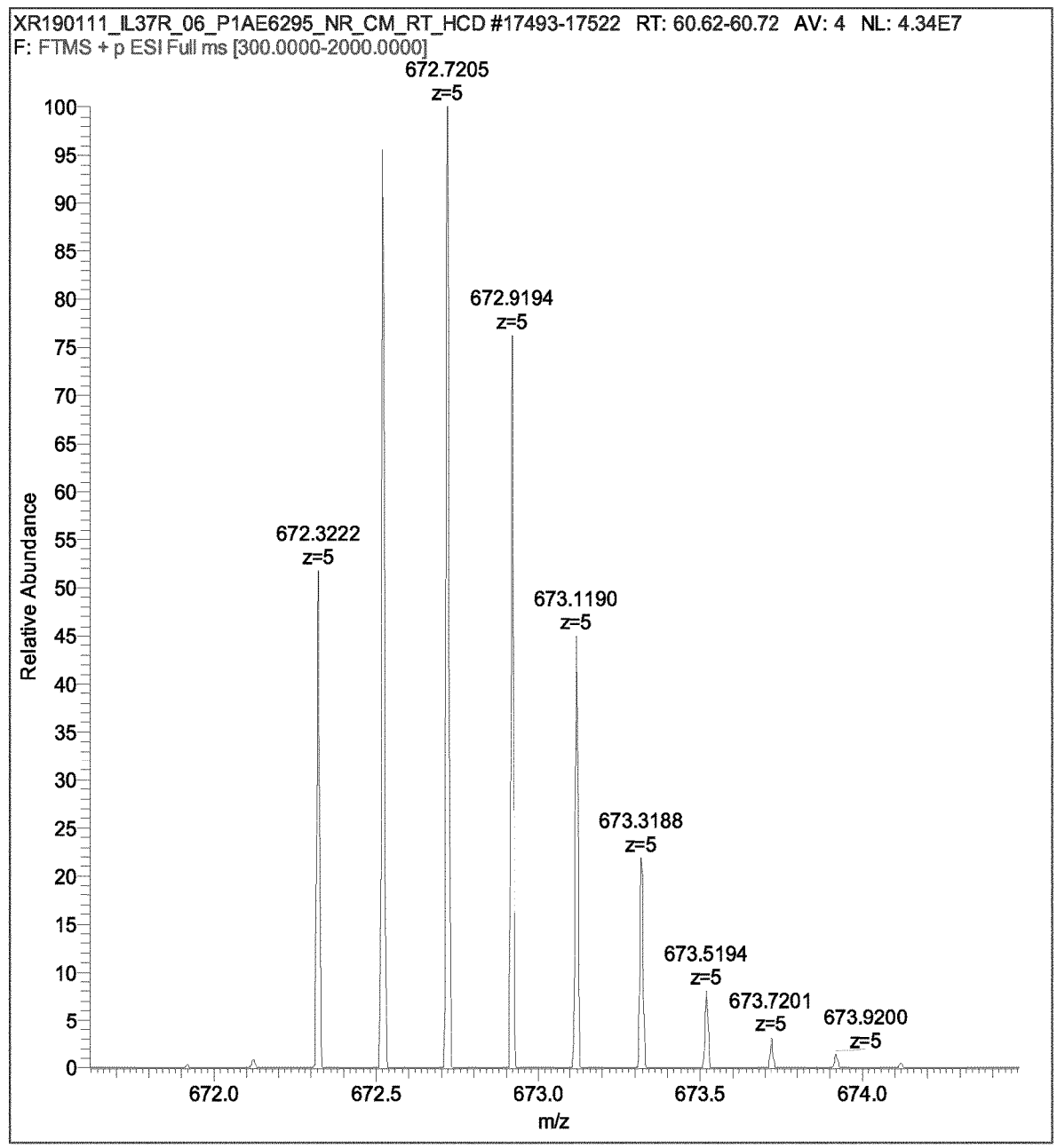
[Figure 2]

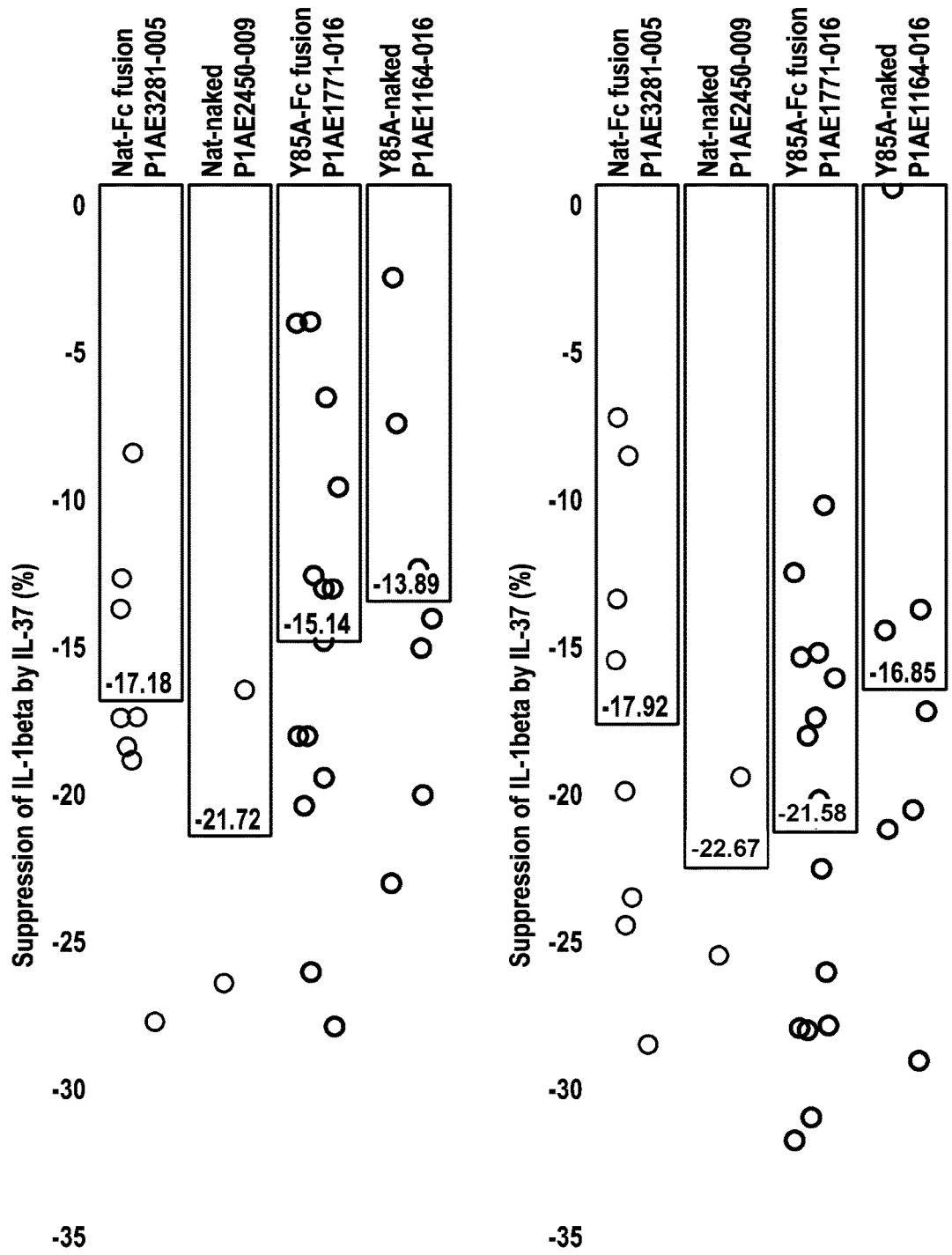
[Figure 3 part 1]

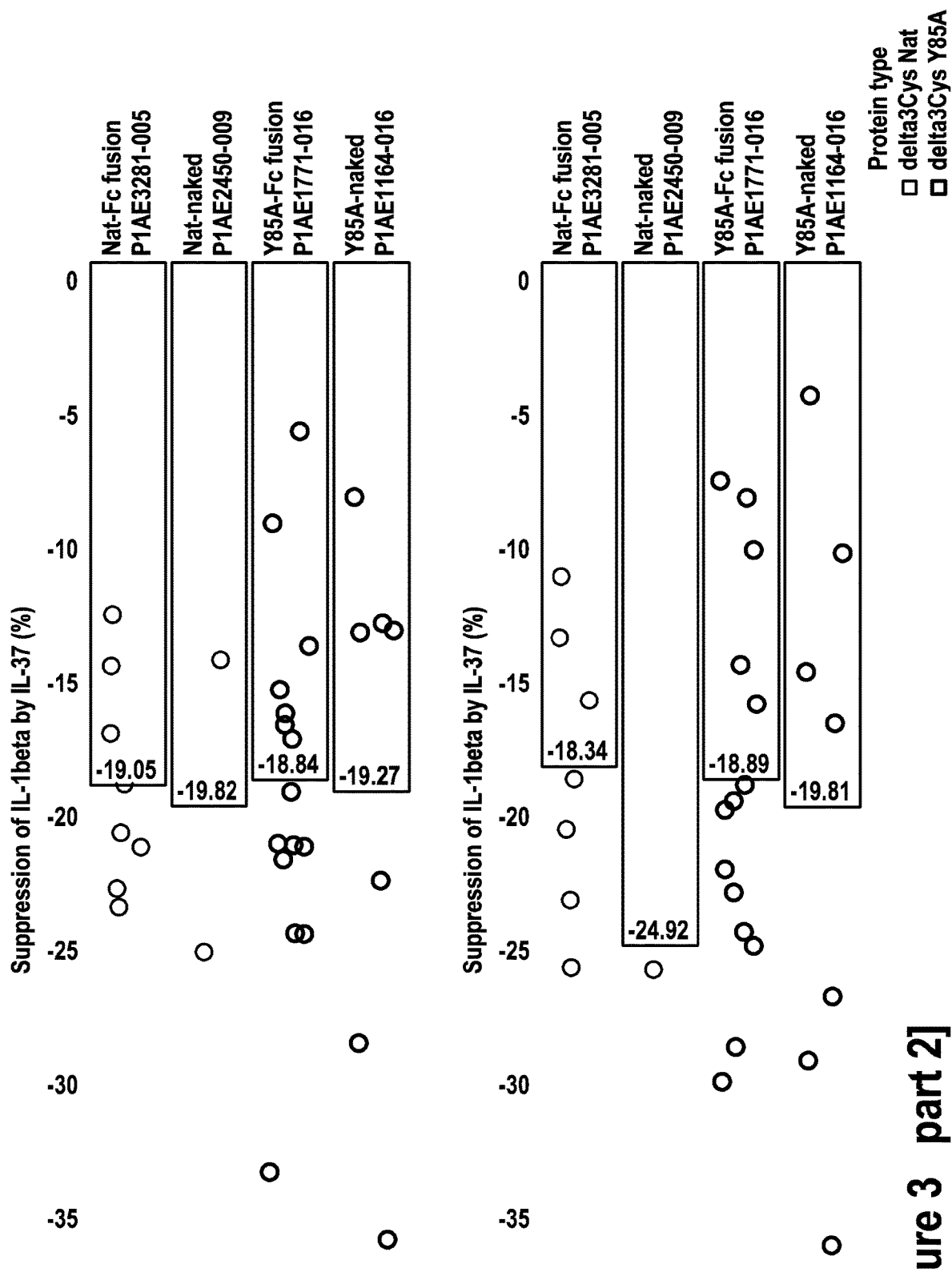
[Figure 3 part 2]

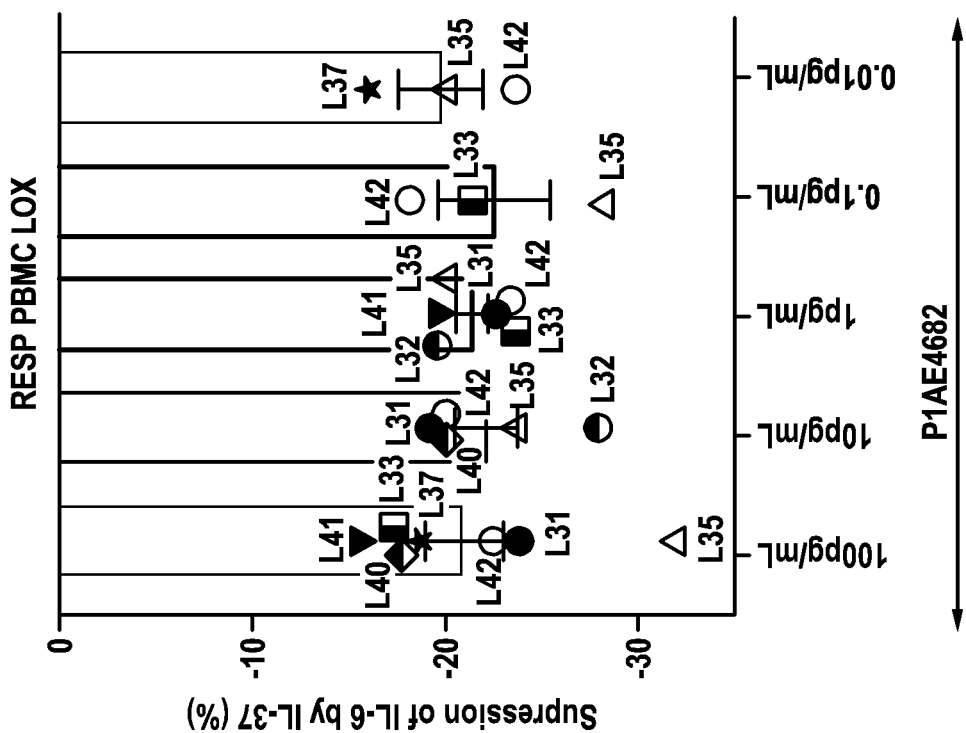
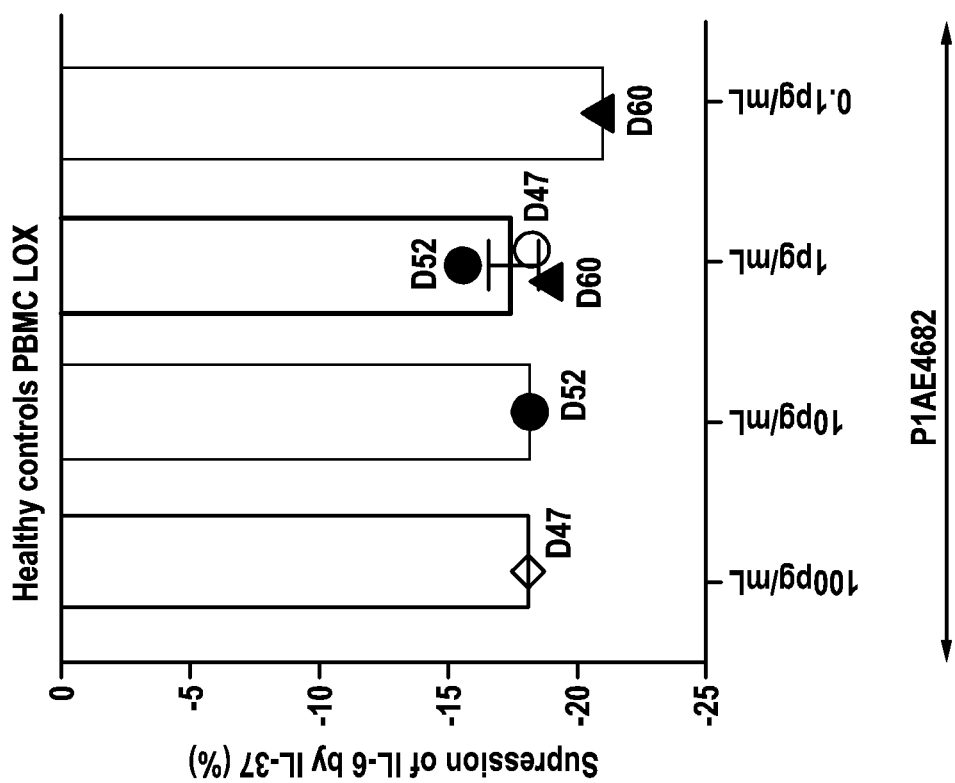
[Figure 4 part 1]

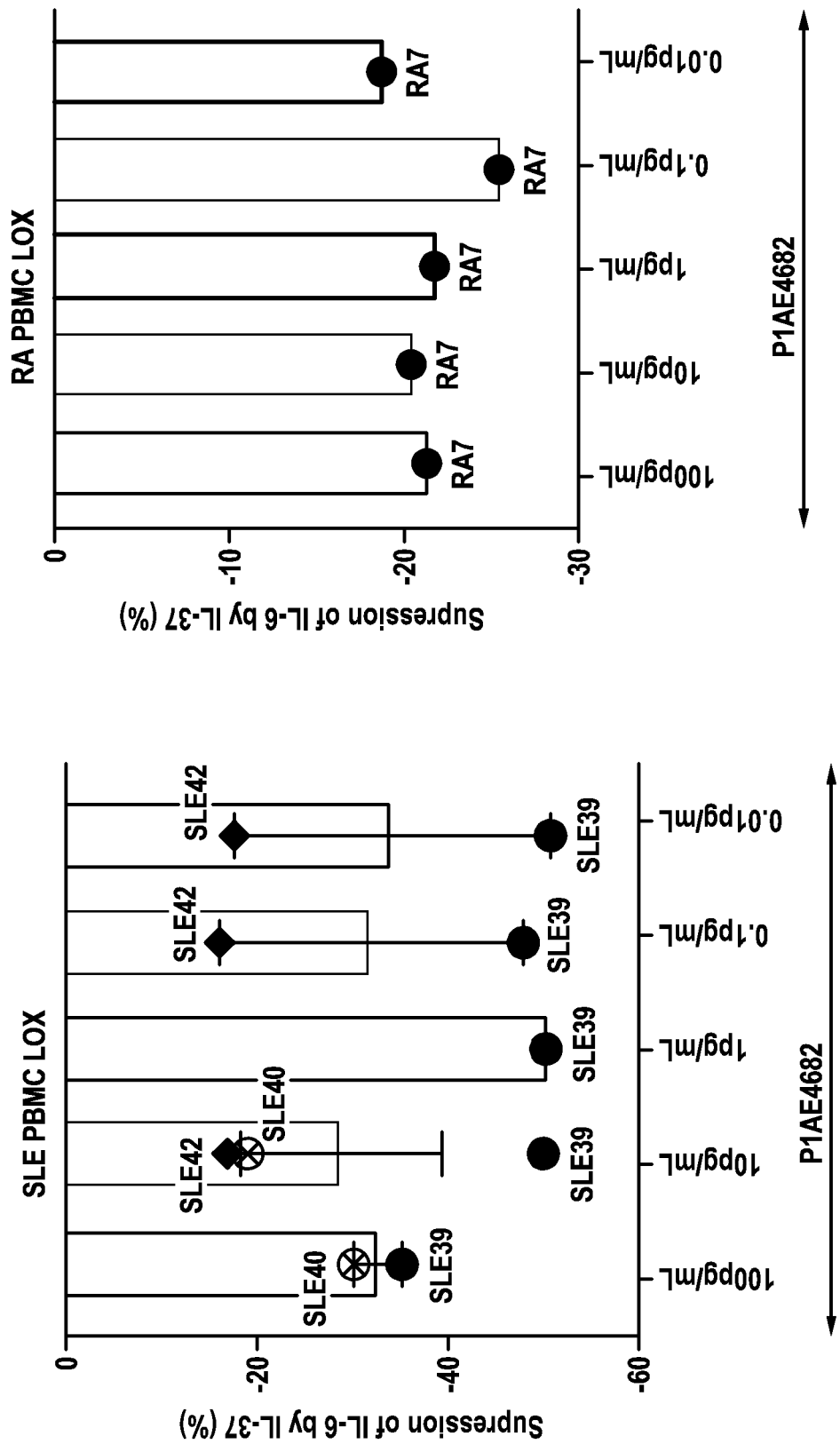
[Figure 4 part 2]

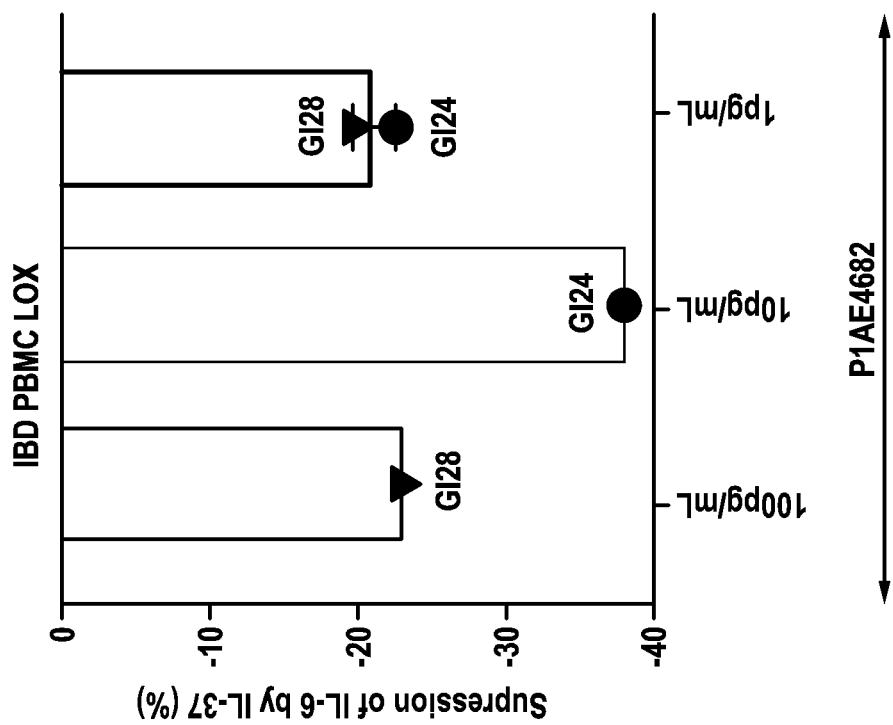
[Figure 4 part 3]

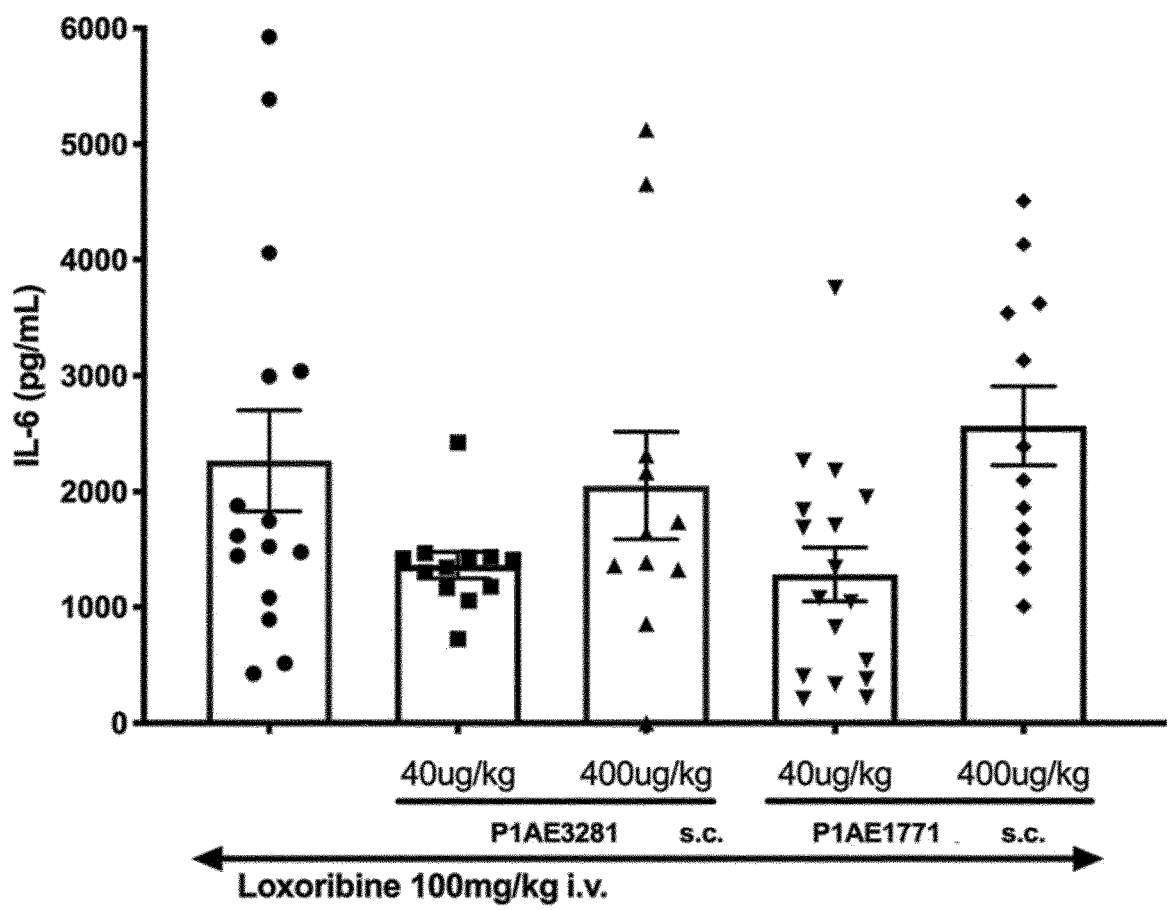
[Figure 5 A]

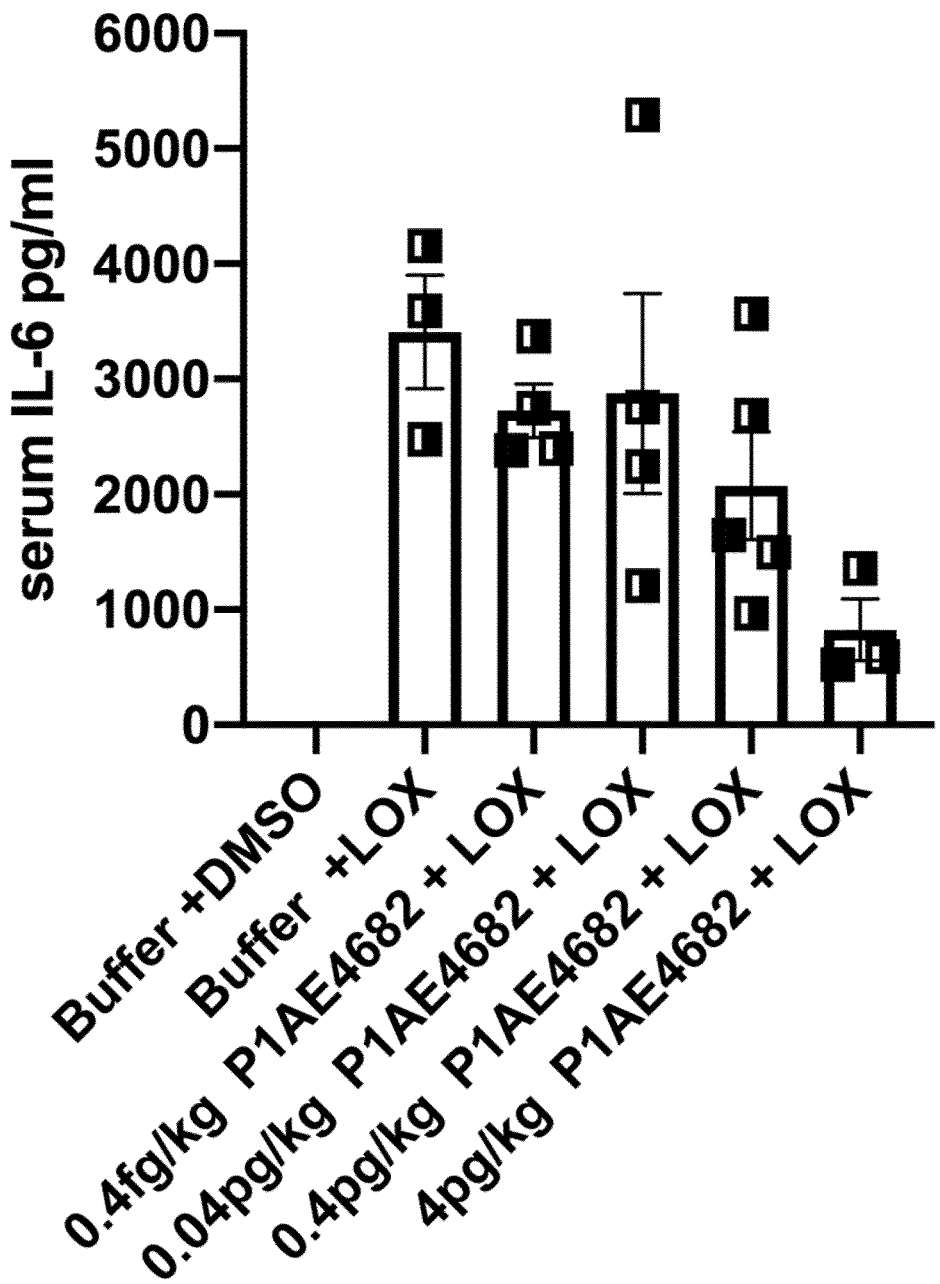
[Figure 5 B]

IL-37 FUSION PROTEINS AND USES THEREOF

SEQUENCE LISTING

The instant application contains a Sequence Listing which has been submitted electronically in ASCII format and is hereby incorporated by reference in its entirety. Said ASCII copy, created on Jun. 17, 2022, is named 51189-004001_Sequence_Listing_6_17_22_ST25 and is 114,408 bytes in size.

FIELD OF THE INVENTION

The present invention relates to polypeptides, particularly fusion protein variants comprising interleukin-37 (IL-37) and related therapeutics and compositions thereof. More particularly, the invention relates to fusion proteins comprising a mutant IL-37 polypeptide and an Fc region of an antibody. It also relates to the fusion polypeptide variants and compositions for use in treating inflammatory diseases or conditions. In addition, the present invention relates to nucleic acid molecules encoding such fusion proteins, and vectors and host cells comprising such nucleic acid molecules.

BACKGROUND OF THE INVENTION

The IL-1 family of cytokines has unique and broad anti-inflammatory effects in innate and adaptive immunity, e.g., as the first defense line against pathogenic microorganisms and physical damage/stress. So far, eleven IL-1 family members have been identified, including seven receptor agonists (IL-1α, IL-1β, IL-18, IL-33, IL-36α, IL-36β and IL-36γ), three ligands with antagonist activity (IL-1Ra, IL-36Ra and IL-38) and a quite newly renamed anti-inflammatory cytokine, IL-37 (Garlanda C, et al. Immunity. 2013 Dec. 12; 39(6):1003-18; Smith D E J Leukoc Biol. 2011 March; 89(3):383-92; Dinarello C A et al. Blood. 2011; 117:3720-3732v).

IL-37, originally known as IL-1 family member 7 (IL-1F7), is the seventh member of the IL-1 family discovered by computational cloning in 2000 and was renamed in 2010 (Dinarello C, et al. Nat Immunol. 2010 November; 11(11): 973). IL-37 possesses five different isoforms including IL-37a, IL-37b, IL-37c, IL-37d, and IL-37e (Boraschi D et al. Eur Cytokine Netw. 2011 September; 22(3):127-47; Tete S, et al. Int J Immunopathol Pharmacol. 2012 January-March; 25(1):31-8).

All IL-1 family members share a similar barrel structure and bind to Ig-like receptors. Human IL-37 gene is located on chromosome 2 with a length of 3,617 kb and includes six exons which encode a 17-26 KDa protein. IL-37 has a molecular weight of about 17~25 kDa. The structure of IL-37 consists of 12 tubular lines (Boraschi D et al. Eur Cytokine Netw. 2011 September; 22(3):127-47). The IL-37 gene undergoes alternative splicing; five different splice variants of IL-37 have been identified and termed IL-37a-e, of which IL-37b is the largest (218 amino acids) and best characterized isoform. Each isoform of the immature IL-37 precursor peptide is converted from an inactive precursor peptide state to an active state by the cleavage of caspase-1 during expression, and all subtypes regulate each other to form relatively stable state. For example, IL-37b has the largest molecular weight (218 amino acids), has the most complex biological functions and IL-37b transits from an inactive propeptide to an active mature under the action of caspase-1 (Boraschi D et al. Eur Cytokine Netw. 2011 September; 22(3):127-47; Busfield S. J., Comrack C. A., Yu G., et al. Genomics. 2000; 66(2):213-216). Specifically, the transcript variant encoded by IL-37b contains exons 1 and 2 and has an N-terminal prodomain, which includes a potential caspase-1 cleavage site, leading to the IL-37b precursor being spliced into mature IL-37b (Boraschi D, et al. Eur Cytokine Netw. 2011 September; 22(3):127-47; Ye L, Huang Z Oncotarget. 2015 Sep. 8; 6(26):21775-6). In addition, IL-37b also encodes exons 4-6 which contain the 12 putative β-strands necessary for forming the IL-1-like β-trefoil secondary structure (Boraschi D, et al. Eur Cytokine Netw. 2011 September; 22(3):127-47; Murzin A G, Lesk A M, Chothia C J Mol Biol. 1992 Jan. 20; 223(2):531-43).

Furthermore, IL-37 is detectable in a variety of normal cells and tissues, particular human tissues, including natural killer (NK) cells, stimulated B cells, monocytes, skin keratinocytes, epithelial cells, lymphnode, thymus, lung, colon, uterus and bone marrow, but the expression level is low in healthy human tissues (Nold M F et al. Nat Immunol. 2010 November; 11(11):1014-22; Boraschi D et al. Eur Cytokine Netw. 2011 September; 22(3):127-47). However, some IL-37 isoforms are expressed in a tissue specific manner. Brain only expresses IL-37a, kidney only IL-37b, heart only IL-37c, and bone marrow and testis only IL-37d. IL-37b was first discovered in bone marrow, and has also been found mainly in blood cells such as peripheral blood mononuclear cells (PBMCs), epithelial cells, dendritic cells, monocytes and keratinocytes, and the respiratory and gastrointestinal tracts (Chen et al. J. Trans. Med. 2015; Li Y, Wang Y, Liu Y, Wang Y, Zuo X, Li Y, Lu X Mediators Inflamm. 2014; 2014( ):136329). Further, IL-37 expression has been detected in human cell lines such as A431, THP-1, U937, IMTLH, KG-1, HL60, HPBMC, HFcolitis, PT-4, and NHDC (Gao W., et al. The Journal of Immunology. 2003; 170(1):107-113).

IL-37 is estimated to translocate to the nucleus and to redistribute between intracellular and extracellular sites, thereby affecting cellular responses (Li Y, Wang Y, Liu Y, Wang Y, Zuo X, Li Y, Lu X Mediators Inflamm. 2014; 2014 ( ) 136329).

Thus, IL-37 can be secreted outside to bind to surface receptor and, in addition, IL-37 can also be intracellularly secreted. In this connection, since it has been shown that IL-37 is expressed at low levels in human cells and tissues but upregulated by inflammatory stimuli and pro-cytokines including several toll-like receptor (TLR) agonists, IL-18, interferon (IFN)γ, IL-1b, transforming growth factor β1 and tumor necrosis factor (TNF), there is emerging evidence that IL-37 can play an anti-inflammatory effect through both intracellular and extracellular routes. For example, IL-37 may initiate signaling both at the cell membrane, through interaction with IL-18 receptor a and IL-1 R8 (Sigirr), and within the cell through interactions with Smad3. IL-18 is a proinflammatory cytokine that can induce the proliferation and differentiation of T cells, promote and maintain the secretion of IL-17 by Th17 cells, and promote Th17 cells-based cellular immune response. IL-37 can bind to IL-18Rα to form a complex with IL-18BP, a natural antagonist of IL-18, so as to enhance the inhibitory effect of IL-18BP on IL-18, thereby reducing the activity of IL-18 and the levels of Th1 cells, NK cells and IFN-γ (Kumar S., et al. Cytokine. 2002; 18(2):61-71; Moretti S. et al., PLOS Pathogens. 2014; 10(11); Nold M., et al., Biochemical Pharmacology. 2003; 66(3):505-510).

In view of the above, IL-37 has been demonstrated as a physiological suppressor of immune responses mediated by pro-inflammatory cytokines such as IL-1 β and TNF via their receptors, as well as Toll-Like Receptor ligands and has extensive protective roles in inflammation triggered by infection or other non-infectious assaults (Nold M F et al. Nat Immunol. 2010 November; 11(11):1014-22; Tete S, et al. Int J Immunopathol Pharmacol. 2012 January-March; 25(1):31-8). Thus, IL-37 can suppress innate immune response, possibly by reducing the production of proinflammatory cytokines induced by Toll-like receptor (TLR) agonists, e.g., IL-37 can reduce the production of proinflammatory cytokines such as IL-1α, IL-1β, IL-1Ra, IL-6, IL-8, IL-17, IL-23, TNF-α, and IFN-γ and chemokines such as MIP-2/CXCL2, CCL12/MCP-5, and BCA-1/CXCL13. It can also inhibit the expression of M-GSF and GM-CSF but increase the production of TGF-β1, which is realized as an immunosuppressive factor. Thus, in sum, IL-37 acts by binding to the IL-18 receptor and requires the IL-1 family decoy receptor IL-1R8 for its anti-inflammatory function. It has been shown that pro-inflammatory cytokines (TNF-α, IL-1α, IL-1β, IFN-γ) reduced by IL-37 could play pivotal roles in experimental autoimmune thyroiditis, multiple sclerosis, insulin-dependent diabetes mellitus or experimental autoimmune diabetogenesis, which may suggest the biological and potentially therapeutic relevance of IL-37 to these diseases (Li S, et al.; Proc Natl Acad Sci USA; 2015; pp. 2497-2502). Hence, IL-37 has been investigated as a natural inhibitor of immune responses in chronic inflammatory and autoimmune disorders and also in cancer. In this regard, it has been demonstrated that IL-37 is expressed and exerts anti-inflammatory effects in a variety of diseases including melanoma, rheumatoid arthritis, acute coronary syndrome, morbid obesity, contact hypersensitivity, atopic dermatitis, liver inflammatory injury, systemic lupus erythematosus (SLE) and IBD, among others (Li Y, Wang Z, Yu T, Chen B, Zhang J, Huang K, Huang Z PLOS One. 2014; 9(9): e107183). In vitro, IL-37 has been demonstrated to effectively abrogate the expressions of pro-inflammatory cytokines in several cell types, including PBMCs. In vivo, IL-37 reduced the inflammatory responses and clinical symptoms of cerebral ischemia, myocardial ischaemia/reperfusion injury, psoriasis, and asthma in mouse models (Chen et al. J. Trans. Med. 2015). In conclusion, these data suggest complicated biological functions of IL-37 in different diseases, wherein IL-37 expression in autoimmune diseases seems to decrease excessive inflammatory immune responses.

Further, IL-37 plays a role in protecting the body against endotoxin shock, ischemia-reperfusion injury, and cardiovascular diseases. In addition, IL-37 has a potential antitumor effect. Thus, IL-37 may serve as a target for the study, diagnosis, and treatment of tumors. In this context, IL-37 showed antitumor effects in mouse model of non-small-cell lung cancer (Ge G., Wang A., Yang J., et al. Journal of Experimental & Clinical Cancer Research. 2016; 35). Compared with control group, transfected mice stably expressing IL-37 showed significantly reduced tumor growth rate, microvessel density, and expression levels of VGEF and CD34, and IL-37 treatment also significantly inhibited the growth and angiogenesis of human umbilical vein endothelial cells (HUVECs). It is speculated that IL-37 may inhibit tumor angiogenesis and thus play a role in tumor suppression. IL-37 also showed inhibitory effect on tumor cells in renal cell carcinoma and cervical cancer (Jiang Y, et al. Med Oncol. 2015 November; 32(11):250; Wang S., An W., Yao Y., et al. Journal of Cancer. 2015; 6(10):962-969). Those studies showed that IL-37 can inhibit tumor cell migration, proliferation, and induce cell apoptosis possibly by inhibiting STAT3 expression and phosphorylation.

In summary, as a new anti-inflammatory inhibitor, IL-37 plays important roles in immune responses, protects from inflammatory and autoimmune diseases so that this cytokine may emerge as a new target for diagnosis and therapy of cancer, inflammatory and autoimmune diseases.

SUMMARY OF THE INVENTION

The inventors developed novel IL-37 fusion proteins comprising mutant IL-37 polypeptide and an Fc region of an antibody. Further, the inventors surprisingly found that said IL-37 fusion proteins, wherein the amino acid sequence of the IL-37 polypeptide comprises an amino acid residue selected from the group consisting of serine, threonine, glycine, alanine, glutamine and asparagine, preferably a serine, at amino acid position 181; an amino acid residue selected from the group consisting of serine, threonine, glycine, alanine, glutamine and asparagine, preferably a serine, at amino acid position 183; and an amino acid residue selected from the group consisting of serine, threonine, glycine, alanine, glutamine and asparagine, preferably a serine, at amino acid position 207, can be produced. Preferably, the amino acid sequence of the IL-37 polypeptide comprises a serine residue at amino acid positions 181, 183 and 207. Said IL-37 fusion proteins may be stably expressed in mammalian cell lines, such as HEK293 cells, and may be produced at high product yield. For example, the amino acid sequence of said IL-37 fusion protein may comprise amino acids 46 to 218. Additionally, the fusion proteins as described herein and as illustrated in the appended Examples have improved properties, such as increased anti-inflammatory activity compared to wild-type IL-37 and/or known mutated variants of IL-37 polypeptides. As another example, the fusion proteins as described herein have the capacity to be produced at higher product yield while maintaining the potency of known IL-37 constructs, such as a wild-type IL-37 and/or known mutated variants of IL-37 polypeptides. Such a potency may include the anti-inflammatory activity and/or the biophysical stability such as the thermal stability as compared to a reference IL-37 polypeptide, such as the wild-type IL-37 or known mutated variants of IL-37 polypeptides. Reference IL-37 constructs and/or polypeptides as described herein and known in the art may include but are not limited to those described in WO2016/201503 and WO2018/175403. Particularly, these reference IL-37 constructs and/or polypeptides may comprise mutant variants or wild-type polypeptides and/or constructs, such as fusion constructs.

Particularly, the inventors found that the fusion proteins as described herein can induce an anti-inflammatory response in subjects in need thereof, such as a patient having an inflammatory disease or condition. In other words, the fusion proteins as described herein can induce an anti-inflammatory response sufficient to treat a subject in need thereof, such as a patient having an inflammatory disease or condition. They further found that said fusion proteins can be produced in high yield compared to proteins comprising IL-37, such as wild-type IL-37 polypeptide. Hence, the fusion proteins as described herein can be used as therapeutic treatment of a disease, such as an inflammatory disease or condition, and be produced in high yield. For example, a higher product yield of the fusion protein of the present invention can be achieved compared to the product yield of known proteins comprising IL-37, such as a wild-type IL-37 polypeptide.

Thus, the present invention relates to a fusion protein comprising an IL-37 polypeptide and an Fc region of an antibody, wherein the amino acid sequence of the IL-37 polypeptide comprises an amino acid residue selected from the group consisting of serine, threonine, glycine, alanine, glutamine and asparagine, preferably serine, at amino acid position 181; an amino acid residue selected from the group consisting of serine, threonine, glycine, alanine, glutamine and asparagine, preferably serine, at amino acid position 183; and an amino acid residue selected from the group consisting of serine, threonine, glycine, alanine, glutamine and asparagine, preferably serine, at amino acid position 207.

Preferably, the fusion protein comprises a serine at amino acid positions 181, 183 and 207.

Preferably, the fusion protein is an anti-inflammatory fusion protein.

Preferably, the IL-37 polypeptide of the fusion protein is isoform A or isoform B, more preferably isoform B.

Preferably, the amino acid sequence of the IL-37 polypeptide of the fusion protein comprises amino acids 46 to 218.

Preferably, the IL-37 polypeptide of the fusion protein has a sequence identity of at least 86%, 87%, 88%, 89%, 90%, 91%, 92%, 93% or 94%, preferably of at least 95%, 96%, 97% or 98%, more preferably of at least 95% or 96%, even more preferably of at least 96% with SEQ ID NO. 1.

Preferably, the IL-37 polypeptide of the fusion protein further comprises an additional disulfide bridge compared to the wild-type IL-37 polypeptide. More preferably, the additional disulfide bridge of the fusion proteins is formed between two cysteines of the IL-37 polypeptide and wherein one of said cysteines is a substitution mutation with cysteine, preferably at position 169.

Preferably, the Fc region of the antibody of the fusion protein is an Fc region of an IgG, more preferably IgG1.

Preferably, the IL-37 polypeptide of the fusion protein is fused at the C-terminus to the Fc region. Alternatively, the IL-37 polypeptide of the fusion protein is fused via a linker at the C-terminus to the Fc region.

Preferably, the Fc region of the fusion protein comprises two heavy chain fragments, more preferably the CH2 and CH3 domains of said heavy chain.

Preferably, the IL-37 polypeptide of the fusion protein further comprises an isoleucine at amino acid position 119 and/or an amino acid selected from the group consisting of threonine, alanine, tyrosine, lysine, phenylalanine, histidine and glycine at amino acid position 178.

Preferably, wherein the IL-37 polypeptide of the fusion protein does not comprise a mutation at any of amino acids located at position 71 to 74, 78, 80, 83 to 88 and 184. Alternatively, the IL-37 polypeptide of the fusion protein comprises a mutation at one or more amino acid(s) located at the amino acid position selected from the group of position 71 to 74, 78, 80, 83 to 88 and 184.

Preferably, the amino acid sequence of the IL-37 polypeptide of the fusion protein comprises an alanine located at amino acid position 85.

The invention further relates to a pharmaceutical composition comprising the fusion protein.

Preferably, the fusion protein or the pharmaceutical composition comprising the fusion protein further comprises a pharmaceutically acceptable diluent, excipient or carrier.

Preferably the fusion protein or the pharmaceutical composition comprising the fusion protein is for use in treating or preventing an inflammatory disease or condition. More preferably, the inflammatory disease or condition is selected from the group consisting of inflammatory bowel disease; lupus erythematosus; arthritis; preferably rheumatoid arthritis; psoriasis, allergic rhinitis; Grave's disease; ankylosing spondylitis; ischemia-reperfusion injury, preferably selected from the groups consisting of myocardial infarction and stroke; asthma; periodontal inflammation; diabetes and metabolic syndrome; cancer, preferably solid cancer types and atherosclerosis and Behcet's disease. Even more preferably, the inflammatory disease or condition is inflammatory bowel disease.

The invention further relates to a nucleic acid molecule, a vector and a cell comprising the nucleic acid molecule encoding the fusion protein.

Equally, the invention relates to a method for treating or preventing an inflammatory disease or condition in a patient comprising administering to the patient a therapeutically effective amount of the fusion protein, or a pharmaceutical composition comprising the fusion protein.

DETAILED DESCRIPTION OF THE INVENTION

It will be understood that the invention disclosed and defined herein extends to all alternative combinations of two or more of the individual features mentioned or evident from the text or drawings. All of these different combinations constitute various alternative aspects of the invention. All patents and publications referred to herein are incorporated by reference in their entirety.

As used herein, the singular forms "a", "an," and "the" include plural referents unless the context clearly dictates otherwise. Throughout this specification and claims, the word "comprise," or variations such as "comprises" or "comprising" will be understood to imply the inclusion of a stated integer or group of integers but not the exclusion of any other integer or group of integers.

The peculiarity of this invention compared to former approaches for producing IL-37 fusion proteins is the effect of minor modifications to the IL-37 polypeptide which results in IL-37 fusion proteins with improved properties. For example, the fusion protein as described in the following may exhibit increased anti-inflammatory activity compared to wild-type IL-37 (i.e. naturally occurring or endogenously expressed IL-37). Additionally, the fusion protein of the present invention may be produced at higher yield compared to wild-type IL-37 (i.e. naturally occurring or endogenously expressed IL-37). Particularly, the fusion protein of the present invention may be produced at higher yield while maintaining at least the anti-inflammatory activity of a wild-type IL-37. In other words, the fusion protein of the present invention may be a protein that has at least one biochemical or biophysical activity of wild-type IL-37, for example, it can bind to, and may be a ligand for interleukin 18 receptor (IL-18R1/IL-1Rrp). It may also bind to interleukin 18 binding protein (IL-18BP), an inhibitory binding protein of interleukin 18 (IL-18), and subsequently form a complex with the IL-18 receptor beta chain, and through which it may inhibit the activity of IL-18. Other biochemical or biophysical activities of IL-37 include binding to IL-1 R8 (Sigirr), blocking the production of pro-, but not anti-inflammatory, cytokines triggered by a broad spectrum of inflammatory assaults including TLR ligands, IFNγ, TNF and IL-1 β in human or murine immune cells, inhibition of the activation of dendritic cells (reduction of surface expression of CD86 and MHC II), triggering a specific pattern of regulation of intracellular kinases including blockade of the mTOR, MAPK and NF-κB pathways, and induction of anti-inflammatory kinases such as Mer and PTEN. As explained herein above, the fusion protein as described herein have an improved biophysical stability compared to a reference IL-37 construct, such as a wild-type IL-37 polypeptide or a mutant variant of an IL-37 polypeptide. The biophysical stability may include the stability of biophysical properties such as but not limited to thermal stability, heat capacity, aggregation state, solubility, pH stability, resistance to chemical denaturation and/or resistance to proteolytic degradation. Thus, as described herein and as illustrated in the appended Examples, the fusion proteins have improved biophysical stability such as an improved thermal stability compared to a reference IL-37 construct, such as a wild-type IL-37 polypeptide or a mutant variant of an IL-37 polypeptide as described herein above and below. In other words, the thermal stability of the fusion protein is increased compared to a reference IL-37 construct, such as a wild-type or mutant variant of an IL-37 polypeptide. The thermal stability as used herein may refer to increased resistance to denaturant-induced unfolding and increased resistance to heat-induced unfolding.

High biophysical stability such as thermal stability of the fusion protein can result in high expression yield in recombinant systems and can be important as it can be associated with high solubility, therefore enabling the fusion protein to be efficiently formulated at high concentrations into drugs. Also for therapeutic purposes, high biophysical stability such as thermal stability can be important for avoiding aggregation of the fusion protein during various manufacturing steps (including expression, and purification) and during storage. Thus, the avoidance of aggregation is important to maximizing the economic viability of the drug production process of the fusion protein. Finally, also for therapeutic purposes, high biophysical stability such as thermal stability is important in achieving a long fusion protein half-life both in patients and in disease models.

For example, the aggregation of the fusion protein as described herein may be reduced compared to a reference IL-37 construct, such as a wild-type or mutant variant of an IL-37 polypeptide. As another example, the aggregation of a fusion protein as described herein may be reduced while maintaining the thermal stability of a reference IL-37 construct, such as a wild-type or a mutant variant of a IL-37 polypeptide. As yet another example, the aggregation of a fusion protein as described herein may be reduced while increasing the thermal stability compared to a reference IL-37 construct, such as a wild-type or a mutant variant of a IL-37 polypeptide.

Thus, the present invention relates to a fusion protein comprising an IL-37 polypeptide and an Fc region of an antibody, wherein the amino acid sequence of the IL-37 polypeptide comprises an amino acid residue selected from the group consisting of serine, threonine, glycine, alanine, glutamine and asparagine, preferably serine, at amino acid position 181, an amino acid residue selected from the group consisting of serine, threonine, glycine, alanine, glutamine and asparagine, preferably serine at amino acid position 183 and an amino acid residue selected from the group consisting of serine, threonine, glycine, alanine, glutamine and asparagine at amino acid position 207. Most preferably, the amino acid sequence of the IL-37 polypeptide comprises a serine residue at amino acid positions 181, 183 and 207. The invention aims at the anti-inflammatory response induced by the fusion protein or compositions thereof and therefore at the fusion protein or composition thereof for use in treating an inflammatory disease or condition in a subject in need of such treatment. Hence, it is preferred in the context of the present invention that in case the subject is presently treated with a fusion protein or a composition thereof that the fusion protein or the composition thereof induces an anti-inflammatory response in the subject.

The method of the invention can be used for treating a disease in a subject in need of such a treatment. For example, the method can be used to administer to a subject a therapeutically effective amount of the fusion protein or a composition thereof. The method can also be used for preventing a disease, e.g. by administering to a subject a therapeutically effective amount of the fusion protein or a composition thereof. An "effective amount" or "therapeutically effective amount" of an agent, e.g., a pharmaceutical formulation, refers to an amount effective, at dosages and for periods of time necessary, to achieve the desired therapeutic or prophylactic result.

In the context of the present invention the "fusion protein" relates to a protein which is made of polypeptide parts from different sources. Accordingly, it may be also understood as a "chimeric protein". The fusion protein of the present invention refers to a fusion protein in which IL-37 polypeptide is linked, directly or indirectly, to an Fc region of an antibody, such as an IgG Fc region. For example, the fusion protein comprises a human IL-37 polypeptide linked to a human IgG Fc region. As another example, the fusion protein comprises a human IL-37 polypeptide linked to a human IgG1 Fc region. The fusion protein of any of the preceding claims, wherein the IL-37 polypeptide is fused at the C-terminus to the Fc region.

Usually, fusion proteins are proteins created through the joining of two or more genes (or preferably cDNAs) that originally coded for separate proteins. Translation of this fusion gene (or fusion cDNA) results in a single polypeptide, preferably with functional properties derived from each of the original proteins. Recombinant fusion proteins are created artificially by recombinant DNA technology for use in biological research or therapeutics. A fusion protein of the invention may also be modified by, conjugated or fused to another moiety to facilitate purification, or increasing the in vivo half-life of the fusion protein. Modifications contemplated herein include, but are not limited to, modification to side chains, incorporating of unnatural amino acids and/or their derivatives during polypeptide synthesis and the use of crosslinkers and other methods which impose conformational constraints on the polypeptides of the invention. For example, a fusion protein of the invention may be modified by glycosylation, acetylation, pegylation, phosphorylation, amidation, derivatization by known protecting/blocking groups, proteolytic cleavage, linkage to a cellular ligand or other protein, etc.

The fusion protein of the present invention is typically a anti-inflammatory fusion protein. In this context, "Interleukin-37" or "IL-37" refers to a member of interleukin 1 cytokine (IL-1) family and is primarily an anti-inflammatory cytokine, which reduces systemic and local inflammation. The expression is highly induced by several toll-like receptor (TLR) ligands and pro-inflammatory cytokines such as IL-1 beta, TNF-alpha, IFN-gamma. IL-37 is also known as interleukin-37 (FIL1 zeta; IL-1 zeta; IL-1 F7b (IL-1 H4, IL-1 H, IL-1 RP1); IL-1X protein; IL1 F7 (canonical product IL-1 F7b); interleukin 1 family member 7; interleukin 1, zeta; interleukin-1 homolog 4; interleukin-1 superfamily z; interleukin-1-related protein and interleukin-23). The anti-inflammatory properties of a polypeptide of the invention can be determined by any method described herein, particular in the Examples.

IL-37 has significant sequence similarity with IL-18 and highly expressed in inflammatory tissues, which inhibits the excessive inflammatory response. In other words, IL-37 is a potent inhibitor of innate immunity by shifting the cytokine equilibrium away from excessive inflammation. In this context, IL-37 can bind to, and may be a ligand for interleukin 18 receptor (IL-18R). This cytokine also binds to interleukin 18 binding protein (IL18BP), an inhibitory binding protein of interleukin 18 (IL18), and subsequently forms a complex with IL18 receptor beta subunit, and through which it inhibits the activity of IL18. The fusion protein of the present invention can bind to the IL-18R, which can lead to IL-18R downstream signaling. The fusion protein as used in the context of the present invention is capable of binding to the IL-18R and capable of leading to IL-18R downstream signaling. The functions and/or activities of the fusion protein of the present invention can be assayed by methods known in the art, including without limitation, ELISA and ligand-receptor binding assay. The term "IL-37" or IL-37 polypeptide" or "IL-37 protein" as used herein, broadly refers to any native IL-37 from any mammalian source, including primates (e.g. humans) and rodents (e.g. mice and rats), unless otherwise indicated. The term encompasses "full-length", unprocessed IL-37 as well as any forms of IL-37 that result from processing in the cell. For example, both full-length IL-37 and the mature form, wherein the IL-37 is converted from an inactive precursor state into an active state by cleavage of caspase-1 during expression, are encompassed by the present invention. The term also encompasses naturally occurring variants of IL-37, e.g., splice variants or allelic variants. The amino acid sequence of an exemplary IL-37 is shown in SEQ ID NO. 1. As used herein, said IL-37 polypeptide comprising SEQ ID NO.: 1, such as the amino acid sequence of the IL-37 polypeptide comprising amino acids 46 to 218, may refer to a wild-type IL-37 polypeptide. The terms "full-length antibody," "intact antibody," and "whole antibody" are used herein interchangeably to refer to an antibody having a structure substantially similar to a native antibody structure or having heavy chains that contain an Fc region as defined herein. Five alternatively spliced transcript variants encoding five different isoforms of IL-37 have been reported. Notably, the sequence of amino acids 53 to 206 of isoform B of IL-37 is identical to the sequence of amino acids 27 to 181 of isoform A of IL-37. As used herein, IL-37 may be any of isoform of IL-37, such as any isoform of IL37a-e. In the context of the present invention, the IL-37 is isoform A or B of IL-37, preferably isoform B of IL-37.

In the context of the present invention, the terms "polypeptide", "peptide" and "protein" are used interchangeably to refer to a polymer of amino acid residues. The term also applies to amino acid polymers in which one or more amino acid residues is an artificial chemical mimetic or a corresponding naturally occurring amino acid, as well as to naturally occurring amino acid polymers. Accordingly, in the context of the present invention, the term "polypeptide" relates to a molecule which comprises or consists of chains of amino acid monomers linked by peptide (amide) bonds. Peptide bonds are covalent chemical bonds which are formed when the carboxyl group of one amino acid reacts with the amino group of another. Herein a "polypeptide" is not restricted to a molecule with a defined length. Thus, herein the term "polypeptide" relates to a peptide, an oligopeptide, a protein, or a polypeptide which encompasses amino acid chains, wherein the amino acid residues are linked by covalent peptide bonds. However, herein the term "polypeptide" also encompasses peptidomimetics of such proteins/polypeptides wherein amino acid(s) and/or peptide bond(s) have been replaced by functional analogs. The term polypeptide also refers to, and does not exclude, modifications of the polypeptide, e.g., glycosylation, acetylation, phosphorylation and the like. Such modifications are well described in the art.

The term "amino acid" refers to naturally occurring and synthetic amino acids, as well as amino acid analogs and amino acid mimetics that function in a manner similar to the naturally occurring amino acids. Naturally occurring amino acids are those encoded by the genetic code, as well as those amino acids that are later modified, e.g. hydroxyproline, γ-carboxyglutamate, and O-phosphoserine. Amino acid analogs refer to compounds that have the same basic chemical structure as a naturally occurring amino acid, i.e., an α-carbon that is bound to a hydrogen, a carboxyl group, an amino group, and an R group, e.g., homoserine, norleucine, methionine sulfoxide, methionine methyl sulfonium. Such analogs have modified R groups (e.g., norleucine) or modified peptide backbones, but retain the same basic chemical structure as a naturally occurring amino acid. Amino acid mimetics refers to chemical compounds that have a structure that is different from the general chemical structure of an amino acid, but that function in a manner similar to a naturally occurring amino acid. Amino acids may be referred to herein by either their commonly known three letter symbols or by the one-letter symbols recommended by the IUPAC-IUB Biochemical Nomenclature Commission.

"Antibody" refers to various antibody structures, including but not limited to monoclonal antibodies, polyclonal antibodies, multispecific antibodies. The term "monoclonal antibody" as used herein refers to an antibody obtained from a population of substantially homogeneous antibodies, i.e., the individual antibodies comprising the population are identical and/or bind the same epitope, except for possible variant antibodies, e.g., containing naturally occurring mutations or arising during production of a monoclonal antibody preparation, such variants generally being present in minor amounts. In contrast to polyclonal antibody preparations, which typically include different antibodies directed against different determinants (epitopes), each monoclonal antibody of a monoclonal antibody preparation is directed against a single determinant on an antigen. Thus, the modifier "monoclonal" indicates the character of the antibody as being obtained from a substantially homogeneous population of antibodies, and is not to be construed as requiring production of the antibody by any particular method. For example, the monoclonal antibodies in accordance with the present invention may be made by a variety of techniques, including but not limited to the hybridoma method, recombinant DNA methods, phage-display methods, and methods utilizing transgenic animals containing all or part of the human immunoglobulin loci, such methods and other exemplary methods for making monoclonal antibodies being described herein. "Multispecific antibodies" are monoclonal antibodies that have binding specificities for at least two different sites, i.e., different epitopes on different antigens or different epitopes on the same antigen. Techniques for making multispecific antibodies include, but are not limited to, recombinant co-expression of two immunoglobulin heavy chain-light chain pairs having different specificities (see Milstein and Cuello, Nature 305:537 (1983)) and "knob-in-hole" engineering (see, e.g., U.S. Pat. No. 5,731,168, and Atwell et al., J. Mol. Biol. 270:26 (1997)). Multi-specific antibodies may also be made by engineering electrostatic steering effects for making antibody Fc-heterodimeric molecules (see, e.g., WO 2009/089004) or cross-linking two or more antibodies or fragments (see, e.g., U.S. Pat. No. 4,676,980, and Brennan et al., Science, 229:81 (1985)). An "antibody fragment" refers to a molecule other than an intact antibody that comprises a portion of an intact antibody that binds the antigen to which the intact antibody binds. Examples of antibody fragments include but are not limited to Fv, Fab, Fab', Fab'-SH, F(ab')2, diabodies, linear antibodies, single-chain antibody molecules (e.g., scFv), and multispecific antibodies formed from antibody fragments.

The term also relates to human antibodies, particularly recombinant human antibodies, heterologous antibodies and heterohybrid antibodies. A "human antibody" is one which possesses an amino acid sequence which corresponds to that of an antibody produced by a human or a human cell or derived from a non-human source that utilizes human antibody repertoires or other human antibody-encoding sequences. This definition of a human antibody specifically excludes a humanized antibody comprising non-human antigen-binding residues. Particularly, the term "recombinant human antibody" includes all human sequence antibodies that are prepared, expressed, created or isolated by recombinant means, such as antibodies isolated from an animal (e.g., a mouse) that is transgenic for human immunoglobulin genes; antibodies expressed using a recombinant expression vector transfected into a host cell, antibodies isolated from a recombinant, combinatorial human antibody library, or antibodies prepared, expressed, created or isolated by any other means that involves splicing of human immunoglobulin gene sequences to other DNA sequences. Thus, such recombinant human antibodies have variable and constant regions derived from human germline immunoglobulin sequences. Such antibodies can, however, be subjected to in vitro mutagenesis (or, when an animal transgenic for human Ig sequences is used, in vivo somatic mutagenesis) and thus the amino acid sequences of the VH and VL regions of the recombinant antibodies are sequences that, while derived from and related to human germline VH and VL sequences, may not naturally exist within the human antibody germline repertoire in vivo.

Generally speaking, an antibody may be derived from immunizing an animal, or from a recombinant antibody library, including an antibody library that is based on amino acid sequences that have been designed in silico and encoded by nucleic acids that are synthetically created. In silico design of an antibody sequence is achieved, for example, by analyzing a database of human sequences and devising a polypeptide sequence utilizing the data obtained therefrom. Methods for designing and obtaining in silico-created sequences are described, for example, in Knappik et al., J. Mol. Biol. (2000) 296:57; Krebs et al., J. Immunol. Methods. (2001) 254:67; and U.S. Pat. No. 6,300,064 issued to Knappik et al.

The term "Fc region" herein is used to define a C-terminal region of an immunoglobulin heavy chain that contains at least a portion of the constant region. In other words, the Fc region contains two heavy chain fragments comprising the $C_H2$ and $C_H3$ domains of an antibody. In the context of the present invention, the Fc region comprises two heavy chain fragments, preferably the CH2 and CH3 domains of said heavy chain. The two heavy chain fragments are held together by two or more disulfide bonds and by hydrophobic interactions of the $C_H3$ domains. The heavy chain constant domains that correspond to the different classes of immunoglobulins are called α, δ, ε, γ, and μ, respectively.

In some aspects, the fusion protein does not exhibit any effector function or any detectable effector function. "Effector functions" or "effector activities" refer to those biological activities attributable to the Fc region of an antibody, which vary with the antibody isotype. Examples of antibody effector functions include: C 1q binding and complement dependent cytotoxicity (CDC); Fc receptor binding; antibodydependent cell-mediated cytotoxicity (ADCC); phagocytosis; down regulation of cell surface receptors (e.g. B cell receptor); and B cell activation. In vitro and/or in vivo cytotoxicity assays can be conducted to confirm the reduction/depletion of CDC and/or ADCC activities. For example, Fc receptor (FcR) binding assays can be conducted to ensure that the antibody lacks FcγR binding (hence likely lacking ADCC activity), but retains FcRn binding ability. The primary cells for mediating ADCC, NK cells, express FcγRIII only, whereas monocytes express FcγRI, FcγRII and FcγRIII. FcR expression on hematopoietic cells is summarized in Table 3 on page 464 of Ravetch and Kinet, Annu. Rev. Immunol. 9:457-492 (1991). Non-limiting examples of in vitro assays to assess ADCC activity of a molecule of interest is described in U.S. Pat. No. 5,500,362 (see, e.g., Hellstrom, I. et al. Proc. Nat'l Acad. Sci. USA 83:7059-7063 (1986)) and Hellstrom, I et al., Proc. Nat'l Acad. Sci. USA 82:1499-1502 (1985); 5,821,337 (see Bruggemann, M. et al., J. Exp. Med. 166:1351-1361 (1987)). Alternatively, non-radioactive assays methods may be employed (see, for example, ACTI™ non-radioactive cytotoxicity assay for flow cytometry (CellTechnology, Inc. Mountain View, CA; and CytoTox 96® non-radioactive cytotoxicity assay (Promega, Madison, WI). Useful effector cells for such assays include peripheral blood mononuclear cells (PBMC) and Natural Killer (NK) cells. Alternatively, or additionally, ADCC activity of the molecule of interest may be assessed in vivo, e.g., in a animal model such as that disclosed in Clynes et al. Proc. Nat'l Acad. Sci. USA 95:652-656 (1998). C1q binding assays may also be carried out to confirm that the antibody is unable to bind C1q and hence lacks CDC activity. See, e.g., C1q and C3c binding ELISA in WO 2006/029879 and WO 2005/100402. To assess complement activation, a CDC assay may be performed (see, for example, Gazzano-Santoro et al., J. Immunol. Methods 202:163 (1996); Cragg, M. S. et al., Blood 101:1045-1052 (2003); and Cragg, M. S. and M. J. Glennie, Blood 103: 2738-2743 (2004)). FcRn binding and in vivo clearance/ half-life determinations can also be performed using methods known in the art (see, e.g., Petkova, S. B. et al., Int'l. Immunol. 18(12):1759-1769 (2006); WO 2013/120929 A1).

Antibodies with reduced effector function include those with substitution of one or more of Fc region residues 238, 265, 269, 270, 297, 327 and 329 (U.S. Pat. No. 6,737,056). Such Fc mutants include Fc mutants with substitutions at two or more of amino acid positions 265, 269, 270, 297 and 327, including the so-called "DANA" Fc mutant with substitution of residues 265 and 297 to alanine (U.S. Pat. No. 7,332,581). For example, an antibody variant may comprise an Fc region with one or more amino acid substitutions which diminish FcγR binding, e.g., substitutions at positions 234 and 235 of the Fc region (EU numbering of residues). For example, the substitutions are L234A and L235A (LALA) (See, e.g., WO 2012/130831). Further, alterations may be made in the Fc region that result in altered (i.e., diminished) C1q binding and/or Complement Dependent Cytotoxicity (CDC), e.g., as described in U.S. Pat. No. 6,194,551, WO 99/51642, and Idusogie et al. J. Immunol. 164:4178-4184 (2000).

In some aspects, the Fc region includes mutations to the complement (C1q) and/or to Fc gamma receptor (FcγR) binding sites. In some aspects, such mutations can render the fusion protein incapable of antibody directed cytotoxicity (ADCC) and complement directed cytotoxicity (CDC).

The Fc region as used in the context of the present invention does not trigger cytotoxicity such as antibody-dependent cellular cytotoxicity (ADCC) or complement dependent cytotoxicity (CDC).

The term "Fc region" also includes native sequence Fc regions and variant Fc regions. The Fc region may include the carboxyl-terminus of the heavy chain. Antibodies produced by host cells may undergo post-translational cleavage of one or more, particularly one or two, amino acids from the C-terminus of the heavy chain. Therefore, an antibody produced by a host cell by expression of a specific nucleic acid molecule encoding a full-length heavy chain may include the full-length heavy chain, or it may include a cleaved variant of the full-length heavy chain. Unless otherwise specified herein, numbering of amino acid residues in the Fc region or constant region is according to the EU numbering system, also called the EU index, as described in Kabat et al., Sequences of Proteins of Immunological Interest, 5th Ed. Public Health Service, National Institutes of Health, Bethesda, MD, 1991. Amino acid sequence variants of the Fc region of an antibody may be contemplated. Amino acid sequence variants of an Fc region of an antibody may be prepared by introducing appropriate modifications into the nucleotide sequence encoding the antibody, or by peptide synthesis. Such modifications include, for example, deletions from, and/or insertions into and/or substitutions of residues within the amino acid sequences of the Fc region of the antibody. Any combination of deletion, insertion, and substitution can be made to arrive at the final construct, provided that the final construct possesses the desired characteristics, e.g., inducing or supporting an anti-inflammatory response.

Fusing IL-37 to the Fc region of an antibody can produce a construct having beneficial effects on the productivity of IL-37. Particularly, fusing the IL-37 to the Fc region of an antibody can produce a construct with increased productivity compared to a reference, such as a wild-type or mutant IL-37 polypeptide or a construct. In another aspect, fusing IL-37 to the Fc region of an antibody can produce a construct having beneficial effects on the productivity of IL-37 while maintaining the potency of known IL-37 constructs and fusion proteins known in the art. In other words, fusing IL-37 to the Fc region of an antibody can increase the productivity of IL-37 compared to a reference, such as a wild-type or mutant IL-37 polypeptide or a construct while maintaining the potency of known IL-37 constructs and fusion proteins known in the art. The term "potency" as used herein with respect to the fusion protein of the present invention refers to the ability of the fusion protein to bind to a IL-18R and/or to activate downstream IL-18R. Particularly, the potency of the fusion protein of the present invention refers to the anti-inflammatory activity as described herein above and below. The potency may be assessed in a receptor binding assays or a cell-based binding assay. Potency may be compared to a reference IL-37 polypeptide, such as a wild-type IL-37 polypeptide.

As used herein, the term "productivity" refers to the quantity of a protein, such as the fusion protein described herein, formed within a given volume (e.g. mg product per ml). The term "quantity" as used herein refers to the product yield of a protein, such as the concentration of the fusion protein as described herein. Thus, by "increasing the productivity" of a protein, such as the fusion protein described herein, it is meant that the quantity of protein in a given volume is increased compared to a corresponding reference, such as a wild-type IL-37, a mutant IL-37 polypeptide or a construct thereof.

In some aspects, the product yield of the fusion protein is at least 43 mg/ml, preferably at least 186 mg/ml.

The Fc region of the antibody may be an Fc region of any of the classes of antibody, such as IgA, IgD, IgE, IgG, and IgM. The "class" of an antibody refers to the type of constant domain or constant region possessed by its heavy chain. There are five major classes of antibodies: IgA, IgD, IgE, IgG, and IgM, and several of these may be further divided into subclasses (isotypes), e.g., IgG1, IgG2, IgG3, IgG4, IgA1, and IgA2. Accordingly, as used in the context of the present invention, the antibody may be an Fc region of an IgG. For example, the Fc region of the antibody may be an Fc region of an IgG1, an IgG2, an IgG2b, an IgG3 or an IgG4. In some aspects, the fusion protein of the present invention comprises an IgG of an Fc region of an antibody. In the context of the present invention, the Fc region of the antibody is an Fc region of an IgG, preferably IgG1.

Moreover, the herein provided fusion proteins may comprise a linker (or "spacer"). In the context of the present invention, the IL-37 polypeptide is fused via a linker at the C-terminus to the Fc region. A linker is usually a peptide having a length of up to 20 amino acids. The term "linked to" or "fused to" refers to a covalent bond, e.g., a peptide bond, formed between two moieties. Accordingly, in the context of the present invention the linker may have a length of 1, 2, 3, 4, 5, 6, 7, 8, 9, 10, 11, 12, 13, 14, 15, 16, 17, 18, 19 or 20 amino acids. For example, the herein provided fusion protein may comprise a linker between the IL-37 polypeptide and the Fc region of the antibody, such as between the N-terminus of the Fc regions and the C-terminus of the IL-37 polypeptide. As another example, the herein provided fusion protein may comprise a linker between the IL-37 polypeptide and the Fc region of the antibody, such as between the C-terminus of the Fc regions and the N-terminus of the IL-37 polypeptide. Particularly, the IL-37 polypeptide may be fused via a linker at the C-terminus to the N-terminus of the Fc region. Such linkers have the advantage that they can make it more likely that the different polypeptides of the fusion protein fold independently and behave as expected. Thus, in the context of the present invention the IL-37 polypeptide and the Fc region of an antibody may be comprised in a single-chain multi-functional polypeptide. In some aspects, the fusion protein of the present invention includes a peptide linker. In some aspects, the peptide linker links an IL-37 polypeptide with an Fc region of an antibody. In some aspects, the peptide linker can include the amino acid sequence Gly-Gly-Ser (GGS), Gly-Gly-Gly-Ser (GGGS) or Gly-Gly-Gly-Gly-Ser (GGGGS). In some aspects, the peptide linker can include the amino acid sequence GGGGS.

Some IL-37 expressed in mammalian cells has been sequenced and found to start at Val46 (Pan et al., 2001, Cytokine 13:1-7). The unprocessed (uncleaved) sequence has also been detected. In some aspects, the fusion protein of the present invention includes a fragment of IL-37, e.g. a fragment of an IL-37 polypeptide or a fragment of an IL-37 isoform. Such fragments can be truncated at the N-terminus or C-terminus, or can lack internal residues, for example, when compared with a full length native protein. Certain fragments lack amino acid residues that are not essential for a desired biological activity of an IL-37 polypeptide of the present invention. Accordingly, in certain aspects, a fragment of an IL-37 polypeptide is biologically active.

In the context of the present invention, the amino acid sequence of the IL-37 polypeptide comprises amino acids 46 to 218. For example, the amino acid sequence of the IL-37 polypeptide may comprise amino acids 46 to 218 of isoform B. As another example, the amino acid sequence of the IL-37 polypeptide may comprise amino acids 46 to 218 of SEQ ID NO. 1. As still another example, the amino acid sequence of the IL-37 polypeptide may comprise amino acids 21 to 218, such as amino acids 21 to 218 of isoform B. As still another example, the amino acid sequence of the IL-37 polypeptide may comprise amino acids 21 to 218, such as amino acids 21 to 218 of SEQ ID NO. 1. In some aspects, the amino acid sequence of the IL-37 polypeptide consists amino acids 46 to 218. In some aspects, the amino acid sequence of the IL-37 polypeptide consists amino acids 46 to 218 of isoform B. In some aspects the amino acid sequence of the IL-37 polypeptide consists amino acids 46 to 218 of SEQ ID NO 1.

In some aspects, the IL-37 polypeptide comprises the amino acid sequence of SEQ ID NO. 1. The anti-inflammatory fusion protein of any of the preceding claims, wherein the IL-37 polypeptide has a sequence identity of at least 86%, 87%, 88%, 89%, 90%, 91%, 92%, 93% or 94%, preferably of at least 95%, 96%, 97% or 98%, more preferably of at least 95% or 96%, even more preferably of at least 96% with SEQ ID NO. 1. However, it is understood that minor sequence variations such as insertions, deletions, substitutions, especially conservative amino acid substitutions of IL-37 that do not undesirably affect the function and/or activity of IL-37 are also contemplated by the invention. For example, variations in the native sequence of IL-37, such as SEQ ID NO. 1, can be made using any of the techniques and guidelines for conservative and non-conservative mutations set forth, for instance, in U.S. Pat. No. 5,364,934. The term "conservative substitution" as used herein, refers to the replacement of an amino acid present in the native sequence in the peptide with a naturally or non-naturally occurring amino acid or a peptidomimetic having similar steric properties. Where the side-chain of the native amino acid to be replaced is either polar or hydrophobic, the conservative substitution should be with a naturally occurring amino acid, a non-naturally occurring amino acid or with a peptidomimetic moiety which is also polar or hydrophobic (in addition to having the same steric properties as the side-chain of the replaced amino acid).

Variations can be a substitution, deletion, or insertion of one or more codons encoding a native sequence or variant IL-37 that results in a change in its amino acid sequence as compared with a corresponding native sequence or variant IL-37, such as SEQ ID NO 1. Optionally the variation is by substitution of at least one amino acid with any other amino acid in one or more of the domains of a native sequence IL-22 polypeptide. Guidance in determining which amino acid residue can be inserted, substituted or deleted without adversely affecting the desired activity can be found by comparing the sequence of the IL-22 with that of homologous known protein molecules and minimizing the number of amino acid sequence changes made in regions of high homology. Amino acid substitutions can be the result of replacing one amino acid with another amino acid having similar structural and/or chemical properties, such as the replacement of a leucine with a serine, i.e., conservative amino acid replacements. The variation allowed can be determined by systematically making insertions, deletions or substitutions of amino acids in the sequence and testing the resulting variants for activity, for example, in the in vitro assay known in the art.

As used herein, an amino acid residue at the position equivalent to position in SEQ ID NO: 1 can be determined by any means known to a person skilled in the art. For example, an alignment of one or more sequences with an amino acid sequence of SEQ ID NO: 1 would allow a person skilled in the art to determine the amino acid at the position equivalent to position in SEQ ID NO: 1. A person skilled in the art can compare the three-dimensional structure of a polypeptide with the three-dimensional structure of a polypeptide having the amino acid sequence of SEQ ID NO: 1 and determine the amino acid residue that is at an equivalent position to that in SEQ ID NO: 1.

"Percent (%) amino acid sequence identity" with respect to a reference polypeptide sequence is defined as the percentage of amino acid residues in a candidate sequence that are identical with the amino acid residues in the reference polypeptide sequence, after aligning the sequences and introducing gaps, if necessary, to achieve the maximum percent sequence identity, and not considering any conservative substitutions as part of the sequence identity for the purposes of the alignment. Alignment for purposes of determining percent amino acid sequence identity can be achieved in various ways that are within the skill in the art, for instance, using publicly available computer software such as BLAST, BLAST-2, Clustal W, Megalign (DNASTAR) software or the FASTA program package. Those skilled in the art can determine appropriate parameters for aligning sequences, including any algorithms needed to achieve maximal alignment over the full length of the sequences being compared. Alternatively, the percent identity values can be generated using the sequence comparison computer program ALIGN-2. The ALIGN-2 sequence comparison computer program was authored by Genentech, Inc., and the source code has been filed with user documentation in the U.S. Copyright Office, Washington D.C., 20559, where it is registered under U.S. Copyright Registration No. TXU510087 and is described in WO 2001/007611.

Unless otherwise indicated, for purposes herein, percent amino acid sequence identity values are generated using the search program of the FASTA package version 36.3.8c or later with a BLOSUM50 comparison matrix. The FASTA program package was authored by W. R. Pearson and D. J. Lipman (1988), "Improved Tools for Biological Sequence Analysis", PNAS 85:2444-2448; W. R. Pearson (1996) "Effective protein sequence comparison" Meth. Enzymol. 266:227-258; and Pearson et. al. (1997) Genomics 46:24-36 and is publicly available from www.fasta.bioch.virginia.edu/fasta_www2/fasta_down.shtml or www.ebi.ac.uk/Tools/sss/fasta. Alternatively, a public server accessible at fasta.bioch-.virginia.edu/fasta_www2/index.cgi can be used to compare the sequences, using the search (global protein: protein) program and default options (BLOSUM50; open: −10; ext: −2; Ktup=2) to ensure a global, rather than local, alignment is performed. Percent amino acid identity is given in the output alignment header.

In the context of the present invention, the fusion protein of the present invention may further comprise an additional disulfide bridge compared to the wild-type IL-37 polypeptide. In other words, the fusion protein of the present invention comprises an additional disulfide bond compared to the wild-type IL-37 polypeptide that is formed between a first cysteine residue of the fusion protein and a second, different, cysteine of said fusion protein. In yet other words, the IL-37 of the fusion protein of the present invention comprises a first cysteine, which may have been introduced by mutation in said IL-37, and a second cysteine, which may be a naturally occurring cysteine residue of the IL-37, and said first and said second cysteine form a disulfide bond. For example, the disulfide bridge may be formed with cysteine at position 122 of the IL-37 polypeptide. For example, said wild-type IL-37 polypeptide may comprise SEQ ID NO.: 1, such as the amino acids 46 to 218 of SEQ ID NO.: 1. Techniques to introduce unnatural disulfide bridges for stabilization are described e.g. in WO 94/029350, U.S. Pat. No. 5,747,654, Rajagopal, V., et al., Prot. Engin. 10 (1997) 1453-1459; Reiter, Y., et al., Nature Biotechnology 14 (1996) 1239-1245; Reiter; Y., et al., Protein Engineering; 8 (1995) 1323-1331; Webber, K. O., et al., Molecular Immunology 32 (1995) 249-258; Reiter, Y., et al., Immunity 2 (1995) 281-287; Reiter, Y., et al., JBC 269 (1994) 18327-18331; Reiter, Y., et al., Inter. J. of Cancer 58 (1994) 142-149, or Reiter, Y., Cancer Res. 54 (1994) 2714-2718. In a preferred aspect of the present invention, the additional disulfide bridge is formed between two cysteines of the IL-37 polypeptide and wherein one of said cysteines is a substitution mutation with cysteine, preferably at position 169. Alterations of the native amino acid sequence to produce mutant polypeptides, such as by insertion, deletion and/or substitution, can be done by a variety of means known to those skilled in the art. For instance, site-specific mutations can be introduced by ligating into an expression vector a synthesized oligonucleotide comprising the modified site. Alternately, oligonucleotide-directed site-specific mutagenesis procedures can be used, such as disclosed in Walder et al., Gene 42:133 (1986); Bauer et al., Gene 37:73 (1985); Craik, Biotechniques, 12-19 (January 1995); and U.S. Pat. Nos. 4,518,584 and 4,737,462. A preferred means for introducing mutations is the QuikChange Site-Directed Mutagenesis Kit (Stratagene, LaJolla, Calif.). Any appropriate expression vector (e.g., as described in Pouwels et al., Cloning Vectors: A Laboratory Manual (Elsevier, N.Y.: 1985)) and corresponding suitable host can be employed for production of recombinant polypeptides. Expression hosts include, but are not limited to, bacterial species within the genera *Escherichia, Bacillus, Pseudomonas, Salmonella*, mammalian or insect host cell systems including baculovirus systems (e.g., as described by Luckow et al., Bio/Technology 6:47 (1988)), and established cell lines such as the COS-7, C127, 3T3, CHO, HeLa, and BHK cell lines, and the like. The skilled person is aware that the choice of expression host has ramifications for the type of polypeptide produced. For instance, the glycosylation of polypeptides produced in yeast or mammalian cells (e.g., COS-7 cells) will differ from that of polypeptides produced in bacterial cells, such as *Escherichia coli*.

Alternately, a polypeptide of the invention can be synthesized using standard peptide synthesizing techniques well-known to those of ordinary skill in the art (e.g., as summarized in Bodanszky, Principles of Peptide Synthesis (Springer-Verlag, Heidelberg: 1984)). In particular, the polypeptide can be synthesized using the procedure of solid-phase synthesis (see, e.g., Merrifield, J. Am. Chem. Soc. 85:2149-54 (1963); Barany et al., Int. J. Peptide Protein Res. 30:705-739 (1987); and U.S. Pat. No. 5,424,398). If desired, this can be done using an automated peptide synthesizer. Removal of the t-butyloxycarbonyl (t-BOC) or 9-fluorenylmethyloxycarbonyl (Fmoc) amino acid blocking groups and separation of the polypeptide from the resin can be accomplished by, for example, acid treatment at reduced temperature. The polypeptide-containing mixture can then be extracted, for instance, with dimethyl ether, to remove non-peptidic organic compounds, and the synthesized polypeptide can be extracted from the resin powder (e.g., with about 25% w/v acetic acid). Following the synthesis of the polypeptide, further purification (e.g., using high performance liquid chromatography (HPLC)) optionally can be done in order to eliminate any incomplete polypeptides or free amino acids. Amino acid and/or HPLC analysis can be performed on the synthesized polypeptide to validate its identity. For other applications according to the invention, it may be preferable to produce the polypeptide as part of a larger fusion protein, such as by the methods described herein or other genetic means, or as part of a larger conjugate, such as through physical or chemical conjugation, as known to those of ordinary skill in the art and described herein.

In one aspect of the present invention, the IL-37 polypeptide may further comprise an isoleucine at amino acid position 119 and/or an amino acid selected from the group consisting of threonine, alanine, tyrosine, lysine, phenylalanine, histidine and glycine at amino acid position 178.

In one aspect of the present invention, the IL-37 polypeptide does not comprise a mutation at any of amino acids located at position 71 to 74, 78, 80, 83 to 88 and 184

In an alternative aspect of the present invention, the IL-37 polypeptide comprises a mutation at one or more amino acid(s) located at the amino acid position selected from the group of position 71 to 74, 78, 80, 83 to 88 and 184. In a preferred aspect of the present invention, the amino acid sequence of the IL-37 polypeptide comprises an alanine located at amino acid position 85.

For example, the IL-37 polypeptide may comprise a mutation at one or more amino acid(s) as described in WO2016/201503. For example, the amino acid residue at, or at a position equivalent to, position 71, 72, 73, 74, 78, 80, 83, 84, 85, 86, 87, 88 and/or 184 in SEQ ID NO: 1 may be mutated.

In this context, the mutation at the one or more amino acid(s) located at the amino acid position selected from the group of position 71 to 74, 78, 80, 83 to 88 and 184 may contain a non-conservative substitution mutation relative to the amino acid that occurs in that position, such as in SEQ ID NO.1 of that position.

The phrase "non-conservative substitution" or a "non-conservative residue" as used herein refers to replacement of the amino acid as present in the parent sequence by another naturally or non-naturally occurring amino acid, having different electrochemical and/or steric properties. Thus, the side chain of the substituting amino acid can be significantly larger (or smaller) than the side chain of the native amino acid being substituted and/or can have functional groups with significantly different electronic properties than the amino acid being substituted. Examples of non-conservative substitutions of this type include the substitution of phenylalanine or cyclohexylmethyl glycine for alanine, isoleucine for glycine, or —NH—CH[(—CH2)5-COOH]—CO— for aspartic acid. Non-conservative substitution includes any mutation that is not considered conservative.

A non-conservative amino acid substitution can result from changes in: (a) the structure of the amino acid backbone in the area of the substitution; (b) the charge or hydrophobicity of the amino acid; or (c) the bulk of an amino acid side chain. Substitutions generally expected to produce the greatest changes in protein properties are those in which: (a) a hydrophilic residue is substituted for (or by) a hydrophobic residue; (b) a proline is substituted for (or by) any other residue; (c) a residue having a bulky side chain, e.g., phenylalanine, is substituted for (or by) one not having a side chain, e.g., glycine; or (d) a residue having an electropositive side chain, e.g., lysyl, arginyl, or histadyl, is substituted for (or by) an electronegative residue, e.g., glutamyl or aspartyl.

For example, the mutation may be a replacement with alanine or an amino acid with an opposite charge. As another example, the amino acid at position 85 may be an alanine, the amino acid at position 83 may be a glutamate, the amino acid at position 73 may be an alanine and/or the amino acid at position 73 may be a lysine.

One aspect of the present invention relates to a nucleic acid molecule encoding the fusion protein as provided herein. The term "nucleic acid molecule" includes any compound and/or substance that comprises a polymer of nucleotides. Each nucleotide is composed of a base, specifically a purine- or pyrimidine base (i.e. cytosine (C), guanine (G), adenine (A), thymine (T) or uracil (U)), a sugar (i.e. deoxyribose or ribose), and a phosphate group. Often, the nucleic acid molecule is described by the sequence of bases, whereby said bases represent the primary structure (linear structure) of a nucleic acid molecule. The sequence of bases is typically represented from 5' to 3'. Herein, the term nucleic acid molecule encompasses deoxyribonucleic acid (DNA) including e.g., complementary DNA (cDNA) and genomic DNA, ribonucleic acid (RNA), in particular messenger RNA (mRNA), synthetic forms of DNA or RNA, and mixed polymers comprising two or more of these molecules. The nucleic acid molecule may be linear or circular. In addition, the term nucleic acid molecule includes both, sense and antisense strands, as well as single stranded and double stranded forms. Moreover, the herein described nucleic acid molecule can contain naturally occurring or non-naturally occurring nucleotides. Examples of non-naturally occurring nucleotides include modified nucleotide bases with derivatized sugars or phosphate backbone linkages or chemically modified residues. Nucleic acid molecules also encompass DNA and RNA molecules which are suitable as a for direct expression of an antibody of the invention in vitro and/or in vivo, e.g., in a host or patient. Such DNA (e.g., cDNA) or RNA (e.g., mRNA) vectors, can be unmodified or modified. For example, mRNA can be chemically modified to enhance the stability of the RNA vector and/or expression of the encoded molecule so that mRNA can be injected into a subject to generate the antibody in vivo (see e.g., Stadler et al, Nature Medicine 2017, published online 12 Jun. 2017, doi:10.1038/nm.4356 or EP 2 101 823 B1). Thus, a nucleic acid sequence which "encodes" a selected polypeptide is a nucleic acid molecule which is transcribed (in the case of DNA) and translated (in the case of mRNA) into a polypeptide in vivo when placed under the control of appropriate regulatory sequences. The boundaries of the coding sequence are determined by a start codon at the 5' (amino) terminus and a translation stop codon at the 3' (carboxy) terminus.

One aspect of the present invention relates to a vector comprising the nucleic acid molecule encoding the fusion protein as provided herein. Thus, the present invention provides a vector for use in preventing or treating an inflammatory disease or condition comprising a polynucleotide sequence which encodes a polypeptide of the invention. The term "vector", as used herein, refers to a nucleic acid molecule capable of propagating another nucleic acid to which it is linked. The term includes the vector as a self-replicating nucleic acid structure as well as the vector incorporated into the genome of a host cell into which it has been introduced. Certain vectors are capable of directing the expression of nucleic acids to which they are operatively linked. Such vectors are referred to herein as "expression vectors". The techniques utilized may be found in any of several well-known references such as: *Molecular Cloning: A Laboratory Manual* (Sambrook, et al., 1989, Cold Spring Harbor Laboratory Press), *PCR Protocols: A Guide to Methods and Applications* (Innis, et al. 1990. Academic Press, San Diego, CA), and Harlow and Lane (1988) *Antibodies: A Laboratory Manual* ch. 14 (Cold Spring Harbor Laboratory, Cold Spring Harbor, NY). Expression vectors are routinely constructed in the art of molecular biology and may for example involve the use of plasmid DNA and appropriate initiators, promoters, enhancers and other elements, such as for example polyadenylation signals which may be necessary, and which are positioned in the correct orientation, in order to allow for expression of a peptide of the invention. Other suitable vectors would be apparent to persons skilled in the art. By way of further example in this regard we refer to Sambrook et al.

One aspect of the present invention relates to a cell comprising the nucleic acid molecule encoding the fusion protein as provided herein or the vector comprising the nucleic acid molecule encoding the fusion protein as provided herein. As used herein, the cell may refer to a host cell. The terms "host cell," "host cell line," and "host cell culture" are used interchangeably and refer to cells into which exogenous nucleic acid has been introduced, including the progeny of such cells. Host cells include "transformants" and "transformed cells," which include the primary transformed cell and progeny derived therefrom without regard to the number of passages. The transformed cell includes transiently or stably transformed cell. Progeny may not be completely identical in nucleic acid content to a parent cell, but may contain mutations. Mutant progeny that have the same function or biological activity as screened or selected for in the originally transformed cell are included herein. In some aspects, the host cell is transiently transfected with the exogenous nucleic acid. In another aspects, the host cell is stably transfected with the exogenous nucleic acid. An "isolated" fusion protein is one that has been separated from the environment of a host cell that recombinantly produces the fusion protein. In some aspects, the fusion protein of the present invention is purified to greater than 95% or 99% purity as determined by, for example, electrophoretic (e.g., SDS-PAGE, isoelectric focusing (IEF), capillary electrophoresis) or chromatographic (e.g., ion exchange or reverse phase HPLC) methods. For a review of methods for assessment of purity, see, e.g., Flatman et al., *J. Chromatogr. B* 848:79-87 (2007).

In the context of the present invention, a pharmaceutical composition is provided comprising the fusion protein as described herein. The term "pharmaceutical composition" or "pharmaceutical formulation" refers to a preparation which is in such form as to permit the biological activity of an active ingredient contained therein to be effective, and which contains no additional components which are unacceptably toxic to a subject to which the pharmaceutical composition would be administered. Furthermore, in the context of the present invention, a method is provided for treating or preventing an inflammatory disease or condition in a patient comprising administering to the patient a therapeutically effective amount of a fusion protein or a pharmaceutical composition as used in the context of the present invention. Thus, a method or use of the invention, or by a fusion protein or pharmaceutical composition of the invention, find application to reduce, inhibit or prevent inflammation induced by other mediators such as other cytokines (IL-1, IFNγ etc), other mediators (e.g. complement, leukotrienes etc) and chemical and physical insults.

As used herein, "treatment" (and grammatical variations thereof such as "treat" or "treating") refers to clinical intervention in an attempt to alter the natural course of a disease in the individual being treated, and can be performed either for prophylaxis or during the course of clinical pathology. Desirable effects of treatment include, but are not limited to, preventing occurrence or recurrence of disease, alleviation of symptoms, diminishment of any direct or indirect pathological consequences of the disease, decreasing the rate of disease progression, amelioration or palliation of the disease state, and remission or improved prognosis. For example, with regard to IBD, "treatment" can refer to a decrease in the likelihood of developing IBD, a decrease in the rate of developing IBD, and a decrease in the severity of the disease. "Alleviation," "alleviating," or equivalents thereof, refer to both therapeutic treatment and prophylactic or preventative measures, wherein the object is to ameliorate, prevent, slow down (lessen), decrease or inhibit a disease or condition, e.g., the formation of atherosclerotic plaques. Those in need of treatment include those already with the disease or condition as well as those prone to having the disease or condition or those in whom the disease or condition is to be prevented.

An "individual" or "subject" is a mammal. Mammals include, but are not limited to, domesticated animals (e.g., cows, sheep, cats, dogs, and horses), primates (e.g., humans and non-human primates such as monkeys), rabbits, and rodents (e.g., mice and rats). In certain aspects, the individual or subject is a human.

In one aspect of the present invention, the pharmaceutical composition comprises a pharmaceutically acceptable diluent, excipient or carrier. The term "pharmaceutically acceptable", as used in connection with compositions of the invention, refers to molecular entities and other ingredients of such compositions that are physiologically tolerable and do not typically produce untoward reactions when administered to a mammal (e.g., human). The term "pharmaceutically acceptable" may also mean approved by a regulatory agency of the Federal or a state government or listed in the U.S. Pharmacopeia or other generally recognized pharmacopeia for use in mammals, and more particularly in humans. A "pharmaceutically acceptable carrier" refers to an ingredient in a pharmaceutical composition or formulation, other than an active ingredient, which is nontoxic to a subject. A pharmaceutically acceptable carrier includes, but is not limited to, a buffer, excipient, stabilizer, or preservative. Such pharmaceutically acceptable carriers may be sterile liquids, such as water, saline solutions, aqueous dextrose solutions, aqueous glycerol solutions, and oils, including those of petroleum, animal, vegetable or synthetic origin, such as peanut oil, soybean oil, mineral oil, sesame oil and the like. Suitable pharmaceutical carriers are described in "Remington's Pharmaceutical Sciences" by A. R. Gennaro, 20th Edition.

In one aspect of the present invention, the pharmaceutical composition is for use in treating or preventing an inflammatory disease or condition.

A "disorder," a "disease," or a "condition," as used interchangeably herein, is any condition that would benefit from treatment with a composition (e.g., a pharmaceutical composition) described herein, e.g., a composition (e.g., a pharmaceutical composition) that includes the fusion protein of the present invention. This includes chronic and acute disorders or diseases including those pathological conditions which predispose the mammal to the disorder in question. In some aspects, the disorder an IL-37 associated disorder. In some aspects, the inflammatory disease or condition is selected from the group consisting of inflammatory bowel disease; lupus erythematosus; arthritis; preferably rheumatoid arthritis; psoriasis, allergic rhinitis; Grave's disease; ankylosing spondylitis; ischema-reperfusion injury, preferably selected from the groups consisting of myocardial infarction and stroke; asthma; periodontal inflammation; diabetes and metabolic syndrome; cancer, preferably solid cancer types and atherosclerosis and Behcet's disease. In a preferred aspect of the present invention, the inflammatory disease or condition is inflammatory bowel disease.

The terms "inflammatory bowel disorder" "inflammatory bowel disease," and "IBD," as used interchangeably herein, are used herein in the broadest sense and includes all diseases and pathological conditions the pathogenesis of which involves recurrent inflammation in the intestine, including small intestine and colon. IBD includes, e.g., ulcerative colitis and Crohn's disease. IBD is not limited to UC and CD. The manifestations of the disease include but not limited to inflammation and a decrease in epithelial integrity in the intestine.

The following are examples of methods and compositions of the invention. It is understood that various other embodiments may be practiced, given the general description provided above.

Although the foregoing invention has been described in some detail by way of illustration and example for purposes of clarity of understanding, the descriptions and examples should not be construed as limiting the scope of the invention. The disclosures of all patent documents and scientific literature cited herein are expressly incorporated in their entirety by reference.

EXAMPLE

Production of a Desired Gene/Protein (e.g. An IL-37 Polypeptide Variants Comprising Substitution Mutation(s) of Amino Acid(s) and Fusion Proteins Comprising IL-37 Polypeptide and an Fc Region of an Antibody)

Molecular Biology Methods

Standard methods were used to manipulate DNA as described in Sambrook, J. et al., Molecular cloning: A laboratory manual (Cold Spring Harbor Laboratory Press, Cold Spring Harbor, New York, 1989). The molecular biological reagents were used according to the manufacturer's instructions.

Desired gene segments were prepared by chemical synthesis at Geneart (Regensburg, Germany). The synthesized gene fragments were cloned into an E. coli plasmid for propagation/amplification. Alternatively, short synthetic DNA fragments were assembled by annealing chemically synthesized oligonucleotides or via PCR. The respective oligonucleotides were prepared by metabion (Planegg-Martinsried, Germany). Alternatively, entire expression plasmids containing the desired cDNAs were prepared at Twist Bioscience (San Francisco, CA, USA). All DNA sequences of cloned and/or sub-cloned gene fragments were verified by DNA sequencing.

For the expression of a desired gene/protein (e.g. an IL-37 polypeptide, wild-type or mutated variant thereof, such as substitution mutation(s) of amino acid(s); or an IL-37 polypeptide, wild-type or mutated variant thereof, fused to e.g. a human Fc region (Fc fragment) of an IgG-Fc, wild-type or mutated variant thereof) in HEK293 cells, a transcription unit comprising the following functional elements is used:
the immediate early enhancer and promoter from the human cytomegalovirus (P-CMV) including intron A, a human heavy chain immunoglobulin 5'-untranslated region (5'UTR), a murine immunoglobulin heavy chain variable region signal sequence, a gene/protein to be expressed (e.g. an IL-37 polypeptide, or a fusion protein comprising an IL-37 polypeptide and a human Fc region of a human IgG, or mutated variants thereof), and the bovine growth hormone polyadenylation sequence (BGH pA).

Besides the expression unit/cassette including the desired gene to be expressed the basic/standard mammalian expression plasmid contains an origin of replication from the vector pUC18 which allows replication of this plasmid in E. coli, and a beta-lactamase gene which confers ampicillin resistance in E. coli.

For the expression of a desired gene/protein (e.g. an IL-37 polypeptide, wild-type or mutated variant thereof, such as substitution mutation(s) of amino acid(s); or an IL-37 polypeptide, wild-type or mutated variant thereof, fused to e.g. a human Fc region (Fc fragment) of an IgG-Fc, wild-type or mutated variant thereof) in E. coli cells, a transcription unit comprising the following functional elements is used:

a T5 promoter a lac operator a gene/protein to be expressed (e.g. an IL-37 polypeptide, or a fusion protein comprising an IL-37 polypeptide and a human Fc region of a human IgG, or mutated variants thereof)

a terminator

Besides the expression unit/cassette including the desired gene to be expressed the basic/standard E. coli expression plasmid contains an origin of replication from the vector pUC18 which allows replication of this plasmid in E. coli a lacI expression cassette to allow the inducible expression of a gene of interest a beta-lactamase expression cassette which confers ampicillin resistance in E. coli an URA3 expression cassette which allows antibiotics-free expression using complementation in an appropriate strain of E. coli.

Production of an IL-37 Polypeptide and a Fusion Protein Comprising an IL-37 Polypeptide and an Fc Region of an Antibody The recombinant IL-37 polypeptides consist of i) wild-type human IL-37 polypeptide or a mutant variant of human IL-37 polypeptide containing specific amino acid exchanges, and optionally a protein tag (e.g. His-tag, C-tag etc.) for the purpose of purification or enzymatic conjugation (Sortase-tag). Alternatively, the IL-37 polypeptides (wild-type or mutated variants) are genetically fused via a linker sequence to a human Fc region (Fc fragment) of an IgG or a mutated variant thereof.

The expression plasmids for the transient expression of soluble IL-37 polypeptides or fusion proteins comprising IL-37 polypeptide and an Fc region of an antibody in HEK293 cells comprise besides the IL-37 polypeptide expression cassette an origin of replication from the vector pUC18, which allows replication of this plasmid in E. coli, and a beta-lactamase gene which confers ampicillin resistance in E. coli.

The transcription unit of the IL-37 polypeptides comprise the following functional elements:

the immediate early enhancer and promoter from the human cytomegalovirus (P-CMV) including intron A, a human heavy chain immunoglobulin 5'-untranslated region (5'UTR), a murine immunoglobulin heavy chain signal sequence, an N-terminally truncated S. aureus sortase A encoding nucleic acid, and the bovine growth hormone polyadenylation sequence (BGH pA).

The expression plasmids for the expression of IL-37 polypeptides in E. coli cells comprise besides the IL-37 polypeptide expression cassette an origin of replication from the vector pUC18. This allows the replication of this plasmid in E. coli. Furthermore, it contains a beta-lactamase expression cassette that confers ampicillin resistance in E. coli, a lacI expression cassette to allow the inducible expression of a gene of interest, and an URA3 expression cassette, which allows antibiotics-free expression using complementation in appropriate strain of E. coli.

Expression of Fusion Protein Comprising Mutant Variants of IL-37 Polypeptide and an Fc Region of an Antibody in Mammalian Cells The recombinant production was performed by transient transfection of HEK293 cells (human embryonic kidney cell line 293-derived) cultivated in F17 Medium (Invitrogen, Carlsbad, CA, USA). Alternatively, the Expi293 Expression System (Invitrogen) was used. For the production of IL-37 fusion proteins containing an Fc region of an antibody and only one single IL-37 polypeptide (i.e. one single IL-37 moiety), cells were co-transfected with plasmids containing the respective IL-37 polypeptide and the Fc unit of an antibody (i.e., the IL-37-Fc unit) and a second plasmid encoding a non-fused Fc-fragment (i.e., non-fused Fc-unit), using the knob-into-hole technology. Transfection was performed by methods known in the art and as specified in the respective manufacturer's instructions. Cell culture supernatants were harvested three to seven (3-7) days after transfection. Supernatants were stored at reduced temperature (e.g. −80° C.).

Purification of IL-37 Polypeptide from Mammalian Culture

The IL-37 polypeptide containing culture supernatant was captured by affinity chromatography using HiTrap complete His-Tag (Roche, Basel, Switzerland) equilibrated with 50 mM $NaH_2PO_4$, 300 mM NaCl, pH 7.0. Unbound protein was removed by washing with equilibration buffer. The IL-37 polypeptide was eluted with a 10 CV gradient to 50 mM $NaH_2PO_4$, 300 mM NaCl, 500 mM Imidazol, pH 7.0. Size exclusion chromatography on Superdex 75™ (GE Healthcare, Chicago, IL, USA) was used as second purification step and monomeric protein fractions were pooled. The size exclusion chromatography was performed in 20 mM Histidin, 140 mM NaCl, pH 6.0. The concentration of the purified IL-37 polypeptide was determined by measuring the optical density (OD) at 280 nm with the OD at 320 nm as the background correction, using the molar extinction coefficient calculated on the basis of the amino acid sequence. Purity of the IL-37 polypeptide was analyzed by CE-SDS under denaturing and reducing conditions. Aggregate content was determined by SEC using a BioSuite™ HR analytical size-exclusion column (Waters, Milford, MA, USA). The purified protein was stored at −80° C.

Purification of IL-37-Fc Fusion Proteins from Mammalian Culture

Fusion protein (comprising an IL-37 polypeptide and an Fc region of an antibody) containing culture supernatant was captured by affinity chromatography using HiTrap MabSelectSuRe (GE Healthcare) equilibrated with 1×PBS (10 mM $Na_2HPO_4$, 1 mM $KH_2PO_4$, 137 mM NaCl and 2.7 mM KCl, pH 7.4). Unbound protein was removed by washing with equilibration buffer, and the IL-37-Fc fusion protein was eluted with 0.1 M citrate buffer, pH 2.8, which was immediately neutralized to pH 6.0 with 2 M Tris-base, pH 9.0. Size exclusion chromatography on Superdex 200™ (GE Healthcare) was used as second purification step and monomeric protein fractions were pooled. The size exclusion chromatography was performed in 20 mM Histidin, 140 mM NaCl, pH 6.0. The protein concentration of the purified IL-37-Fc fusion protein was determined by measuring the optical density (OD) at 280 nm with the OD at 320 nm as the background correction, using the molar extinction coefficient calculated on the basis of the amino acid sequence. Purity of the IL-37-Fc fusion protein was analyzed by CE-SDS under denaturing and reducing conditions. Aggregate content was determined by SEC using a BioSuite™ HR analytical size-exclusion column (Waters). The purified protein was stored at −80° C.

Expression of Mutant Variants of IL-37 Polypeptide in *E. coli* (Inclusion Bodies)

For the expression of mutant variants of IL-37 polypeptide (21 kDa) the *E. coli* host/vector system which enables an antibiotic-free plasmid selection by complementation of an *E. coli* auxotrophy (PyrF) was employed (EP 0 972 838 and U.S. Pat. No. 6,291,245).

The *E. coli* K12 strains CSPZ-25 (ΔpyrF) were transformed by electroporation with the expression plasmid D1AC9528 or DIAC7778. The transformed *E. coli* cells were first grown at 37° C. on agar plates. A colony picked from this plate was transferred to a 3 mL roller culture and grown at 37° C. to an optical density of 1-2 (measured at 578 nm). Then 1000 µl culture where mixed with 1000 µl sterile 86%-glycerol and immediately frozen at −80° C. for long time storage. The correct product expression of this clone was first verified in small scale shake flask experiments and analyzed with SDS-Page prior to the transfer to the 10 L fermenter.

Pre Cultivation:

For pre-cultivation 220 ml of chemical defined medium in a 1000 ml Erlenmeyer-flask with four baffles were inoculated with 1.0 ml out of a research seed bank ampoule. The cultivation was performed on a rotary shaker for 12 hours at 37° C. and 170 rpm until an optical density (578 nm) of >5 was obtained. The inoculum volume was calculated with Vinoc.=1000 mL*5/ODPC and is therefore dependent on the optical density of the pre cultivation to inoculate the batch medium of each bioreactor run with equal amount of cells.

Fermentation:

For fermentation in a 10l Biostat C, DCU3 fermenter (Sartorius, Melsungen, Germany) chemical defined batch medium was used. Starting with 4.2 l sterile batch medium plus 100 ml inoculum from the pre cultivation the batch fermentation was performed at 31° C., pH 6.9±0.2, 800 mbar back pressure and an initial aeration rate of 10 l/min. The relative value of dissolved oxygen (pO2) was kept at 50% throughout the fermentation by increasing the stirrer speed up to 1500 rpm. After the initially supplemented glucose was depleted, indicated by a steep increase in dissolved oxygen values, the fermentation entered the fed-batch mode with the start of the feed. The rate of feed 1 was increased stepwise with a predefined feeding profile from 90 to finally 210 g/h within 5.5 hours. When carbon dioxide off gas concentration leveled above 2% the aeration rate was constantly increased from 10 to 20 l/min within 5 hours. The expression of recombinant protein was induced by the addition of 2.4 g IPTG at an optical density of approx. 120. The target protein was expressed partially soluble within the cytoplasm.

After 24 hours of cultivation an optical density of 250 was achieved and the whole broth was cooled down to 4-8° C. The bacteria were harvested via centrifugation with a flow-through centrifuge (13,000 rpm, 13 l/h) and the obtained biomass was stored at −20° C. until further processing (cell disruption). The yield was 67 g dry cells per liter.

Analysis of Product Formation:

Samples drawn from the fermenter, one prior to induction and the others at dedicated time points after induction of protein expression were analyzed with SDS-Polyacrylamide gel electrophoresis. From every sample the same amount of cells (ODTarget=10) were suspended in 5 mL PBS buffer and disrupted via sonication on ice. Then 100 µL of each suspension were centrifuged (15,000 rpm, 5 minutes) and each supernatant was withdrawn and transferred to a separate vial. This was to discriminate between soluble and insoluble expressed target protein. To each supernatant (=soluble protein fraction) 100 µL and to each pellet (=insoluble protein fraction) 200 µL of SDS sample buffer (Laemmli, U.K., Nature 227 (1970) 680-685) were added. Samples were heated for 15 minutes at 95° C. under intense mixing to solubilize and reduce all proteins in the samples. After cooling to room temperature 5 µL of each sample were transferred to a 4-20% TGX Criterion Stain Free polyacrylamide gel (Bio-Rad). Additionally, 5 µl molecular weight standard (Precision Plus Protein Standard, Bio-Rad) were applied.

The electrophoresis was run for 60 Minutes at 200 V and thereafter the gel was transferred the GelDOC EZ Imager (Bio-Rad) and processed for 5 minutes with UV radiation. Gel images were analyzed using Image Lab analysis software (Bio-Rad). Relative quantification of protein expression was done by comparing the volume of the product bands to the volume of the 25 kDa band of the molecular weight standard.

Supernatant Preparation:

The supernatant preparations for purification of the 10 L fermentations were started with the re-suspension of the harvested bacteria cells in disruption buffer (50 mM NaP, 300 mM NaCl, 1 mM DTT, pH 7.0, "Complete" Protease Inhibitor). The buffer volume was 5 times the biomass wet weight re-suspended for homogenization at 900 bar (APV LAB60, 1 pass) to disrupt the bacteria. Suspension was then centrifuged and the obtained supernatant was immediately transferred to the DSP department for purification.

Purification of IL-37 Polypeptide from *E. coli* Cultures

Filtered lysate was loaded onto HiTrap complete His-Tag column (Roche) equilibrated in 50 mM $NaH_2PO_4$, 300 mM NaCl, 1 mM DTT pH 7.0. Unbound proteins were removed by washing with equilibration buffer. IL-37 polypeptide was eluted with a 10 CV gradient to 50 mM $NaH_2PO_4$, 300 mM NaCl, 1 mM DTT, 250 mM Imidazol, pH 7.0. Size exclusion chromatography on Superdex 75™ (GE Healthcare) was used as a polishing step and after monomeric protein fractions had been pooled. Size exclusion chromatography was run in 50 mM Tris-base, 150 mM NaCl, 5 mM $CaCl_2$), pH 7.5. The concentration of purified IL-37 polypeptide was determined via optical density (OD) at 280 nm, using the molar extinction coefficient calculated on the basis of the amino acid sequence. Purity of the IL-37 protein (i.e. the IL-37 polypeptide) was analyzed by CE-SDS under denaturing and reducing conditions. Aggregate content was determined by SEC using a BioSuite™ HR analytical size-exclusion column (Waters). The purified protein was stored at −80° C.

Enzymatic Conjugation of IL-37Polypeptide to an Fc Region of an Antibody

Purified human Fc was transferred into conjugation buffer (50 mM Tris-base, 150 mM NaCl, 5 mM $CaCl_2$), pH 7.5). For the sortase reaction a 5× molar excess of IL-37 polypeptide and a 0.8× molar excess of sortase enzyme (Roche) were used. After thorough mixing the reaction solution was incubated for 90 min at 25° C. After conjugation an affinity chromatography step using HiTrap complete His-Tag (Roche), equilibrated with 50 mM $NaH_2PO_4$, 300 mM NaCl, 1 mM DTT pH 7.0 was run. Here the desired fusion protein comprising IL-37 polypeptide and an Fc region of an antibody (i.e., IL37-Fc conjugate) was collected in the flow through. Pooled fractions of IL37-Fc fusion protein was diluted with bidest. $H_2O$ to a conductivity of about 3 ms/cm and loaded on a POROS HS 50 column (Thermo Fisher Scientific, Waltham, MA, USA) equilibrated with 20 mM Histidin, pH 5.6. Elution was done with a gradient of 20 CV to 20 mM Histidin, 1 M NaCl, pH 5.6 buffer. Size exclusion chromatography on Superdex 75™ (GE Healthcare) was used as a polishing step. The size exclusion chromatography was run in 20 mM Histidin, 140 mM NaCl, pH 6.0. The protein concentration of purified IL-37-Fc conjugate (i.e., the fusion protein) was determined via optical density (OD) at 280 nm, using the molar extinction coefficient calculated on the basis of the amino acid sequence. Purity of the IL-37 fusion protein was analyzed by CE-SDS under denaturing and reducing conditions. Aggregate content was determined by SEC using a BioSuite™ HR analytical size-exclusion column (Waters). The purified protein was stored at −80° C.

Proof of Intra IL37 Disulfide Bond C54-C94 by Mass Spectrometry

In order to detect the closed disulfide bonds of the fusion protein, a disulfide mapping experiment was conducted. Here, the sample to be investigated was denatured (6.5 M final conc. guanidinium hydrochloride) and S-carboxymethylated to cap free cysteines. Subsequently, it was buffer exchanged to digestion buffer (50 mM Tris, pH 6.9), followed by a tryptic digestion (16 h, 37° C.). The reaction was stopped with 10% formic acid. The sample was further analyzed by UHPLC-MS/MS using a nanoAcquity UPLC (Waters) coupled to an Orbitrap Fusion mass spectrometer (Thermo Fisher Scientific). For data interpretation and visualization, PMI (Protein Metrics Inc.) and Xcalibur software packages were used.

The formed disulfide bond between Cys54 and Cys94 in the IL37 moiety of the fusion protein was shown by detection of the corresponding linked tryptic peptides GEFLLYCDK (C54) and AQVGSWNMLECAAHPGWFIR (C94) with a mass of 3356.55 Da.

In Vitro Stability Testing

For thermal stability testing of the purified proteins (P1AE1164, P1AE1771, P1AE2450, P1AE3281, P1AE4682 and P1AF2874) the Uncle device was used (UNCHAINED LABS, Boston, MA, USA). Static light scattering at 266 nm and 473 nm and in parallel intrinsic fluorescence is hereby used to determine aggregation temperature (Tagg) and melting temperature (Tm) of the purified proteins. A temperature ramp from 30° C. to 90° C. in 0.1° C./min steps was run. Glass cuvettes with 9 μl volume per samples were used and the concentration was 1 mg/mL in 20 mM Histidin, 140 mM NaCl, pH 6.0 buffer. For analysis, the software UNcle analysis (UNCHAINED LABS) was used.

For molecular assessment the purified IL-37 polypeptides and the fusion proteins as shown in Table 1 were transferred in two different buffers at a final concentration of 1.0 mg/ml. Buffer A: 1×PBS (10 mM $Na_2HPO_4$, 1 mM $KH_2PO_4$, 137 mM NaCl and 2.7 mM KCl. pH 7.4) and buffer B: 20 mM Histidin, 140 mM NaCl, pH 6.0. For dialyses, D-Tube™ Dialyzer Mini MWCO 6-8 kDa (Millipore, Burlington, MA, USA) was used. Buffer A samples were incubated at 37° C. and buffer B sample at 40° C., each for 14 days. After incubation, IL-37 polypeptides and fusion proteins as shown in Table 1 were analyzed by SEC using a BioSuite™ HR analytical size-exclusion column (Waters) and by CE-SDS under denaturing and reducing conditions.

TABLE 1

Biophysical stability

| IDs | Initial purity by SEC [% Main peak] | Stability in buffer A [% Main peak by SEC] | Stability in buffer B [% Main peak by SEC] | Initial purity by CE-SDS [% Main peak] | Stability in buffer A [% Main peak by CE-SDS] | Stability in buffer B [% Main peak by CE-SDS] |
|---|---|---|---|---|---|---|
| P1AE1164 | 99.0 | n.d. | n.d. | 96.6 | n.d. | n.d. |
| P1AE1771 | 99.2 | 35.7 | 98.5 | 95.7 | <5 | 91.4 |
| P1AE2450 | 96.2 | n.d. | n.d. | 98.0 | n.d. | n.d. |
| P1AE3281 | 98.0 | n.d. | n.d. | 97.1 | n.d. | n.d. |
| P1AE4682 | 98.2 | 93.4 | 94.8 | 99.0 | 97.1 | 98.4 |
| P1AF2874 | 98.7 | 85.0 | 89.0 | 99.0 | 93.0 | 97.0 |

TABLE 2

Thermal stability

| Measure | P1AE1164 | P1AE1771 | P1AE2450 | P1AE3281 | P1AE4682 | P1AF2874 |
|---|---|---|---|---|---|---|
| Tagg [° C.] | 42.4 | 75.2 | n.d. | 73.0 | 73.5 | 72.1 |
| Tm [° C.] | 57.9* | 56.8 | n.d. | 56.5 | 57.5 | 56.9 |

*Aggregation is instant upon unfolding.

Bioactivity Testing (HK-2 Assay)

To test IL-37 mutant variants (P1AE1164, P1AE1771, P1AE2450, P1AE3281, P1AE4682 and P1AF2874) for inhibition of Il-8 release of LPS-stimulated HK-2 cells-IL-37 variants were diluted in assay medium (RPMI medium 1640 (Anprotec; Cat-No. AC-LM-0060)+2 mM L-Glutamine (L-Glutamine 200 mM, Gibco, Cat-No. 25030-024)+ 1'ITS (ITS 100×, Sigma, 13146)+0.1% BSA (MACS BSA Stock Solution, Miltenyi, 130-031-376) to a 2-fold final concentration of 2.5 µM. A serial dilution in steps of 1:3 was prepared and 50 µL per well of the IL-37 mutant variants' dilutions were transferred to a 96-well assay plate. Cells were harvested by trypsinization (Trypsin, PAN, P10-023100) and pelleted at 300 g for 5 min. After resuspension in assay medium to a concentration of 4.0E+05 cells/mL, 25 µL per well were transferred to the assay plate resulting in a total number of 1.0E+04 cells per well. LPS (Sigma, L2654) was diluted to 2 µg/mL in assay medium. 25 µL per well transferred to the assay plate (final concentration 0.5 g/mL) and plates were incubated overnight in a cell culture incubator (37° C., 5% CO2). The next day, the plate was centrifuged at 300 g for 3 min. Supernatants were collected and the IL-8 concentration was determined via human IL-8 uncoated ELISA Kit according to the manufacturer's instructions (Human IL-8 uncoated ELISA Kit, Invitrogen, 88-8086-22).

TABLE 3

| Biological activity in HK-2 cells | | | | | | |
|---|---|---|---|---|---|---|
| Measure | P1AE1164 | P1AE1771 | P1AE2450 | P1AE3281 | P1AE4682 | P1AF2874 |
| EC50 [nM] | 182.0 | 82.3 | 63.9 | 52.8 | 168.2 | 100.9 |

Bioactivity Testing (Human PBMCs)

Peripheral blood mononuclear cells (PBMCs) from healthy donors were treated with different mutant variants of IL-37 (P1AE1164, P1AE2450 P1AE3281 and P1AE1771) as described in Nold M., et al. (2003) [IL-18BPa:Fc cooperates with immunosuppressive drugs in human whole blood. Biochem Pharmacol 66, 505-510] and in Ellisdon, Nold-Petry et al, (2017) [Science Immunology Vol. 2, Issue 8, eaaj1548]. Briefly, PBMCs were isolated from peripheral venous blood of healthy volunteers by density gradient centrifugation as described in Nold M., et al. (2003) [IL-18BPa:Fc cooperates with immunosuppressive drugs in human whole blood. Biochem Pharmacol 66, 505-510]. PBMCs were plated as 3 replicates in RPMI medium containing 1% v/v human serum and 1:500 MycoZap PR (Lonza), then pre-treated for 30 min with either vehicle or mutant variant IL-37 (concentrations between 10 ng/ml to 1 µg/ml), before stimulation with 1 ng/ml LPS for 20 h. Supernatants were then subjected to IL-1beta analysis by Alphalisa (Perkin Elmer) according to the manufacturers' instructions. The suppression of IL-1beta by IL-37 in % change to LPS for individual healthy donor responders was calculated.

FIG. 3 shows suppression of the secretion of IL-1β (IL-1beta) from freshly isolated human PBMCs after stimulation with LPS. IL-37 variants were added at the indicated concentrations 30 mins before the addition of 1 ng/ml LPS and reduced the amount of secreted IL-1β (IL-1beta) by ca. 20% when the cytokine was measured 20 h later. This indicates anti-inflammatory activity of the tested variants.

Bioactivity Testing (Human PBMCs)

Peripheral blood mononuclear cells (PBMCs) from healthy donors or patients (Respiratory Diseases RESP, Systemic lupus erythematosus, SLE, Rheumatoid Arthritis RA, Inflammatory bowel Disease, IBD,) were treated with IL-37 variant P1AE4682 as described in Nold M., et al. (2003) [IL-18BPa:Fc cooperates with immunosuppressive drugs in human whole blood. Biochem Pharmacol 66, 505-510] and in Ellisdon, Nold-Petry et al, (2017) Science Immunology Vol. 2, Issue 8, eaaj1548]. Briefly, PBMCs were isolated from peripheral venous blood of either patients or healthy volunteers by density gradient centrifugation as described in Nold M., et al. (2003) [IL-18BPa:Fc cooperates with immunosuppressive drugs in human whole blood. Biochem Pharmacol 66, 505-510]. PBMCs were plated as 3 replicates in RPMI medium containing 1% v/v human serum and 1:500 MycoZap PR (Lonza), then pre-treated for 30 min with either vehicle or variant IL-37 (concentrations between 100 µg/ml to 0.01 pg/ml), before stimulation with 500 µM Loxoribine for 20 h. Supernatants were then subjected to IL-6 analysis by Alphalisa (Perkin Elmer) according to the manufacturers' instructions. The suppression of IL-6 by IL-37 in % change to Loxoribine for individual healthy donor responders and patients was calculated.

FIG. 4 shows suppression of the secretion of IL-6 from freshly isolated human healthy donor and patient derived PBMCs after stimulation with Loxoribine. A stabilized IL-37-Fc fusion was added at the indicated concentrations 30 mins before the addition of 500 µM Loxoribine and reduced the amount of secreted IL-6 by ca. 20-25% when the cytokine was measured 20 h later. This indicates anti-inflammatory activity of the tested variant in various diseases: RESP (Respiratory Diseases), SLE (Systemic lupus erythematosus), RA (Rheumatoid Arthritis), IBD (Inflammatory bowel Disease).

Bioactivity Testing (C57Bl/6 WT Mice)

C57Bl/6 WT mice were injected subcutaneously (s.c.) with different concentrations of either P1AE3281-005, P1AE1771-016, P1AE4682 or vehicle. One hour later mice received by intravenous tail vein injection 100 mg/kg loxoribine (Jomar life research). Room temperature and humidity were monitored continuously.

Two hours after loxoribine injections, mice were anesthetized, and serum was obtained by cardiac bleeding into BD serum tubes. Serum murine IL-6 was determined by Alphalisa (Perkin Elmer) and IFNalpha was determined by ELISA (Perkin Elmer) according to the manufacturers' instructions.

FIGS. 5A and B show suppression of the secretion of IL-6 in C57BV6 WT mice after stimulation with Loxoribine. Various IL-37-Fc fusions were injected subcutaneously at the indicated concentrations followed by injection of Loxoribene at a concentration of 100 mg/kg. The reduction of serum IL-6 2 h later by ca. 40-70% indicates strong anti-inflammatory activity of the variants tested.

TABLE 4

Sequence overview

| ID of IL-37 and fusion protein thereof | Brief description | Host | Chain #1 | Chain #2 |
|---|---|---|---|---|
| — | wt IL-37 | — | SEQ ID NO. 1:<br>MSFVGENSGVKMGSEDWEKDEPQCCLEDPAGSPL<br>EPGPSLPTMNFVHTSPKVKNLNPKKFSIHDQDHKVL<br>VLDSGNLIAVPDKNYIRPEIFFALASSLSSASAEKGS<br>PILLGVSKGEFCLYCDKDKGQSHPSLQLKKEKLMK<br>LAAQKESARRPFIFYRAQVGSWNMLESAAHPGWFI<br>CTSCNCNEPVGVTDKFENRKHIEFSFQPVCKAEMSP<br>SEVSD | |
| P1AA1458 | wt IL-37 (46-218) with His-tag & C-tag | HEK | SEQ ID NO. 2:<br>VHTSPKVKNLNPKKFSIHDQDHKVLVLDSGNLIAV<br>PDKNYIRPEIFFALASSLSSASAEKGSPILLGVSKGEF<br>CLYCDKDKGQSHPSLQLKKEKLMKLAAQKESARR<br>PFIFYRAQVGSWNMLESAAHPGWFICTSCNCNEPV<br>GVTDKFENRKHIEFSFQPVCKAEMSPSEVSDGGGGS<br>HHHHHHEPEA | — |
| P1AA1459 | wt IL-37 (46-218) | HEK | SEQ ID NO. 3:<br>VHTSPKVKNLNPKKFSIHDQDHKVLVLDSGNLIAV<br>PDKNYIRPEIFFALASSLSSASAEKGSPILLGVSKGEF<br>CLYCDKDKGQSHPSLQLKKEKLMKLAAQKESARR<br>PFIFYRAQVGSWNMLESAAHPGWFICTSCNCNEPV<br>GVTDKFENRKHIEFSFQPVCKAEMSPSEVSD | — |
| P1AA1457 | human IL-37 (46-218) fused C-terminally to a human Fc on both heavy chains; contains cleavage sites to release IL37 | HEK | SEQ ID NO. 4:<br>VHTSPKVKNLNPKKFSIHDQDHKVLVLDSGNLIAV<br>PDKNYIRPEIFFALASSLSSASAEKGSPILLGVSKGEF<br>CLYCDKDKGQSHPSLQLKKEKLMKLAAQKESARR<br>PFIFYRAQVGSWNMLESAAHPGWFICTSCNCNEPV<br>GVTDKFENRKHIEFSFQPVCKAEMSPSEVSDGGGGS<br>HHHHHHEPEAGGGGSGGGGSLEVLFQGPGGGGSD<br>KTHTCPPCPAPELLGGPSVFLFPPKPKDTLMISRTPE<br>VTCVVVDVSHEDPEVKFNWYVDGVEVHNAKTKPR<br>EEQYNSTYRVVSVLTVLHQDWLNGKEYKCKVSNK<br>ALPAPIEKTISKAKGQPREPQVYTLPPSRDELTKNQ<br>VSLTCLVKGFYPSDIAVEWESNGQPENNYKTTPPVL<br>DSDGSFFLYSKLTVDKSRWQQGNVFSCSVMHEAL<br>HNHYTQKSLSLSPGK | SEQ ID NO. 5:<br>VHTSPKVKNLNPKKFSIHDQDHKVLVLDSGNLIAV<br>PDKNYIRPEIFFALASSLSSASAEKGSPILLGVSKGEF<br>CLYCDKDKGQSHPSLQLKKEKLMKLAAQKESARR<br>PFIFYRAQVGSWNMLESAAHPGWFICTSCNCNEPV<br>GVTDKFENRKHIEFSFQPVCKAEMSPSEVSDGGGGS<br>HHHHHHEPEAGGGGSGGGGSLEVLFQGPGGGGSD<br>KTHTCPPCPAPELLGGPSVFLFPPKPKDTLMISRTPE<br>VTCVVVDVSHEDPEVKFNWYVDGVEVHNAKTKPR<br>EEQYNSTYRVVSVLTVLHQDWLNGKEYKCKVSNK<br>ALPAPIEKTISKAKGQPREPQVYTLPPSRDELTKNQ<br>VSLTCLVKGFYPSDIAVEWESNGQPENNYKTTPPVL<br>DSDGSFFLYSKLTVDKSRWQQGNVFSCSVMHEAL<br>HNHYTQKSLSLSPGK |
| P1AD9012 | wt IL-37 (46-218) fused C-terminally to a human Fc only on once HC (KiH) | HEK | SEQ ID NO. 6:<br>DKTHTCPPCPAPEAAGGPSVFLFPPKPKDTLMISRTP<br>EVTCVVVDVSHEDPEVKFNWYVDGVEVHNAKTKP<br>REEQYNSTYRVVSVLTVLHQDWLNGKEYKCKVSN<br>KALGAPIEKTISKAKGQPREPQVCTLPPSRDELTKN<br>QVSLSCAVKGFYPSDIAVEWESNGQPENNYKTTPP<br>VLDSDGSFFLVSKLTVDKSRWQQGNVFSCSVMHE<br>ALHNRFTQKSLSLSPGK | SEQ ID NO. 7:<br>VHTSPKVKNLNPKKFSIHDQDHKVLVLDSGNLIAV<br>PDKNYIRPEIFFALASSLSSASAEKGSPILLGVSKGEF<br>CLYCDKDKGQSHPSLQLKKEKLMKLAAQKESARR<br>PFIFYRAQVGSWNMLESAAHPGWFICTSCNCNEPV<br>GVTDKFENRKHIEFSFQPVCKAEMSPSEVSDGGGGS<br>GGGGSGGGGSDKTHTCPPCPAPEAAGGPSVFLFPPK<br>PKDTLMISRTPEVTCVVVDVSHEDPEVKFNWYVDG<br>VEVHNAKTKPREEQYNSTYRVVSVLTVLHQDWLN<br>GKEYKCKVSNKALGAPIEKTISKAKGQPREPQVYT<br>LPPCRDELTKNQVSLWCLVKGFYPSDIAVEWESNG<br>QPENNYKTTPPVLDSDGSFFLYSKLTVDKSRWQQG<br>NVFSCSVMHEALHNHYTQKSLSLSPGK |
| P1AD9013 | wt IL-37 (46-218) fused N-terminally to a human Fc only on once HC (KiH) | HEK | SEQ ID NO. 8:<br>DKTHTCPPCPAPEAAGGPSVFLFPPKPKDTLMISRTP<br>EVTCVVVDVSHEDPEVKFNWYVDGVEVHNAKTKP<br>REEQYNSTYRVVSVLTVLHQDWLNGKEYKCKVSN<br>KALGAPIEKTISKAKGQPREPQVCTLPPSRDELTKN<br>QVSLSCAVKGFYPSDIAVEWESNGQPENNYKTTPP<br>VLDSDGSFFLVSKLTVDKSRWQQGNVFSCSVMHE<br>ALHNRFTQKSLSLSPGK | SEQ ID NO. 9:<br>DKTHTCPPCPAPEAAGGPSVFLFPPKPKDTLMISRTP<br>EVTCVVVDVSHEDPEVKFNWYVDGVEVHNAKTKP<br>REEQYNSTYRVVSVLTVLHQDWLNGKEYKCKVSN<br>KALGAPIEKTISKAKGQPREPQVYTLPPCRDELTKN<br>QVSLWCLVKGFYPSDIAVEWESNGQPENNYKTTPP<br>VLDSDGSFFLYSKLTVDKSRWQQGNVFSCSVMHE<br>ALHNHYTQKSLSLSPGGGSGGGGSGGGGSGGGGS<br>VHTSPKVKNLNPKKFSIHDQDHKVLVLDSGNLIAV<br>PDKNYIRPEIFFALASSLSSASAEKGSPILLGVSKGEF<br>CLYCDKDKGQSHPSLQLKKEKLMKLAAQKESARR<br>PFIFYRAQVGSWNMLESAAHPGWFICTSCNCNEPV<br>GVTDKFENRKHIEFSFQPVCKAEMSPSEVSD |

TABLE 4-continued

Sequence overview

| ID of IL-37 and fusion protein thereof | Brief description | Host | Chain #1 | Chain #2 |
|---|---|---|---|---|
| P1AD9823 | Y85A, C181S, C183S, C207S IL-37 (46-218) fused C-terminally to a human Fc only on once HC (KiH) | HEK | SEQ ID NO: 10:<br>DKTHTCPPCPAPEAAGGPSVFLFPPKPKDTLMISRTP EVTCVVVDVSHEDPEVKFNWYVDGVEVHNAKTKP REEQYNSTYRVVSVLTVLHQDWLNGKEYKCKVSN KALGAPIEKTISKAKGQPREPQVCTLPPSRDELTKN QVSLSCAVKGFYPSDIAVEWESNGQPENNYKTTPP VLDSDGSFFLVSKLTVDKSRWQQGNVFSCSVMHE ALHNRFTQKSLSLSPGK | SEQ ID NO: 11:<br>VHTSPKVKNLNPKKFSIHDQDHKVLVLDSGNLIAV PDKNAIRPEIFFALASSLSSASAEKGSPILLGVSKGEF CLYCDKDKGQSHPSLQLKKEKLMKLAAQKESARR PFIFYRAQVGSWNMLESAAHPGWFICTSSNSNEPVG VTDKFENRKHIEFSFQPVSKAEMSPSEVSDGGGGSG GGGSGGGGSDKTHTCPPCPAPEAAGGPSVFLFPPKP KDTLMISRTPEVTCVVVDVSHEDPEVKFNWYVDG VEVHNAKTKPREEQYNSTYRVVSVLTVLHQDWLN GKEYKCKVSNKALGAPIEKTISKAKGQPREPQVYT LPPCRDELTKNQVSLWCLVKGFYPSDIAVEWESNG QPENNYKTTPPVLDSDGSFFLYSKLTVDKSRWQQG NVFSCSVMHEALHNHYTQKSLSLSPGK |
| P1AD9824 | Y85A, C181S, C183S, C207S IL-37 (46-218) fused N-terminally to a human Fc only on once HC (KiH) | HEK | SEQ ID NO: 12:<br>DKTHTCPPCPAPEAAGGPSVFLFPPKPKDTLMISRTP EVTCVVVDVSHEDPEVKFNWYVDGVEVHNAKTKP REEQYNSTYRVVSVLTVLHQDWLNGKEYKCKVSN KALGAPIEKTISKAKGQPREPQVCTLPPSRDELTKN QVSLSCAVKGFYPSDIAVEWESNGQPENNYKTTPP VLDSDGSFFLVSKLTVDKSRWQQGNVFSCSVMHE ALHNRFTQKSLSLSPGK | SEQ ID NO: 13:<br>DKTHTCPPCPAPEAAGGPSVFLFPPKPKDTLMISRTP EVTCVVVDVSHEDPEVKFNWYVDGVEVHNAKTKP REEQYNSTYRVVSVLTVLHQDWLNGKEYKCKVSN KALGAPIEKTISKAKGQPREPQVYTLPPCRDELTKN QVSLWCLVKGFYPSDIAVEWESNGQPENNYKTTPP VLDSDGSFFLYSKLTVDKSRWQQGNVFSCSVMHE ALHNHYTQKSLSLSPGGGSGGGGSGGGGSGGGGS VHTSPKVKNLNPKKFSIHDQDHKVLVLDSGNLIAV PDKNAIRPEIFFALASSLSSASAEKGSPILLGVSKGEF CLYCDKDKGQSHPSLQLKKEKLMKLAAQKESARR PFIFYRAQVGSWNMLESAAHPGWFICTSSNSNEPVG VTDKFENRKHIEFSFQPVSKAEMSPSEVSD |
| P1AE1163 | Y85A, C181S, C183S, C207S IL-37 (46-218) with N-terminal Sortase tag | E. coli | SEQ ID NO: 14:<br>MGGGVHTSPKVKNLNPKKFSIHDQDHKVLVLDSG NLIAVPDKNAIRPEIFFALASSLSSASAEKGSPILLGV SKGEFCLYCDKDKGQSHPSLQLKKEKLMKLAAQK ESARRPFIFYRAQVGSWNMLESAAHPGWFICTSSNS NEPVGVTDKFENRKHIEFSFQPVSKAEMSPSEVSDG SEPEA | — |
| P1AE1164 | Y85A, C181S, C183S, C207S IL-37 (46-218) with C-terminal Sortase tag | E. coli | SEQ ID NO: 15:<br>MVHTSPKVKNLNPKKFSIHDQDHKVLVLDSGNLIA VPDKNAIRPEIFFALASSLSSASAEKGSPILLGVSKGE FCLYCDKDKGQSHPSLQLKKEKLMKLAAQKESAR RPFIFYRAQVGSWNMLESAAHPGWFICTSSNSNEPV GVTDKFENRKHIEFSFQPVSKAEMSPSEVSDGSLPE TGGSGHHHHHH | — |
| P1AE1771 | Y85A, C181S, C183S, C207S IL-37 (46-218) Sortase conjugated to human Fc (P1AD9547) from HEK | E. coli + HEK | SEQ ID NO: 16:<br>MVHTSPKVKNLNPKKFSIHDQDHKVLVLDSGNLIA VPDKNAIRPEIFFALASSLSSASAEKGSPILLGVSKGE FCLYCDKDKGQSHPSLQLKKEKLMKLAAQKESAR RPFIFYRAQVGSWNMLESAAHPGWFICTSSNSNEPV GVTDKFENRKHIEFSFQPVSKAEMSPSEVSDGSLPE TGGGDKTHTCPPCPAPEAAGGPSVFLFPPKPKDTLM ISRTPEVTCVVVDVSHEDPEVKFNWYVDGVEVHN AKTKPREEQYNSTYRVVSVLTVLHQDWLNGKEYK CKVSNKALGAPIEKTISKAKGQPREPQVCTLPPSRD ELTKNQVSLSCAVKGFYPSDIAVEWESNGQPENNY KTTPPVLDSDGSFFLVSKLTVDKSRWQQGNVFSCS VMHEALHNRFTQKSLSLSPGK | SEQ ID NO: 17:<br>DKTHTCPPCPAPEAAGGPSVFLFPPKPKDTLMISRTP EVTCVVVDVSHEDPEVKFNWYVDGVEVHNAKTKP REEQYNSTYRVVSVLTVLHQDWLNGKEYKCKVSN KALGAPIEKTISKAKGQPREPQVYTLPPCRDELTKN QVSLWCLVKGFYPSDIAVEWESNGQPENNYKTTPP VLDSDGSFFLYSKLTVDKSRWQQGNVFSCSVMHE ALHNHYTQKSLSLSPGK |
| P1AE2450 | C181S, C183S, C207S IL-37 (46-218) with C-terminal Sortase tag | E. coli | SEQ ID NO: 18:<br>MVHTSPKVKNLNPKKFSIHDQDHKVLVLDSGNLIA VPDKNYIRPEIFFALASSLSSASAEKGSPILLGVSKGE FCLYCDKDKGQSHPSLQLKKEKLMKLAAQKESAR RPFIFYRAQVGSWNMLESAAHPGWFICTSSNSNEPV GVTDKFENRKHIEFSFQPVSKAEMSPSEVSDGSLPE TGGSGHHHHHH | — |

TABLE 4-continued

Sequence overview

| ID of IL-37 and fusion protein thereof | Brief description | Host | Chain #1 | Chain #2 |
|---|---|---|---|---|
| P1AE3281 | C181S, C183S, C207S IL-37 (46-218) Sortase conjugated to human Fc (P1AD9547) from HEK | E. coli + HEK | SEQ ID NO. 19: MVHTSPKVKNLNPKKFSIHDQDHKVLVLDSGNLIA VPDKNYIRPEIFFALASSLSSASAEKGSPILLGVSKGE FCLYCDKDKGQSHPSLQLKKEKLMKLAAQKESAR RPFIFYRAQVGSWNMLESAAHPGWFICTSSNSNEPV GVTDKFENRKHIEFSFQPVSKAEMSPSEVSDGSLPE TGGGDKTHTCPPCPAPEAAGGPSVFLFPPKPKDTLM ISRTPEVTCVVVDVSHEDPEVKFNWYVDGVEVHN AKTKPREEQYNSTYRVVSVLTVLHQDWLNGKEYK CKVSNKALGAPIEKTISKAKGQPREPQVCTLPPSRD ELTKNQVSLSCAVKGFYPSDIAVEWESNGQPENNY KTTPPVLDSDGSFFLVSKLTVDKSRWQQGNVFSCS VMHEALHNRFTQKSLSLSPGK | SEQ ID NO. 20: DKTHTCPPCPAPEAAGGPSVFLFPPKPKDTLMISRTP EVTCVVVDVSHEDPEVKFNWYVDGVEVHNAKTKP REEQYNSTYRVVSVLTVLHQDWLNGKEYKCKVSN KALGAPIEKTISKAKGQPREPQVYTLPPCRDELTKN QVSLWCLVKGFYPSDIAVEWESNGQPENNYKTTPP VLDSDGSFFLYSKLTVDKSRWQQGNVFSCSVMHE ALHNHYTQKSLSLSPGK |
| P1AE3794 | Y85A, C181S, C183S, C207S IL-37 (46-218) with C-terminal Sortase tag | HEK | SEQ ID NO. 21: VHTSPKVKNLNPKKFSIHDQDHKVLVLDSGNLIAV PDKNAIRPEIFFALASSLSSASAEKGSPILLGVSKGEF CLYCDKDKGQSHPSLQLKKEKLMKLAAQKESARR PFIFYRAQVGSWNMLESAAHPGWFICTSSNSNEPVG VTDKFENRKHIEFSFQPVSKAEMSPSEVSDGSLPET GGSGHHHHHH | — |
| P1AE4672 | Y85A, C119I, C181S, C183S, C207S IL-37 (46-218) fused to human Fc | HEK | SEQ ID NO. 22: DKTHTCPPCPAPEAAGGPSVFLFPPKPKDTLMISRTP EVTCVVVDVSHEDPEVKFNWYVDGVEVHNAKTKP REEQYNSTYRVVSVLTVLHQDWLNGKEYKCKVSN KALGAPIEKTISKAKGQPREPQVCTLPPSRDELTKN QVSLSCAVKGFYPSDIAVEWESNGQPENNYKTTPP VLDSDGSFFLVSKLTVDKSRWQQGNVFSCSVMHE ALHNRFTQKSLSLSPGK | SEQ ID NO. 23: VHTSPKVKNLNPKKFSIHDQDHKVLVLDSGNLIAV PDKNAIRPEIFFALASSLSSASAEKGSPILLGVSKGEF ILYCDKDKGQSHPSLQLKKEKLMKLAAQKESARRP FIFYRAQVGSWNMLESAAHPGWFICTSSNSNEPVG VTDKFENRKHIEFSFQPVSKAEMSPSEVSDGGGGSG GGGSGGGGSDKTHTCPPCPAPEAAGGPSVFLFPPKP KDTLMISRTPEVTCVVVDVSHEDPEVKFNWYVDG VEVHNAKTKPREEQYNSTYRVVSVLTVLHQDWLN GKEYKCKVSNKALGAPIEKTISKAKGQPREPQVYT LPPCRDELTKNQVSLWCLVKGFYPSDIAVEWESNG QPENNYKTTPPVLDSDGSFFLYSKLTVDKSRWQQG NVFSCSVMHEALHNHYTQKSLSLSPGK |
| P1AE4674 | Y85A, C122L, C181S, C183S, C207S IL-37 (46-218) fused to human Fc | HEK | SEQ ID NO. 24: DKTHTCPPCPAPEAAGGPSVFLFPPKPKDTLMISRTP EVTCVVVDVSHEDPEVKFNWYVDGVEVHNAKTKP REEQYNSTYRVVSVLTVLHQDWLNGKEYKCKVSN KALGAPIEKTISKAKGQPREPQVCTLPPSRDELTKN QVSLSCAVKGFYPSDIAVEWESNGQPENNYKTTPP VLDSDGSFFLVSKLTVDKSRWQQGNVFSCSVMHE ALHNRFTQKSLSLSPGK | SEQ ID NO. 25: VHTSPKVKNLNPKKFSIHDQDHKVLVLDSGNLIAV PDKNAIRPEIFFALASSLSSASAEKGSPILLGVSKGEF CLYLDKDKGQSHPSLQLKKEKLMKLAAQKESARR PFIFYRAQVGSWNMLESAAHPGWFICTSSNSNEPVG VTDKFENRKHIEFSFQPVSKAEMSPSEVSDGGGGSG GGGSGGGGSDKTHTCPPCPAPEAAGGPSVFLFPPKP KDTLMISRTPEVTCVVVDVSHEDPEVKFNWYVDG VEVHNAKTKPREEQYNSTYRVVSVLTVLHQDWLN GKEYKCKVSNKALGAPIEKTISKAKGQPREPQVYT LPPCRDELTKNQVSLWCLVKGFYPSDIAVEWESNG QPENNYKTTPPVLDSDGSFFLYSKLTVDKSRWQQG NVFSCSVMHEALHNHYTQKSLSLSPGK |
| P1AE4675 | Y85A, C178A, C181S, C183S, C207S IL-37 (46-218) fused to human Fc | HEK | SEQ ID NO. 26: DKTHTCPPCPAPEAAGGPSVFLFPPKPKDTLMISRTP EVTCVVVDVSHEDPEVKFNWYVDGVEVHNAKTKP REEQYNSTYRVVSVLTVLHQDWLNGKEYKCKVSN KALGAPIEKTISKAKGQPREPQVCTLPPSRDELTKN QVSLSCAVKGFYPSDIAVEWESNGQPENNYKTTPP VLDSDGSFFLVSKLTVDKSRWQQGNVFSCSVMHE ALHNRFTQKSLSLSPGK | SEQ ID NO. 27: VHTSPKVKNLNPKKFSIHDQDHKVLVLDSGNLIAV PDKNAIRPEIFFALASSLSSASAEKGSPILLGVSKGEF CLYCDKDKGQSHPSLQLKKEKLMKLAAQKESARR PFIFYRAQVGSWNMLESAAHPGWFIATSSNSNEPV GVTDKFENRKHIEFSFQPVSKAEMSPSEVSDGGGGS GGGGSGGGGSDKTHTCPPCPAPEAAGGPSVFLFPPK PKDTLMISRTPEVTCVVVDVSHEDPEVKFNWYVDG VEVHNAKTKPREEQYNSTYRVVSVLTVLHQDWLN GKEYKCKVSNKALGAPIEKTISKAKGQPREPQVYT LPPCRDELTKNQVSLWCLVKGFYPSDIAVEWESNG QPENNYKTTPPVLDSDGSFFLYSKLTVDKSRWQQG NVFSCSVMHEALHNHYTQKSLSLSPGK |

TABLE 4-continued

Sequence overview

| ID of IL-37 and fusion protein thereof | Brief description | Host | Chain #1 | Chain #2 |
|---|---|---|---|---|
| P1AE4676 | Y85A, C178M, C181S, C183S, C207S IL-37 (46-218) fused to human Fc | HEK | SEQ ID NO. 28: DKTHTCPPCPAPEAAGGPSVFLFPPKPKDTLMISRTP EVTCVVVDVSHEDPEVKFNWYVDGVEVHNAKTKP REEQYNSTYRVVSVLTVLHQDWLNGKEYKCKVSN KALGAPIEKTISKAKGQPREPQVCTLPPSRDELTKN QVSLSCAVKGFYPSDIAVEWESNGQPENNYKTTPP VLDSDGSFFLVSKLTVDKSRWQQGNVFSCSVMHE ALHNRFTQKSLSLSPGK | SEQ ID NO. 29: VHTSPKVKNLNPKKFSIHDQDHKVLVLDSGNLIAV PDKNAIRPEIFFALASSLSSASAEKGSPILLGVSKGEF CLYCDKDKGQSHPSLQLKKEKLMKLAAQKESARR PFIFYRAQVGSWNMLESAAHPGWFIMTSSNSNEPV GVTDKFENRKHIEFSFQPVSKAEMSPSEVSDGGGGS GGGGSGGGGSDKTHTCPPCPAPEAAGGPSVFLFPPK PKDTLMISRTPEVTCVVVDVSHEDPEVKFNWYVDG VEVHNAKTKPREEQYNSTYRVVSVLTVLHQDWLN GKEYKCKVSNKALGAPIEKTISKAKGQPREPQVYT LPPCRDELTKNQVSLWCLVKGFYPSDIAVEWESNG QPENNYKTTPPVLDSDGSFFLYSKLTVDKSRWQQG NVFSCSVMHEALHNHYTQKSLSLSPGK |
| P1AE4677 | Y85A, C178R, C181S, C183S, C207S IL-37 (46-218) fused to human Fc | HEK | SEQ ID NO. 30: DKTHTCPPCPAPEAAGGPSVFLFPPKPKDTLMISRTP EVTCVVVDVSHEDPEVKFNWYVDGVEVHNAKTKP REEQYNSTYRVVSVLTVLHQDWLNGKEYKCKVSN KALGAPIEKTISKAKGQPREPQVCTLPPSRDELTKN QVSLSCAVKGFYPSDIAVEWESNGQPENNYKTTPP VLDSDGSFFLVSKLTVDKSRWQQGNVFSCSVMHE ALHNRFTQKSLSLSPGK | SEQ ID NO. 31: VHTSPKVKNLNPKKFSIHDQDHKVLVLDSGNLIAV PDKNAIRPEIFFALASSLSSASAEKGSPILLGVSKGEF CLYCDKDKGQSHPSLQLKKEKLMKLAAQKESARR PFIFYRAQVGSWNMLESAAHPGWFIRTSSNSNEPVG VTDKFENRKHIEFSFQPVSKAEMSPSEVSDGGGGSG GGGSGGGGSDKTHTCPPCPAPEAAGGPSVFLFPPKP KDTLMISRTPEVTCVVVDVSHEDPEVKFNWYVDG VEVHNAKTKPREEQYNSTYRVVSVLTVLHQDWLN GKEYKCKVSNKALGAPIEKTISKAKGQPREPQVYT LPPCRDELTKNQVSLWCLVKGFYPSDIAVEWESNG QPENNYKTTPPVLDSDGSFFLYSKLTVDKSRWQQG NVFSCSVMHEALHNHYTQKSLSLSPGK |
| P1AE4679 | Y85A, C178T, C181S, C183S, C207S IL-37 (46-218) fused to human Fc | HEK | SEQ ID NO. 32: DKTHTCPPCPAPEAAGGPSVFLFPPKPKDTLMISRTP EVTCVVVDVSHEDPEVKFNWYVDGVEVHNAKTKP REEQYNSTYRVVSVLTVLHQDWLNGKEYKCKVSN KALGAPIEKTISKAKGQPREPQVCTLPPSRDELTKN QVSLSCAVKGFYPSDIAVEWESNGQPENNYKTTPP VLDSDGSFFLVSKLTVDKSRWQQGNVFSCSVMHE ALHNRFTQKSLSLSPGK | SEQ ID NO. 33: VHTSPKVKNLNPKKFSIHDQDHKVLVLDSGNLIAV PDKNAIRPEIFFALASSLSSASAEKGSPILLGVSKGEF CLYCDKDKGQSHPSLQLKKEKLMKLAAQKESARR PFIFYRAQVGSWNMLESAAHPGWFITTSSNSNEPVG VTDKFENRKHIEFSFQPVSKAEMSPSEVSDGGGGSG GGGSGGGGSDKTHTCPPCPAPEAAGGPSVFLFPPKP KDTLMISRTPEVTCVVVDVSHEDPEVKFNWYVDG VEVHNAKTKPREEQYNSTYRVVSVLTVLHQDWLN GKEYKCKVSNKALGAPIEKTISKAKGQPREPQVYT LPPCRDELTKNQVSLWCLVKGFYPSDIAVEWESNG QPENNYKTTPPVLDSDGSFFLYSKLTVDKSRWQQG NVFSCSVMHEALHNHYTQKSLSLSPGK |
| P1AE4680 | Y85A, C169C, C181S, C183S, C207S IL-37 (46-218) fused to human Fc | HEK | SEQ ID NO. 34: DKTHTCPPCPAPEAAGGPSVFLFPPKPKDTLMISRTP EVTCVVVDVSHEDPEVKFNWYVDGVEVHNAKTKP REEQYNSTYRVVSVLTVLHQDWLNGKEYKCKVSN KALGAPIEKTISKAKGQPREPQVCTLPPSRDELTKN QVSLSCAVKGFYPSDIAVEWESNGQPENNYKTTPP VLDSDGSFFLVSKLTVDKSRWQQGNVFSCSVMHE ALHNRFTQKSLSLSPGK | SEQ ID NO. 35: VHTSPKVKNLNPKKFSIHDQDHKVLVLDSGNLIAV PDKNAIRPEIFFALASSLSSASAEKGSPILLGVSKGEF CLYCDKDKGQSHPSLQLKKEKLMKLAAQKESARR PFIFYRAQVGSWNMLECAAHPGWFICTSSNSNEPV GVTDKFENRKHIEFSFQPVSKAEMSPSEVSDGGGGS GGGGSGGGGSDKTHTCPPCPAPEAAGGPSVFLFPPK PKDTLMISRTPEVTCVVVDVSHEDPEVKFNWYVDG VEVHNAKTKPREEQYNSTYRVVSVLTVLHQDWLN GKEYKCKVSNKALGAPIEKTISKAKGQPREPQVYT LPPCRDELTKNQVSLWCLVKGFYPSDIAVEWESNG QPENNYKTTPPVLDSDGSFFLYSKLTVDKSRWQQG NVFSCSVMHEALHNHYTQKSLSLSPGK |
| P1AE4681 | Y85A, C119I, C122L, C178T, C181S, C183S, C207S IL-37 (46-218) fused to human Fc | HEK | SEQ ID NO. 36: DKTHTCPPCPAPEAAGGPSVFLFPPKPKDTLMISRTP EVTCVVVDVSHEDPEVKFNWYVDGVEVHNAKTKP REEQYNSTYRVVSVLTVLHQDWLNGKEYKCKVSN KALGAPIEKTISKAKGQPREPQVCTLPPSRDELTKN QVSLSCAVKGFYPSDIAVEWESNGQPENNYKTTPP VLDSDGSFFLVSKLTVDKSRWQQGNVFSCSVMHE ALHNRFTQKSLSLSPGK | SEQ ID NO. 37: VHTSPKVKNLNPKKFSIHDQDHKVLVLDSGNLIAV PDKNAIRPEIFFALASSLSSASAEKGSPILLGVSKGEF ILYLDKDKGQSHPSLQLKKEKLMKLAAQKESARRP FIFYRAQVGSWNMLESAAHPGWFITTSSNSNEPVG VTDKFENRKHIEFSFQPVSKAEMSPSEVSDGGGGSG GGGSGGGGSDKTHTCPPCPAPEAAGGPSVFLFPPKP KDTLMISRTPEVTCVVVDVSHEDPEVKFNWYVDG VEVHNAKTKPREEQYNSTYRVVSVLTVLHQDWLN GKEYKCKVSNKALGAPIEKTISKAKGQPREPQVYT LPPCRDELTKNQVSLWCLVKGFYPSDIAVEWESNG QPENNYKTTPPVLDSDGSFFLYSKLTVDKSRWQQG NVFSCSVMHEALHNHYTQKSLSLSPGK |

TABLE 4-continued

Sequence overview

| ID of IL-37 and fusion protein thereof | Brief description | Host | Chain #1 | Chain #2 |
|---|---|---|---|---|
| P1AE4682 | Y85A, C119I, S169C, C178R, C181S, C183S, C207S IL-37 (46-218) fused to human Fc | HEK | SEQ ID NO: 38:<br>DKTHTCPPCPAPEAAGGPSVFLFPPKPKDTLMISRTP EVTCVVVDVSHEDPEVKFNWYVDGVEVHNAKTKP REEQYNSTYRVVSVLTVLHQDWLNGKEYKCKVSN KALGAPIEKTISKAKGQPREPQVCTLPPSRDELTKN QVSLSCAVKGFYPSDIAVEWESNGQPENNYKTTPP VLDSDGSFFLVSKLTVDKSRWQQGNVFSCSVMHE ALHNRFTQKSLSLSPGK | SEQ ID NO: 39:<br>VHTSPKVKNLNPKKFSIHDQDHKVLVLDSGNLIAV PDKNAIRPEIFFALASSLSSASAEKGSPILLGVSKGEF ILYCDKDKGQSHPSLQLKKEKLMKLAAQKESARRP FIFYRAQVGSWNMLECAAHPGWFIRTSSNSNEPVG VTDKFENRKHIEFSFQPVSKAEMSPSEVSDGGGGSG GGGSGGGGSDKTHTCPPCPAPEAAGGPSVFLFPPKP KDTLMISRTPEVTCVVVDVSHEDPEVKFNWYVDG VEVHNAKTKPREEQYNSTYRVVSVLTVLHQDWLN GKEYKCKVSNKALGAPIEKTISKAKGQPREPQVYT LPPCRDELTKNQVSLWCLVKGFYPSDIAVEWESNG QPENNYKTTPPVLDSDGSFFLYSKLTVDKSRWQQG NVFSCSVMHEALHNHYTQKSLSLSPGK |
| P1AF2874 | C119I, S169C, C178R, C181S, C183S, C207S IL-37 (46-218) fused to human Fc | HEK | SEQ ID NO: 40:<br>DKTHTCPPCPAPEAAGGPSVFLFPPKPKDTLMISRTP EVTCVVVDVSHEDPEVKFNWYVDGVEVHNAKTKP REEQYNSTYRVVSVLTVLHQDWLNGKEYKCKVSN KALGAPIEKTISKAKGQPREPQVCTLPPSRDELTKN QVSLSCAVKGFYPSDIAVEWESNGQPENNYKTTPP VLDSDGSFFLVSKLTVDKSRWQQGNVFSCSVMHE ALHNRFTQKSLSLSPGK | SEQ ID NO: 41:<br>VHTSPKVKNLNPKKFSIHDQDHKVLVLDSGNLIAV PDKNYIRPEIFFALASSLSSASAEKGSPILLGVSKGEF ILYCDKDKGQSHPSLQLKKEKLMKLAAQKESARRP FIFYRAQVGSWNMLECAAHPGWFIRTSSNSNEPVG VTDKFENRKHIEFSFQPVSKAEMSPSEVSDGGGGSG GGGSGGGGSDKTHTCPPCPAPEAAGGPSVFLFPPKP KDTLMISRTPEVTCVVVDVSHEDPEVKFNWYVDG VEVHNAKTKPREEQYNSTYRVVSVLTVLHQDWLN GKEYKCKVSNKALGAPIEKTISKAKGQPREPQVYT LPPCRDELTKNQVSLWCLVKGFYPSDIAVEWESNG QPENNYKTTPPVLDSDGSFFLYSKLTVDKSRWQQG NVFSCSVMHEALHNHYTQKSLSLSPGK |

DESCRIPTION OF THE FIGURES

FIG. 1: Extracted ion count chromatogram of SS-linked peptides GEFLLYCDK and AQVGSWNMLECAAHPGWFIR. The linked peptides were detected in charge states 2, 3, 4, and 5, eluting at 60.7 min.

FIG. 2: Isotope pattern of SS-linked peptides GEFLLYCDK and AQVGSWNMLECAAHPGWFIR in charge state 5.

FIG. 3: Activity in healthy human PBMCs.

FIG. 4: Activity in healthy and patient derived human PBMCs.

FIGS. 5A and B: Activity in C57Bl/6 WT mice.

The invention claimed is:

1. A fusion protein comprising an interleukin-37 (IL-37) polypeptide and an Fc region of an antibody,
   wherein the amino acid sequence of the IL-37 polypeptide has at least 95% sequence identity to the amino acid sequence of amino acid residues 46 to 218 of SEQ ID NO: 1 and comprises:
   an amino acid residue selected from the group consisting of serine, threonine, glycine, alanine, glutamine and asparagine at amino acid position 181,
   an amino acid residue selected from the group consisting of serine, threonine, glycine, alanine, glutamine and asparagine at amino acid position 183, and
   an amino acid residue selected from the group consisting of serine, threonine, glycine, alanine, glutamine and asparagine at amino acid position 207;
   wherein the amino acid positions are numbered relative to SEQ ID NO: 1.

2. The fusion protein of claim 1, comprising a serine at amino acid positions 181, 183 and 207, wherein the amino acid positions are numbered relative to SEQ ID NO: 1.

3. The fusion protein of claim 1, wherein the fusion protein is an anti-inflammatory fusion protein.

4. The fusion protein of claim 1, wherein
   the amino acid sequence of the IL-37 polypeptide comprises amino acids 46 to 218 of SEQ ID NO: 1, except for the amino acid residues at positions 181, 183 and 207, which are each substituted to a serine.

5. The fusion protein of claim 1, wherein the IL-37 polypeptide further comprises an additional disulfide bridge compared to the wild-type IL-37 polypeptide of SEQ ID NO: 1.

6. The fusion protein of claim 1, wherein the Fc region of the antibody is an Fc region of an IgG.

7. The fusion protein of claim 1, wherein the amino acid sequence of the IL-37 polypeptide comprises an alanine located at amino acid position 85, wherein the amino acid positions are numbered relative to SEQ ID NO: 1.

8. A pharmaceutical composition comprising the fusion protein of claim 1.

9. The fusion protein of claim 1 for use in treating or preventing an inflammatory disease or condition.

10. A method of treating or preventing an inflammatory disease or condition in a subject in need thereof, wherein the inflammatory disease or condition is selected from the group consisting of inflammatory bowel disease; lupus erythematosus; arthritis; psoriasis; allergic rhinitis; Grave's disease; ankylosing spondylitis; ischema-reperfusion injury; asthma; periodontal inflammation; diabetes; metabolic syndrome; cancer; and Behcet's disease,
    wherein the method comprises administering to the subject a fusion protein comprising an IL-37 polypeptide and an Fc region of an antibody, and
    wherein the amino acid sequence of the IL-37 polypeptide has at least 95% sequence identity to the amino acid sequence of amino acid residues 46 to 218 of SEQ ID NO: 1 and comprises:
    an amino acid residue selected from the group consisting of serine, threonine, glycine, alanine, glutamine and asparagine at amino acid position 181,
    an amino acid residue selected from the group consisting of serine, threonine, glycine, alanine, glutamine and asparagine at amino acid position 183, and
    an amino acid residue selected from the group consisting of serine, threonine, glycine, alanine, glutamine and asparagine at amino acid position 207;
    wherein the amino acid positions are numbered relative to SEQ ID NO: 1.

11. The method of claim 10, wherein the inflammatory disease or condition is inflammatory bowel disease.

12. A nucleic acid molecule encoding the fusion protein of claim 1.

13. A vector comprising the nucleic acid molecule of claim 12.

14. A cell comprising the nucleic acid molecule of claim 12.

15. The fusion protein of claim 6, wherein the Fc region of the antibody is an Fc region of an IgG1.

16. The method of claim 10, wherein:
(i) the arthritis is rheumatoid arthritis;
(ii) the ischemia-reperfusion injury is myocardial infarction or stroke; or
(iii) the cancer is a solid cancer type.

\* \* \* \* \*

```
                        SEQUENCE LISTING

<160> NUMBER OF SEQ ID NOS: 45

<210> SEQ ID NO 1
<211> LENGTH: 218
<212> TYPE: PRT
<213> ORGANISM: Artificial Sequence
<220> FEATURE:
<223> OTHER INFORMATION: wt IL-37

<400> SEQUENCE: 1

Met Ser Phe Val Gly Glu Asn Ser Gly Val Lys Met Gly Ser Glu Asp
1               5                   10                  15

Trp Glu Lys Asp Glu Pro Gln Cys Cys Leu Glu Asp Pro Ala Gly Ser
            20                  25                  30

Pro Leu Glu Pro Gly Pro Ser Leu Pro Thr Met Asn Phe Val His Thr
        35                  40                  45

Ser Pro Lys Val Lys Asn Leu Asn Pro Lys Lys Phe Ser Ile His Asp
    50                  55                  60

Gln Asp His Lys Val Leu Val Leu Asp Ser Gly Asn Leu Ile Ala Val
65                  70                  75                  80

Pro Asp Lys Asn Tyr Ile Arg Pro Glu Ile Phe Phe Ala Leu Ala Ser
```

```
            85                 90                  95
Ser Leu Ser Ser Ala Ser Ala Glu Lys Gly Ser Pro Ile Leu Leu Gly
            100                105                110

Val Ser Lys Gly Glu Phe Cys Leu Tyr Cys Asp Lys Asp Lys Gly Gln
            115                120                125

Ser His Pro Ser Leu Gln Leu Lys Lys Glu Lys Leu Met Lys Leu Ala
            130                135                140

Ala Gln Lys Glu Ser Ala Arg Arg Pro Phe Ile Phe Tyr Arg Ala Gln
145                 150                155                 160

Val Gly Ser Trp Asn Met Leu Glu Ser Ala His Pro Gly Trp Phe
                165                170                175

Ile Cys Thr Ser Cys Asn Cys Asn Glu Pro Val Gly Val Thr Asp Lys
            180                185                190

Phe Glu Asn Arg Lys His Ile Glu Phe Ser Phe Gln Pro Val Cys Lys
            195                200                205

Ala Glu Met Ser Pro Ser Glu Val Ser Asp
            210                215

<210> SEQ ID NO 2
<211> LENGTH: 188
<212> TYPE: PRT
<213> ORGANISM: Artificial Sequence
<220> FEATURE:
<223> OTHER INFORMATION: wt IL-37 (46-218) with His-tag & C-tag

<400> SEQUENCE: 2

Val His Thr Ser Pro Lys Val Lys Asn Leu Asn Pro Lys Lys Phe Ser
1               5                  10                  15

Ile His Asp Gln Asp His Lys Val Leu Val Leu Asp Ser Gly Asn Leu
            20                 25                  30

Ile Ala Val Pro Asp Lys Asn Tyr Ile Arg Pro Glu Ile Phe Phe Ala
            35                 40                  45

Leu Ala Ser Ser Leu Ser Ser Ala Ser Ala Glu Lys Gly Ser Pro Ile
        50                 55                  60

Leu Leu Gly Val Ser Lys Gly Glu Phe Cys Leu Tyr Cys Asp Lys Asp
65                  70                 75                  80

Lys Gly Gln Ser His Pro Ser Leu Gln Leu Lys Lys Glu Lys Leu Met
                85                 90                  95

Lys Leu Ala Ala Gln Lys Glu Ser Ala Arg Arg Pro Phe Ile Phe Tyr
            100                105                 110

Arg Ala Gln Val Gly Ser Trp Asn Met Leu Glu Ser Ala His Pro
            115                120                 125

Gly Trp Phe Ile Cys Thr Ser Cys Asn Cys Asn Glu Pro Val Gly Val
        130                135                 140

Thr Asp Lys Phe Glu Asn Arg Lys His Ile Glu Phe Ser Phe Gln Pro
145                 150                155                 160

Val Cys Lys Ala Glu Met Ser Pro Ser Glu Val Ser Asp Gly Gly
                165                170                 175

Gly Ser His His His His His His Glu Pro Glu Ala
            180                185

<210> SEQ ID NO 3
<211> LENGTH: 173
<212> TYPE: PRT
<213> ORGANISM: Artificial Sequence
<220> FEATURE:
<223> OTHER INFORMATION: wt IL-37 (46-218)
```

<400> SEQUENCE: 3

Val His Thr Ser Pro Lys Val Lys Asn Leu Asn Pro Lys Lys Phe Ser
1               5                   10                  15

Ile His Asp Gln Asp His Lys Val Leu Val Leu Asp Ser Gly Asn Leu
            20                  25                  30

Ile Ala Val Pro Asp Lys Asn Tyr Ile Arg Pro Glu Ile Phe Phe Ala
        35                  40                  45

Leu Ala Ser Ser Leu Ser Ser Ala Ser Ala Glu Lys Gly Ser Pro Ile
    50                  55                  60

Leu Leu Gly Val Ser Lys Gly Glu Phe Cys Leu Tyr Cys Asp Lys Asp
65                  70                  75                  80

Lys Gly Gln Ser His Pro Ser Leu Gln Leu Lys Lys Glu Lys Leu Met
                85                  90                  95

Lys Leu Ala Ala Gln Lys Glu Ser Ala Arg Arg Pro Phe Ile Phe Tyr
            100                 105                 110

Arg Ala Gln Val Gly Ser Trp Asn Met Leu Glu Ser Ala Ala His Pro
        115                 120                 125

Gly Trp Phe Ile Cys Thr Ser Cys Asn Cys Asn Glu Pro Val Gly Val
    130                 135                 140

Thr Asp Lys Phe Glu Asn Arg Lys His Ile Glu Phe Ser Phe Gln Pro
145                 150                 155                 160

Val Cys Lys Ala Glu Met Ser Pro Ser Glu Val Ser Asp
                165                 170

<210> SEQ ID NO 4
<211> LENGTH: 438
<212> TYPE: PRT
<213> ORGANISM: Artificial Sequence
<220> FEATURE:
<223> OTHER INFORMATION: human IL-37 (46-218) fused C-terminally to a
      human Fc on both heavy chains; contains cleavage sites to release
      IL37

<400> SEQUENCE: 4

Val His Thr Ser Pro Lys Val Lys Asn Leu Asn Pro Lys Lys Phe Ser
1               5                   10                  15

Ile His Asp Gln Asp His Lys Val Leu Val Leu Asp Ser Gly Asn Leu
            20                  25                  30

Ile Ala Val Pro Asp Lys Asn Tyr Ile Arg Pro Glu Ile Phe Phe Ala
        35                  40                  45

Leu Ala Ser Ser Leu Ser Ser Ala Ser Ala Glu Lys Gly Ser Pro Ile
    50                  55                  60

Leu Leu Gly Val Ser Lys Gly Glu Phe Cys Leu Tyr Cys Asp Lys Asp
65                  70                  75                  80

Lys Gly Gln Ser His Pro Ser Leu Gln Leu Lys Lys Glu Lys Leu Met
                85                  90                  95

Lys Leu Ala Ala Gln Lys Glu Ser Ala Arg Arg Pro Phe Ile Phe Tyr
            100                 105                 110

Arg Ala Gln Val Gly Ser Trp Asn Met Leu Glu Ser Ala Ala His Pro
        115                 120                 125

Gly Trp Phe Ile Cys Thr Ser Cys Asn Cys Asn Glu Pro Val Gly Val
    130                 135                 140

Thr Asp Lys Phe Glu Asn Arg Lys His Ile Glu Phe Ser Phe Gln Pro
145                 150                 155                 160

Val Cys Lys Ala Glu Met Ser Pro Ser Glu Val Ser Asp Gly Gly Gly 165                 170                 175
Gly Ser His His His His His Glu Pro Glu Ala Gly Gly Gly
            180                 185                 190

Ser Gly Gly Gly Gly Ser Leu Glu Val Leu Phe Gln Gly Pro Gly
            195                 200                 205

Gly Gly Ser Asp Lys Thr His Thr Cys Pro Pro Cys Pro Ala Pro Glu
            210                 215                 220

Leu Leu Gly Gly Pro Ser Val Phe Leu Phe Pro Pro Lys Pro Lys Asp
225                 230                 235                 240

Thr Leu Met Ile Ser Arg Thr Pro Glu Val Thr Cys Val Val Val Asp
                245                 250                 255

Val Ser His Glu Asp Pro Glu Val Lys Phe Asn Trp Tyr Val Asp Gly
            260                 265                 270

Val Glu Val His Asn Ala Lys Thr Lys Pro Arg Glu Glu Gln Tyr Asn
            275                 280                 285

Ser Thr Tyr Arg Val Val Ser Val Leu Thr Val Leu His Gln Asp Trp
    290                 295                 300

Leu Asn Gly Lys Glu Tyr Lys Cys Lys Val Ser Asn Lys Ala Leu Pro
305                 310                 315                 320

Ala Pro Ile Glu Lys Thr Ile Ser Lys Ala Lys Gly Gln Pro Arg Glu
                325                 330                 335

Pro Gln Val Tyr Thr Leu Pro Pro Ser Arg Asp Glu Leu Thr Lys Asn
            340                 345                 350

Gln Val Ser Leu Thr Cys Leu Val Lys Gly Phe Tyr Pro Ser Asp Ile
            355                 360                 365

Ala Val Glu Trp Glu Ser Asn Gly Gln Pro Glu Asn Asn Tyr Lys Thr
            370                 375                 380

Thr Pro Pro Val Leu Asp Ser Asp Gly Ser Phe Phe Leu Tyr Ser Lys
385                 390                 395                 400

Leu Thr Val Asp Lys Ser Arg Trp Gln Gln Gly Asn Val Phe Ser Cys
                405                 410                 415

Ser Val Met His Glu Ala Leu His Asn His Tyr Thr Gln Lys Ser Leu
            420                 425                 430

Ser Leu Ser Pro Gly Lys
            435

<210> SEQ ID NO 5
<211> LENGTH: 438
<212> TYPE: PRT
<213> ORGANISM: Artificial Sequence
<220> FEATURE:
<223> OTHER INFORMATION: human IL-37 (46-218) fused C-terminally to a
      human Fc on both heavy chains; contains cleavage sites to release
      IL37

<400> SEQUENCE: 5

Val His Thr Ser Pro Lys Val Lys Asn Leu Asn Pro Lys Lys Phe Ser
1               5                   10                  15

Ile His Asp Gln Asp His Lys Val Leu Val Leu Asp Ser Gly Asn Leu
                20                  25                  30

Ile Ala Val Pro Asp Lys Asn Tyr Ile Arg Pro Glu Ile Phe Phe Ala
            35                  40                  45

Leu Ala Ser Ser Leu Ser Ser Ala Ser Ala Glu Lys Gly Ser Pro Ile
50                  55                  60

Leu Leu Gly Val Ser Lys Gly Glu Phe Cys Leu Tyr Cys Asp Lys Asp
65                  70                  75                  80

```
Lys Gly Gln Ser His Pro Ser Leu Gln Leu Lys Lys Glu Lys Leu Met
                85                  90                  95
Lys Leu Ala Ala Gln Lys Glu Ser Ala Arg Arg Pro Phe Ile Phe Tyr
            100                 105                 110
Arg Ala Gln Val Gly Ser Trp Asn Met Leu Glu Ser Ala Ala His Pro
        115                 120                 125
Gly Trp Phe Ile Cys Thr Ser Cys Asn Cys Asn Glu Pro Val Gly Val
130                 135                 140
Thr Asp Lys Phe Glu Asn Arg Lys His Ile Glu Phe Ser Phe Gln Pro
145                 150                 155                 160
Val Cys Lys Ala Glu Met Ser Pro Ser Glu Val Ser Asp Gly Gly Gly
                165                 170                 175
Gly Ser His His His His His His Glu Pro Glu Ala Gly Gly Gly Gly
            180                 185                 190
Ser Gly Gly Gly Gly Ser Leu Glu Val Leu Phe Gln Gly Pro Gly Gly
        195                 200                 205
Gly Gly Ser Asp Lys Thr His Thr Cys Pro Pro Cys Pro Ala Pro Glu
210                 215                 220
Leu Leu Gly Gly Pro Ser Val Phe Leu Phe Pro Pro Lys Pro Lys Asp
225                 230                 235                 240
Thr Leu Met Ile Ser Arg Thr Pro Glu Val Thr Cys Val Val Val Asp
                245                 250                 255
Val Ser His Glu Asp Pro Glu Val Lys Phe Asn Trp Tyr Val Asp Gly
            260                 265                 270
Val Glu Val His Asn Ala Lys Thr Lys Pro Arg Glu Glu Gln Tyr Asn
        275                 280                 285
Ser Thr Tyr Arg Val Val Ser Val Leu Thr Val Leu His Gln Asp Trp
290                 295                 300
Leu Asn Gly Lys Glu Tyr Lys Cys Lys Val Ser Asn Lys Ala Leu Pro
305                 310                 315                 320
Ala Pro Ile Glu Lys Thr Ile Ser Lys Ala Lys Gly Gln Pro Arg Glu
                325                 330                 335
Pro Gln Val Tyr Thr Leu Pro Pro Ser Arg Asp Glu Leu Thr Lys Asn
            340                 345                 350
Gln Val Ser Leu Thr Cys Leu Val Lys Gly Phe Tyr Pro Ser Asp Ile
        355                 360                 365
Ala Val Glu Trp Glu Ser Asn Gly Gln Pro Glu Asn Asn Tyr Lys Thr
370                 375                 380
Thr Pro Pro Val Leu Asp Ser Asp Gly Ser Phe Phe Leu Tyr Ser Lys
385                 390                 395                 400
Leu Thr Val Asp Lys Ser Arg Trp Gln Gln Gly Asn Val Phe Ser Cys
                405                 410                 415
Ser Val Met His Glu Ala Leu His Asn His Tyr Thr Gln Lys Ser Leu
            420                 425                 430
Ser Leu Ser Pro Gly Lys
        435

<210> SEQ ID NO 6
<211> LENGTH: 227
<212> TYPE: PRT
<213> ORGANISM: Artificial Sequence
<220> FEATURE:
<223> OTHER INFORMATION: wt IL-37 (46-218) fused C-terminally to a human
      Fc only on once HC (KiH)
```

```
<400> SEQUENCE: 6

Asp Lys Thr His Thr Cys Pro Pro Cys Pro Ala Pro Glu Ala Ala Gly
1               5                   10                  15

Gly Pro Ser Val Phe Leu Phe Pro Pro Lys Pro Lys Asp Thr Leu Met
            20                  25                  30

Ile Ser Arg Thr Pro Glu Val Thr Cys Val Val Val Asp Val Ser His
        35                  40                  45

Glu Asp Pro Glu Val Lys Phe Asn Trp Tyr Val Asp Gly Val Glu Val
    50                  55                  60

His Asn Ala Lys Thr Lys Pro Arg Glu Glu Gln Tyr Asn Ser Thr Tyr
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Gly Ala Pro Ile
            100                 105                 110

Glu Lys Thr Ile Ser Lys Ala Lys Gly Gln Pro Arg Glu Pro Gln Val
        115                 120                 125

Cys Thr Leu Pro Pro Ser Arg Asp Glu Leu Thr Lys Asn Gln Val Ser
    130                 135                 140

Leu Ser Cys Ala Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Val Ser Lys Leu Thr Val
            180                 185                 190

Asp Lys Ser Arg Trp Gln Gln Gly Asn Val Phe Ser Cys Ser Val Met
        195                 200                 205

His Glu Ala Leu His Asn Arg Phe Thr Gln Lys Ser Leu Ser Leu Ser
    210                 215                 220

Pro Gly Lys
225

<210> SEQ ID NO 7
<211> LENGTH: 415
<212> TYPE: PRT
<213> ORGANISM: Artificial Sequence
<220> FEATURE:
<223> OTHER INFORMATION: wt IL-37 (46-218) fused C-terminally to a human
      Fc only on once HC (KiH)

<400> SEQUENCE: 7

Val His Thr Ser Pro Lys Val Lys Asn Leu Asn Pro Lys Lys Phe Ser
1               5                   10                  15

Ile His Asp Gln Asp His Lys Val Leu Val Leu Asp Ser Gly Asn Leu
            20                  25                  30

Ile Ala Val Pro Asp Lys Asn Tyr Ile Arg Pro Glu Ile Phe Phe Ala
        35                  40                  45

Leu Ala Ser Ser Leu Ser Ser Ala Ser Ala Glu Lys Gly Ser Pro Ile
    50                  55                  60

Leu Leu Gly Val Ser Lys Gly Glu Phe Cys Leu Tyr Cys Asp Lys Asp
65                  70                  75                  80

Lys Gly Gln Ser His Pro Ser Leu Gln Leu Lys Lys Glu Lys Leu Met
                85                  90                  95

Lys Leu Ala Ala Gln Lys Glu Ser Ala Arg Arg Pro Phe Ile Phe Tyr
            100                 105                 110
```

-continued

```
Arg Ala Gln Val Gly Ser Trp Asn Met Leu Glu Ser Ala His Pro
            115                 120                 125
Gly Trp Phe Ile Cys Thr Ser Cys Asn Cys Asn Glu Pro Val Gly Val
130                 135                 140
Thr Asp Lys Phe Glu Asn Arg Lys His Ile Glu Phe Ser Phe Gln Pro
145                 150                 155                 160
Val Cys Lys Ala Glu Met Ser Pro Ser Glu Val Ser Asp Gly Gly Gly
                165                 170                 175
Gly Ser Gly Gly Gly Gly Ser Gly Gly Gly Gly Ser Asp Lys Thr His
            180                 185                 190
Thr Cys Pro Pro Cys Pro Ala Pro Glu Ala Ala Gly Gly Pro Ser Val
            195                 200                 205
Phe Leu Phe Pro Pro Lys Pro Lys Asp Thr Leu Met Ile Ser Arg Thr
210                 215                 220
Pro Glu Val Thr Cys Val Val Val Asp Val Ser His Glu Asp Pro Glu
225                 230                 235                 240
Val Lys Phe Asn Trp Tyr Val Asp Gly Val Glu Val His Asn Ala Lys
                245                 250                 255
Thr Lys Pro Arg Glu Glu Gln Tyr Asn Ser Thr Tyr Arg Val Val Ser
            260                 265                 270
Val Leu Thr Val Leu His Gln Asp Trp Leu Asn Gly Lys Glu Tyr Lys
            275                 280                 285
Cys Lys Val Ser Asn Lys Ala Leu Gly Ala Pro Ile Glu Lys Thr Ile
            290                 295                 300
Ser Lys Ala Lys Gly Gln Pro Arg Glu Pro Gln Val Tyr Thr Leu Pro
305                 310                 315                 320
Pro Cys Arg Asp Glu Leu Thr Lys Asn Gln Val Ser Leu Trp Cys Leu
                325                 330                 335
Val Lys Gly Phe Tyr Pro Ser Asp Ile Ala Val Glu Trp Glu Ser Asn
            340                 345                 350
Gly Gln Pro Glu Asn Asn Tyr Lys Thr Thr Pro Pro Val Leu Asp Ser
            355                 360                 365
Asp Gly Ser Phe Phe Leu Tyr Ser Lys Leu Thr Val Asp Lys Ser Arg
370                 375                 380
Trp Gln Gln Gly Asn Val Phe Ser Cys Ser Val Met His Glu Ala Leu
385                 390                 395                 400
His Asn His Tyr Thr Gln Lys Ser Leu Ser Leu Ser Pro Gly Lys
                405                 410                 415
```

<210> SEQ ID NO 8
<211> LENGTH: 227
<212> TYPE: PRT
<213> ORGANISM: Artificial Sequence
<220> FEATURE:
<223> OTHER INFORMATION: wt IL-37 (46-218) fused N-terminally to a human
      Fc only on once HC (KiH)

<400> SEQUENCE: 8

```
Asp Lys Thr His Thr Cys Pro Pro Cys Pro Ala Pro Glu Ala Ala Gly
1               5                   10                  15
Gly Pro Ser Val Phe Leu Phe Pro Pro Lys Pro Lys Asp Thr Leu Met
                20                  25                  30
Ile Ser Arg Thr Pro Glu Val Thr Cys Val Val Val Asp Val Ser His
            35                  40                  45
Glu Asp Pro Glu Val Lys Phe Asn Trp Tyr Val Asp Gly Val Glu Val
50                  55                  60
```

```
His Asn Ala Lys Thr Lys Pro Arg Glu Glu Gln Tyr Asn Ser Thr Tyr
 65                  70                  75                  80

Arg Val Val Ser Val Leu Thr Val Leu His Gln Asp Trp Leu Asn Gly
                 85                  90                  95

Lys Glu Tyr Lys Cys Lys Val Ser Asn Lys Ala Leu Gly Ala Pro Ile
            100                 105                 110

Glu Lys Thr Ile Ser Lys Ala Lys Gly Gln Pro Arg Glu Pro Gln Val
            115                 120                 125

Cys Thr Leu Pro Pro Ser Arg Asp Glu Leu Thr Lys Asn Gln Val Ser
            130                 135                 140

Leu Ser Cys Ala Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Val Ser Lys Leu Thr Val
            180                 185                 190

Asp Lys Ser Arg Trp Gln Gln Gly Asn Val Phe Ser Cys Ser Val Met
            195                 200                 205

His Glu Ala Leu His Asn Arg Phe Thr Gln Lys Ser Leu Ser Leu Ser
            210                 215                 220

Pro Gly Lys
225

<210> SEQ ID NO 9
<211> LENGTH: 417
<212> TYPE: PRT
<213> ORGANISM: Artificial Sequence
<220> FEATURE:
<223> OTHER INFORMATION: wt IL-37 (46-218) fused N-terminally to a human
      Fc only on once HC (KiH)

<400> SEQUENCE: 9

Asp Lys Thr His Thr Cys Pro Pro Cys Pro Ala Pro Glu Ala Ala Gly
  1               5                  10                  15

Gly Pro Ser Val Phe Leu Phe Pro Pro Lys Pro Lys Asp Thr Leu Met
             20                  25                  30

Ile Ser Arg Thr Pro Glu Val Thr Cys Val Val Val Asp Val Ser His
         35                  40                  45

Glu Asp Pro Glu Val Lys Phe Asn Trp Tyr Val Asp Gly Val Glu Val
 50                  55                  60

His Asn Ala Lys Thr Lys Pro Arg Glu Glu Gln Tyr Asn Ser Thr Tyr
 65                  70                  75                  80

Arg Val Val Ser Val Leu Thr Val Leu His Gln Asp Trp Leu Asn Gly
                 85                  90                  95

Lys Glu Tyr Lys Cys Lys Val Ser Asn Lys Ala Leu Gly Ala Pro Ile
            100                 105                 110

Glu Lys Thr Ile Ser Lys Ala Lys Gly Gln Pro Arg Glu Pro Gln Val
            115                 120                 125

Tyr Thr Leu Pro Pro Cys Arg Asp Glu Leu Thr Lys Asn Gln Val Ser
            130                 135                 140

Leu Trp Cys Leu Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Tyr Ser Lys Leu Thr Val
```

-continued

```
                180                 185                 190
Asp Lys Ser Arg Trp Gln Gln Gly Asn Val Phe Ser Cys Ser Val Met
        195                 200                 205

His Glu Ala Leu His Asn His Tyr Thr Gln Lys Ser Leu Ser Leu Ser
        210                 215                 220

Pro Gly Gly Gly Ser Gly Gly Gly Ser Gly Gly Gly Ser Gly Gly Gly Ser Gly
225                 230                 235                 240

Gly Gly Gly Ser Val His Thr Ser Pro Lys Val Lys Asn Leu Asn Pro
                245                 250                 255

Lys Lys Phe Ser Ile His Asp Gln Asp His Lys Val Leu Val Leu Asp
        260                 265                 270

Ser Gly Asn Leu Ile Ala Val Pro Asp Lys Asn Tyr Ile Arg Pro Glu
        275                 280                 285

Ile Phe Phe Ala Leu Ala Ser Ser Leu Ser Ser Ala Ser Ala Glu Lys
        290                 295                 300

Gly Ser Pro Ile Leu Leu Gly Val Ser Lys Gly Glu Phe Cys Leu Tyr
305                 310                 315                 320

Cys Asp Lys Asp Lys Gly Gln Ser His Pro Ser Leu Gln Leu Lys Lys
                325                 330                 335

Glu Lys Leu Met Lys Leu Ala Ala Gln Lys Glu Ser Ala Arg Arg Pro
        340                 345                 350

Phe Ile Phe Tyr Arg Ala Gln Val Gly Ser Trp Asn Met Leu Glu Ser
        355                 360                 365

Ala Ala His Pro Gly Trp Phe Ile Cys Thr Ser Cys Asn Cys Asn Glu
        370                 375                 380

Pro Val Gly Val Thr Asp Lys Phe Glu Asn Arg Lys His Ile Glu Phe
385                 390                 395                 400

Ser Phe Gln Pro Val Cys Lys Ala Glu Met Ser Pro Ser Glu Val Ser
                405                 410                 415

Asp

<210> SEQ ID NO 10
<211> LENGTH: 227
<212> TYPE: PRT
<213> ORGANISM: Artificial Sequence
<220> FEATURE:
<223> OTHER INFORMATION: Y85A, C181S, C183S, C207S IL-37 (46-218) fused
      C-terminally to a human Fc only on once HC (KiH)

<400> SEQUENCE: 10

Asp Lys Thr His Thr Cys Pro Pro Cys Pro Ala Pro Glu Ala Ala Gly
1               5                   10                  15

Gly Pro Ser Val Phe Leu Phe Pro Pro Lys Pro Lys Asp Thr Leu Met
                20                  25                  30

Ile Ser Arg Thr Pro Glu Val Thr Cys Val Val Val Asp Val Ser His
        35                  40                  45

Glu Asp Pro Glu Val Lys Phe Asn Trp Tyr Val Asp Gly Val Glu Val
    50                  55                  60

His Asn Ala Lys Thr Lys Pro Arg Glu Glu Gln Tyr Asn Ser Thr Tyr
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Gly Ala Pro Ile
            100                 105                 110

Glu Lys Thr Ile Ser Lys Ala Lys Gly Gln Pro Arg Glu Pro Gln Val
```

```
            115                 120                 125
Cys Thr Leu Pro Pro Ser Arg Asp Glu Leu Thr Lys Asn Gln Val Ser
        130                 135                 140

Leu Ser Cys Ala Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Val Ser Lys Leu Thr Val
            180                 185                 190

Asp Lys Ser Arg Trp Gln Gln Gly Asn Val Phe Ser Cys Ser Val Met
        195                 200                 205

His Glu Ala Leu His Asn Arg Phe Thr Gln Lys Ser Leu Ser Leu Ser
    210                 215                 220

Pro Gly Lys
225

<210> SEQ ID NO 11
<211> LENGTH: 415
<212> TYPE: PRT
<213> ORGANISM: Artificial Sequence
<220> FEATURE:
<223> OTHER INFORMATION: Y85A, C181S, C183S, C207S IL-37 (46-218) fused
      C-terminally to a human Fc only on once HC (KiH)

<400> SEQUENCE: 11

Val His Thr Ser Pro Lys Val Lys Asn Leu Asn Pro Lys Lys Phe Ser
1               5                   10                  15

Ile His Asp Gln Asp His Lys Val Leu Val Leu Asp Ser Gly Asn Leu
            20                  25                  30

Ile Ala Val Pro Asp Lys Asn Ala Ile Arg Pro Glu Ile Phe Phe Ala
        35                  40                  45

Leu Ala Ser Ser Leu Ser Ser Ala Ser Ala Glu Lys Gly Ser Pro Ile
    50                  55                  60

Leu Leu Gly Val Ser Lys Gly Glu Phe Cys Leu Tyr Cys Asp Lys Asp
65                  70                  75                  80

Lys Gly Gln Ser His Pro Ser Leu Gln Leu Lys Lys Glu Lys Leu Met
                85                  90                  95

Lys Leu Ala Ala Gln Lys Glu Ser Ala Arg Arg Pro Phe Ile Phe Tyr
            100                 105                 110

Arg Ala Gln Val Gly Ser Trp Asn Met Leu Glu Ser Ala Ala His Pro
        115                 120                 125

Gly Trp Phe Ile Cys Thr Ser Ser Asn Ser Asn Glu Pro Val Gly Val
    130                 135                 140

Thr Asp Lys Phe Glu Asn Arg Lys His Ile Glu Phe Ser Phe Gln Pro
145                 150                 155                 160

Val Ser Lys Ala Glu Met Ser Pro Ser Glu Val Ser Asp Gly Gly Gly
                165                 170                 175

Gly Ser Gly Gly Gly Gly Ser Gly Gly Gly Ser Asp Lys Thr His
            180                 185                 190

Thr Cys Pro Pro Cys Pro Ala Pro Glu Ala Ala Gly Gly Pro Ser Val
        195                 200                 205

Phe Leu Phe Pro Pro Lys Pro Lys Asp Thr Leu Met Ile Ser Arg Thr
    210                 215                 220

Pro Glu Val Thr Cys Val Val Val Asp Val Ser His Glu Asp Pro Glu
225                 230                 235                 240
```

Val Lys Phe Asn Trp Tyr Val Asp Gly Val Glu Val His Asn Ala Lys
                245                 250                 255

Thr Lys Pro Arg Glu Glu Gln Tyr Asn Ser Thr Tyr Arg Val Val Ser
        260                 265                 270

Val Leu Thr Val Leu His Gln Asp Trp Leu Asn Gly Lys Glu Tyr Lys
    275                 280                 285

Cys Lys Val Ser Asn Lys Ala Leu Gly Ala Pro Ile Glu Lys Thr Ile
290                 295                 300

Ser Lys Ala Lys Gly Gln Pro Arg Glu Pro Gln Val Tyr Thr Leu Pro
305                 310                 315                 320

Pro Cys Arg Asp Glu Leu Thr Lys Asn Gln Val Ser Leu Trp Cys Leu
                325                 330                 335

Val Lys Gly Phe Tyr Pro Ser Asp Ile Ala Val Glu Trp Glu Ser Asn
        340                 345                 350

Gly Gln Pro Glu Asn Asn Tyr Lys Thr Thr Pro Pro Val Leu Asp Ser
    355                 360                 365

Asp Gly Ser Phe Phe Leu Tyr Ser Lys Leu Thr Val Asp Lys Ser Arg
370                 375                 380

Trp Gln Gln Gly Asn Val Phe Ser Cys Ser Val Met His Glu Ala Leu
385                 390                 395                 400

His Asn His Tyr Thr Gln Lys Ser Leu Ser Leu Ser Pro Gly Lys
                405                 410                 415

<210> SEQ ID NO 12
<211> LENGTH: 227
<212> TYPE: PRT
<213> ORGANISM: Artificial Sequence
<220> FEATURE:
<223> OTHER INFORMATION: Y85A, C181S, C183S, C207S IL-37 (46-218) fused
      N-terminally to a human Fc only on once HC (KiH)

<400> SEQUENCE: 12

Asp Lys Thr His Thr Cys Pro Pro Cys Pro Ala Pro Glu Ala Ala Gly
1               5                   10                  15

Gly Pro Ser Val Phe Leu Phe Pro Pro Lys Pro Lys Asp Thr Leu Met
            20                  25                  30

Ile Ser Arg Thr Pro Glu Val Thr Cys Val Val Val Asp Val Ser His
        35                  40                  45

Glu Asp Pro Glu Val Lys Phe Asn Trp Tyr Val Asp Gly Val Glu Val
    50                  55                  60

His Asn Ala Lys Thr Lys Pro Arg Glu Glu Gln Tyr Asn Ser Thr Tyr
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Gly Ala Pro Ile
            100                 105                 110

Glu Lys Thr Ile Ser Lys Ala Lys Gly Gln Pro Arg Glu Pro Gln Val
        115                 120                 125

Cys Thr Leu Pro Pro Ser Arg Asp Glu Leu Thr Lys Asn Gln Val Ser
    130                 135                 140

Leu Ser Cys Ala Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Val Ser Lys Leu Thr Val
            180                 185                 190

```
Asp Lys Ser Arg Trp Gln Gln Gly Asn Val Phe Ser Cys Ser Val Met
            195                 200                 205

His Glu Ala Leu His Asn Arg Phe Thr Gln Lys Ser Leu Ser Leu Ser
        210                 215                 220

Pro Gly Lys
225

<210> SEQ ID NO 13
<211> LENGTH: 417
<212> TYPE: PRT
<213> ORGANISM: Artificial Sequence
<220> FEATURE:
<223> OTHER INFORMATION: Y85A, C181S, C183S, C207S IL-37 (46-218) fused
      N-terminally to a human Fc only on once HC (KiH)

<400> SEQUENCE: 13

Asp Lys Thr His Thr Cys Pro Pro Cys Pro Ala Pro Glu Ala Ala Gly
1               5                   10                  15

Gly Pro Ser Val Phe Leu Phe Pro Pro Lys Pro Lys Asp Thr Leu Met
            20                  25                  30

Ile Ser Arg Thr Pro Glu Val Thr Cys Val Val Val Asp Val Ser His
        35                  40                  45

Glu Asp Pro Glu Val Lys Phe Asn Trp Tyr Val Asp Gly Val Glu Val
    50                  55                  60

His Asn Ala Lys Thr Lys Pro Arg Glu Glu Gln Tyr Asn Ser Thr Tyr
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Gly Ala Pro Ile
            100                 105                 110

Glu Lys Thr Ile Ser Lys Ala Lys Gly Gln Pro Arg Glu Pro Gln Val
        115                 120                 125

Tyr Thr Leu Pro Pro Cys Arg Asp Glu Leu Thr Lys Asn Gln Val Ser
    130                 135                 140

Leu Trp Cys Leu Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Tyr Ser Lys Leu Thr Val
            180                 185                 190

Asp Lys Ser Arg Trp Gln Gln Gly Asn Val Phe Ser Cys Ser Val Met
        195                 200                 205

His Glu Ala Leu His Asn His Tyr Thr Gln Lys Ser Leu Ser Leu Ser
    210                 215                 220

Pro Gly Gly Gly Ser Gly Gly Gly Ser Gly Gly Gly Ser Gly
225                 230                 235                 240

Gly Gly Gly Ser Val His Thr Ser Pro Lys Val Lys Asn Leu Asn Pro
                245                 250                 255

Lys Lys Phe Ser Ile His Asp Gln Asp His Lys Val Leu Val Leu Asp
            260                 265                 270

Ser Gly Asn Leu Ile Ala Val Pro Asp Lys Asn Ala Ile Arg Pro Glu
        275                 280                 285

Ile Phe Phe Ala Leu Ala Ser Ser Leu Ser Ser Ala Ser Ala Glu Lys
    290                 295                 300

Gly Ser Pro Ile Leu Leu Gly Val Ser Lys Gly Glu Phe Cys Leu Tyr
```

```
                305                 310                 315                 320
Cys Asp Lys Asp Lys Gly Gln Ser His Pro Ser Leu Gln Leu Lys Lys
            325                 330                 335
Glu Lys Leu Met Lys Leu Ala Ala Gln Lys Glu Ser Ala Arg Arg Pro
        340                 345                 350
Phe Ile Phe Tyr Arg Ala Gln Val Gly Ser Trp Asn Met Leu Glu Ser
        355                 360                 365
Ala Ala His Pro Gly Trp Phe Ile Cys Thr Ser Asn Ser Asn Glu
    370                 375                 380
Pro Val Gly Val Thr Asp Lys Phe Glu Asn Arg Lys His Ile Glu Phe
385                 390                 395                 400
Ser Phe Gln Pro Val Ser Lys Ala Glu Met Ser Pro Ser Glu Val Ser
            405                 410                 415
Asp

<210> SEQ ID NO 14
<211> LENGTH: 183
<212> TYPE: PRT
<213> ORGANISM: Artificial Sequence
<220> FEATURE:
<223> OTHER INFORMATION: Y85A, C181S, C183S, C207S IL-37 (46-218) with
      N-terminal Sortase tag

<400> SEQUENCE: 14

Met Gly Gly Gly Val His Thr Ser Pro Lys Val Lys Asn Leu Asn Pro
1               5                   10                  15
Lys Lys Phe Ser Ile His Asp Gln Asp His Lys Val Leu Val Leu Asp
            20                  25                  30
Ser Gly Asn Leu Ile Ala Val Pro Asp Lys Asn Ala Ile Arg Pro Glu
        35                  40                  45
Ile Phe Phe Ala Leu Ala Ser Ser Leu Ser Ser Ala Ser Ala Glu Lys
    50                  55                  60
Gly Ser Pro Ile Leu Leu Gly Val Ser Lys Gly Glu Phe Cys Leu Tyr
65                  70                  75                  80
Cys Asp Lys Asp Lys Gly Gln Ser His Pro Ser Leu Gln Leu Lys Lys
            85                  90                  95
Glu Lys Leu Met Lys Leu Ala Ala Gln Lys Glu Ser Ala Arg Arg Pro
        100                 105                 110
Phe Ile Phe Tyr Arg Ala Gln Val Gly Ser Trp Asn Met Leu Glu Ser
        115                 120                 125
Ala Ala His Pro Gly Trp Phe Ile Cys Thr Ser Asn Ser Asn Glu
    130                 135                 140
Pro Val Gly Val Thr Asp Lys Phe Glu Asn Arg Lys His Ile Glu Phe
145                 150                 155                 160
Ser Phe Gln Pro Val Ser Lys Ala Glu Met Ser Pro Ser Glu Val Ser
            165                 170                 175
Asp Gly Ser Glu Pro Glu Ala
            180

<210> SEQ ID NO 15
<211> LENGTH: 190
<212> TYPE: PRT
<213> ORGANISM: Artificial Sequence
<220> FEATURE:
<223> OTHER INFORMATION: Y85A, C181S, C183S, C207S IL-37 (46-218) with
      C-terminal Sortase tag

<400> SEQUENCE: 15
```

Met Val His Thr Ser Pro Lys Val Lys Asn Leu Asn Pro Lys Lys Phe
1               5                   10                  15

Ser Ile His Asp Gln Asp His Lys Val Leu Val Leu Asp Ser Gly Asn
                20                  25                  30

Leu Ile Ala Val Pro Asp Lys Asn Ala Ile Arg Pro Glu Ile Phe Phe
            35                  40                  45

Ala Leu Ala Ser Ser Leu Ser Ser Ala Ser Ala Glu Lys Gly Ser Pro
50                  55                  60

Ile Leu Leu Gly Val Ser Lys Gly Glu Phe Cys Leu Tyr Cys Asp Lys
65                  70                  75                  80

Asp Lys Gly Gln Ser His Pro Ser Leu Gln Leu Lys Lys Glu Lys Leu
                85                  90                  95

Met Lys Leu Ala Ala Gln Lys Glu Ser Ala Arg Arg Pro Phe Ile Phe
            100                 105                 110

Tyr Arg Ala Gln Val Gly Ser Trp Asn Met Leu Glu Ser Ala Ala His
        115                 120                 125

Pro Gly Trp Phe Ile Cys Thr Ser Ser Asn Ser Asn Glu Pro Val Gly
130                 135                 140

Val Thr Asp Lys Phe Glu Asn Arg Lys His Ile Glu Phe Ser Phe Gln
145                 150                 155                 160

Pro Val Ser Lys Ala Glu Met Ser Pro Ser Glu Val Ser Asp Gly Ser
                165                 170                 175

Leu Pro Glu Thr Gly Gly Ser Gly His His His His His
            180                 185                 190

<210> SEQ ID NO 16
<211> LENGTH: 410
<212> TYPE: PRT
<213> ORGANISM: Artificial Sequence
<220> FEATURE:
<223> OTHER INFORMATION: Y85A, C181S, C183S, C207S IL-37 (46-218)
      Sortase conjugated to human Fc (P1AD9547) from HEK

<400> SEQUENCE: 16

Met Val His Thr Ser Pro Lys Val Lys Asn Leu Asn Pro Lys Lys Phe
1               5                   10                  15

Ser Ile His Asp Gln Asp His Lys Val Leu Val Leu Asp Ser Gly Asn
                20                  25                  30

Leu Ile Ala Val Pro Asp Lys Asn Ala Ile Arg Pro Glu Ile Phe Phe
            35                  40                  45

Ala Leu Ala Ser Ser Leu Ser Ser Ala Ser Ala Glu Lys Gly Ser Pro
50                  55                  60

Ile Leu Leu Gly Val Ser Lys Gly Glu Phe Cys Leu Tyr Cys Asp Lys
65                  70                  75                  80

Asp Lys Gly Gln Ser His Pro Ser Leu Gln Leu Lys Lys Glu Lys Leu
                85                  90                  95

Met Lys Leu Ala Ala Gln Lys Glu Ser Ala Arg Arg Pro Phe Ile Phe
            100                 105                 110

Tyr Arg Ala Gln Val Gly Ser Trp Asn Met Leu Glu Ser Ala Ala His
        115                 120                 125

Pro Gly Trp Phe Ile Cys Thr Ser Ser Asn Ser Asn Glu Pro Val Gly
130                 135                 140

Val Thr Asp Lys Phe Glu Asn Arg Lys His Ile Glu Phe Ser Phe Gln
145                 150                 155                 160

Pro Val Ser Lys Ala Glu Met Ser Pro Ser Glu Val Ser Asp Gly Ser

```
                165                 170                 175
Leu Pro Glu Thr Gly Gly Asp Lys Thr His Thr Cys Pro Pro Cys
            180                 185                 190

Pro Ala Pro Glu Ala Ala Gly Gly Pro Ser Val Phe Leu Phe Pro Pro
        195                 200                 205

Lys Pro Lys Asp Thr Leu Met Ile Ser Arg Thr Pro Glu Val Thr Cys
    210                 215                 220

Val Val Val Asp Val Ser His Glu Asp Pro Glu Val Lys Phe Asn Trp
225                 230                 235                 240

Tyr Val Asp Gly Val Glu Val His Asn Ala Lys Thr Lys Pro Arg Glu
                245                 250                 255

Glu Gln Tyr Asn Ser Thr Tyr Arg Val Val Ser Val Leu Thr Val Leu
            260                 265                 270

His Gln Asp Trp Leu Asn Gly Lys Glu Tyr Lys Cys Lys Val Ser Asn
        275                 280                 285

Lys Ala Leu Gly Ala Pro Ile Glu Lys Thr Ile Ser Lys Ala Lys Gly
    290                 295                 300

Gln Pro Arg Glu Pro Gln Val Cys Thr Leu Pro Pro Ser Arg Asp Glu
305                 310                 315                 320

Leu Thr Lys Asn Gln Val Ser Leu Ser Cys Ala Val Lys Gly Phe Tyr
                325                 330                 335

Pro Ser Asp Ile Ala Val Glu Trp Glu Ser Asn Gly Gln Pro Glu Asn
            340                 345                 350

Asn Tyr Lys Thr Thr Pro Pro Val Leu Asp Ser Asp Gly Ser Phe Phe
        355                 360                 365

Leu Val Ser Lys Leu Thr Val Asp Lys Ser Arg Trp Gln Gln Gly Asn
    370                 375                 380

Val Phe Ser Cys Ser Val Met His Glu Ala Leu His Asn Arg Phe Thr
385                 390                 395                 400

Gln Lys Ser Leu Ser Leu Ser Pro Gly Lys
                405                 410

<210> SEQ ID NO 17
<211> LENGTH: 227
<212> TYPE: PRT
<213> ORGANISM: Artificial Sequence
<220> FEATURE:
<223> OTHER INFORMATION: Y85A, C181S, C183S, C207S IL-37 (46-218)
      Sortase conjugated to human Fc (P1AD9547) from HEK

<400> SEQUENCE: 17

Asp Lys Thr His Thr Cys Pro Pro Cys Pro Ala Pro Glu Ala Ala Gly
1               5                   10                  15

Gly Pro Ser Val Phe Leu Phe Pro Pro Lys Pro Lys Asp Thr Leu Met
            20                  25                  30

Ile Ser Arg Thr Pro Glu Val Thr Cys Val Val Val Asp Val Ser His
        35                  40                  45

Glu Asp Pro Glu Val Lys Phe Asn Trp Tyr Val Asp Gly Val Glu Val
    50                  55                  60

His Asn Ala Lys Thr Lys Pro Arg Glu Glu Gln Tyr Asn Ser Thr Tyr
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Gly Ala Pro Ile
            100                 105                 110
```

Glu Lys Thr Ile Ser Lys Ala Lys Gly Gln Pro Arg Glu Pro Gln Val
            115                 120                 125

Tyr Thr Leu Pro Pro Cys Arg Asp Glu Leu Thr Lys Asn Gln Val Ser
130                 135                 140

Leu Trp Cys Leu Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Tyr Ser Lys Leu Thr Val
            180                 185                 190

Asp Lys Ser Arg Trp Gln Gln Gly Asn Val Phe Ser Cys Ser Val Met
            195                 200                 205

His Glu Ala Leu His Asn His Tyr Thr Gln Lys Ser Leu Ser Leu Ser
210                 215                 220

Pro Gly Lys
225

<210> SEQ ID NO 18
<211> LENGTH: 190
<212> TYPE: PRT
<213> ORGANISM: Artificial Sequence
<220> FEATURE:
<223> OTHER INFORMATION: C181S, C183S, C207S IL-37 (46-218) with
      C-terminal Sortase tag

<400> SEQUENCE: 18

Met Val His Thr Ser Pro Lys Val Lys Asn Leu Asn Pro Lys Lys Phe
1               5                   10                  15

Ser Ile His Asp Gln Asp His Lys Val Leu Val Leu Asp Ser Gly Asn
                20                  25                  30

Leu Ile Ala Val Pro Asp Lys Asn Tyr Ile Arg Pro Glu Ile Phe Phe
            35                  40                  45

Ala Leu Ala Ser Ser Leu Ser Ser Ala Ser Ala Glu Lys Gly Ser Pro
        50                  55                  60

Ile Leu Leu Gly Val Ser Lys Gly Glu Phe Cys Leu Tyr Cys Asp Lys
65                  70                  75                  80

Asp Lys Gly Gln Ser His Pro Ser Leu Gln Leu Lys Lys Glu Lys Leu
                85                  90                  95

Met Lys Leu Ala Ala Gln Lys Glu Ser Ala Arg Arg Pro Phe Ile Phe
            100                 105                 110

Tyr Arg Ala Gln Val Gly Ser Trp Asn Met Leu Glu Ser Ala Ala His
        115                 120                 125

Pro Gly Trp Phe Ile Cys Thr Ser Ser Asn Ser Asn Glu Pro Val Gly
    130                 135                 140

Val Thr Asp Lys Phe Glu Asn Arg Lys His Ile Glu Phe Ser Phe Gln
145                 150                 155                 160

Pro Val Ser Lys Ala Glu Met Ser Pro Ser Glu Val Ser Asp Gly Ser
                165                 170                 175

Leu Pro Glu Thr Gly Gly Ser Gly His His His His His His
            180                 185                 190

<210> SEQ ID NO 19
<211> LENGTH: 410
<212> TYPE: PRT
<213> ORGANISM: Artificial Sequence
<220> FEATURE:
<223> OTHER INFORMATION: C181S, C183S, C207S IL-37 (46-218) Sortase
      conjugated to human Fc (P1AD9547) from HEK

<400> SEQUENCE: 19

```
Met Val His Thr Ser Pro Lys Val Lys Asn Leu Asn Pro Lys Lys Phe
1               5                   10                  15

Ser Ile His Asp Gln Asp His Lys Val Leu Val Leu Asp Ser Gly Asn
            20                  25                  30

Leu Ile Ala Val Pro Asp Lys Asn Tyr Ile Arg Pro Glu Ile Phe Phe
        35                  40                  45

Ala Leu Ala Ser Ser Leu Ser Ser Ala Ser Ala Glu Lys Gly Ser Pro
    50                  55                  60

Ile Leu Leu Gly Val Ser Lys Gly Glu Phe Cys Leu Tyr Cys Asp Lys
65                  70                  75                  80

Asp Lys Gly Gln Ser His Pro Ser Leu Gln Leu Lys Lys Glu Lys Leu
                85                  90                  95

Met Lys Leu Ala Ala Gln Lys Glu Ser Ala Arg Arg Pro Phe Ile Phe
                100                 105                 110

Tyr Arg Ala Gln Val Gly Ser Trp Asn Met Leu Glu Ser Ala Ala His
            115                 120                 125

Pro Gly Trp Phe Ile Cys Thr Ser Ser Asn Ser Asn Glu Pro Val Gly
        130                 135                 140

Val Thr Asp Lys Phe Glu Asn Arg Lys His Ile Glu Phe Ser Phe Gln
145                 150                 155                 160

Pro Val Ser Lys Ala Glu Met Ser Pro Ser Glu Val Ser Asp Gly Ser
                165                 170                 175

Leu Pro Glu Thr Gly Gly Gly Asp Lys Thr His Thr Cys Pro Pro Cys
            180                 185                 190

Pro Ala Pro Glu Ala Ala Gly Gly Pro Ser Val Phe Leu Phe Pro Pro
        195                 200                 205

Lys Pro Lys Asp Thr Leu Met Ile Ser Arg Thr Pro Glu Val Thr Cys
    210                 215                 220

Val Val Val Asp Val Ser His Glu Asp Pro Gln Val Lys Phe Asn Trp
225                 230                 235                 240

Tyr Val Asp Gly Val Glu Val His Asn Ala Lys Thr Lys Pro Arg Glu
                245                 250                 255

Glu Gln Tyr Asn Ser Thr Tyr Arg Val Val Ser Val Leu Thr Val Leu
            260                 265                 270

His Gln Asp Trp Leu Asn Gly Lys Glu Tyr Lys Cys Lys Val Ser Asn
        275                 280                 285

Lys Ala Leu Gly Ala Pro Ile Glu Lys Thr Ile Ser Lys Ala Lys Gly
    290                 295                 300

Gln Pro Arg Glu Pro Gln Val Cys Thr Leu Pro Pro Ser Arg Asp Glu
305                 310                 315                 320

Leu Thr Lys Asn Gln Val Ser Leu Ser Cys Ala Val Lys Gly Phe Tyr
                325                 330                 335

Pro Ser Asp Ile Ala Val Glu Trp Glu Ser Asn Gly Gln Pro Glu Asn
            340                 345                 350

Asn Tyr Lys Thr Thr Pro Pro Val Leu Asp Ser Asp Gly Ser Phe Phe
        355                 360                 365

Leu Val Ser Lys Leu Thr Val Asp Lys Ser Arg Trp Gln Gln Gly Asn
    370                 375                 380

Val Phe Ser Cys Ser Val Met His Glu Ala Leu His Asn Arg Phe Thr
385                 390                 395                 400

Gln Lys Ser Leu Ser Leu Ser Pro Gly Lys
```

<210> SEQ ID NO 20
<211> LENGTH: 227
<212> TYPE: PRT
<213> ORGANISM: Artificial Sequence
<220> FEATURE:
<223> OTHER INFORMATION: C181S, C183S, C207S IL-37 (46-218) Sortase
      conjugated to human Fc (P1AD9547) from HEK

<400> SEQUENCE: 20

```
Asp Lys Thr His Thr Cys Pro Pro Cys Pro Ala Pro Glu Ala Ala Gly
1               5                   10                  15

Gly Pro Ser Val Phe Leu Phe Pro Pro Lys Pro Lys Asp Thr Leu Met
            20                  25                  30

Ile Ser Arg Thr Pro Glu Val Thr Cys Val Val Val Asp Val Ser His
        35                  40                  45

Glu Asp Pro Glu Val Lys Phe Asn Trp Tyr Val Asp Gly Val Glu Val
    50                  55                  60

His Asn Ala Lys Thr Lys Pro Arg Glu Glu Gln Tyr Asn Ser Thr Tyr
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Gly Ala Pro Ile
            100                 105                 110

Glu Lys Thr Ile Ser Lys Ala Lys Gly Gln Pro Arg Glu Pro Gln Val
        115                 120                 125

Tyr Thr Leu Pro Pro Cys Arg Asp Glu Leu Thr Lys Asn Gln Val Ser
    130                 135                 140

Leu Trp Cys Leu Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Tyr Ser Lys Leu Thr Val
            180                 185                 190

Asp Lys Ser Arg Trp Gln Gln Gly Asn Val Phe Ser Cys Ser Val Met
        195                 200                 205

His Glu Ala Leu His Asn His Tyr Thr Gln Lys Ser Leu Ser Leu Ser
    210                 215                 220

Pro Gly Lys
225
```

<210> SEQ ID NO 21
<211> LENGTH: 189
<212> TYPE: PRT
<213> ORGANISM: Artificial Sequence
<220> FEATURE:
<223> OTHER INFORMATION: Y85A, C181S, C183S, C207S IL-37 (46-218) with
      C-terminal Sortase tag

<400> SEQUENCE: 21

```
Val His Thr Ser Pro Lys Val Lys Asn Leu Asn Pro Lys Lys Phe Ser
1               5                   10                  15

Ile His Asp Gln Asp His Lys Val Leu Val Leu Asp Ser Gly Asn Leu
            20                  25                  30

Ile Ala Val Pro Asp Lys Asn Ala Ile Arg Pro Glu Ile Phe Phe Ala
        35                  40                  45

Leu Ala Ser Ser Leu Ser Ser Ala Ser Ala Glu Lys Gly Ser Pro Ile
```

```
            50                  55                  60
Leu Leu Gly Val Ser Lys Gly Glu Phe Cys Leu Tyr Cys Asp Lys Asp
 65                  70                  75                  80

Lys Gly Gln Ser His Pro Ser Leu Gln Leu Lys Lys Glu Lys Leu Met
                 85                  90                  95

Lys Leu Ala Ala Gln Lys Glu Ser Ala Arg Arg Pro Phe Ile Phe Tyr
            100                 105                 110

Arg Ala Gln Val Gly Ser Trp Asn Met Leu Glu Ser Ala Ala His Pro
        115                 120                 125

Gly Trp Phe Ile Cys Thr Ser Ser Asn Ser Asn Glu Pro Val Gly Val
    130                 135                 140

Thr Asp Lys Phe Glu Asn Arg Lys His Ile Glu Phe Ser Phe Gln Pro
145                 150                 155                 160

Val Ser Lys Ala Glu Met Ser Pro Ser Glu Val Ser Asp Gly Ser Leu
                165                 170                 175

Pro Glu Thr Gly Gly Ser Gly His His His His His
            180                 185
```

<210> SEQ ID NO 22
<211> LENGTH: 227
<212> TYPE: PRT
<213> ORGANISM: Artificial Sequence
<220> FEATURE:
<223> OTHER INFORMATION: Y85A, C119I, C181S, C183S, C207S IL-37 (46-218)
     fused to human Fc

<400> SEQUENCE: 22

```
Asp Lys Thr His Thr Cys Pro Pro Cys Pro Ala Pro Glu Ala Ala Gly
  1               5                  10                  15

Gly Pro Ser Val Phe Leu Phe Pro Pro Lys Pro Lys Asp Thr Leu Met
                 20                  25                  30

Ile Ser Arg Thr Pro Glu Val Thr Cys Val Val Val Asp Val Ser His
             35                  40                  45

Glu Asp Pro Glu Val Lys Phe Asn Trp Tyr Val Asp Gly Val Glu Val
 50                  55                  60

His Asn Ala Lys Thr Lys Pro Arg Glu Glu Gln Tyr Asn Ser Thr Tyr
 65                  70                  75                  80

Arg Val Val Ser Val Leu Thr Val Leu His Gln Asp Trp Leu Asn Gly
                 85                  90                  95

Lys Glu Tyr Lys Cys Lys Val Ser Asn Lys Ala Leu Gly Ala Pro Ile
            100                 105                 110

Glu Lys Thr Ile Ser Lys Ala Lys Gly Gln Pro Arg Glu Pro Gln Val
        115                 120                 125

Cys Thr Leu Pro Pro Ser Arg Asp Glu Leu Thr Lys Asn Gln Val Ser
    130                 135                 140

Leu Ser Cys Ala Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Val Ser Lys Leu Thr Val
            180                 185                 190

Asp Lys Ser Arg Trp Gln Gln Gly Asn Val Phe Ser Cys Ser Val Met
        195                 200                 205

His Glu Ala Leu His Asn Arg Phe Thr Gln Lys Ser Leu Ser Leu Ser
    210                 215                 220
```

```
Pro Gly Lys
225
```

<210> SEQ ID NO 23
<211> LENGTH: 415
<212> TYPE: PRT
<213> ORGANISM: Artificial Sequence
<220> FEATURE:
<223> OTHER INFORMATION: Y85A, C119I, C181S, C183S, C207S IL-37 (46-218) fused to human Fc

<400> SEQUENCE: 23

```
Val His Thr Ser Pro Lys Val Lys Asn Leu Asn Pro Lys Lys Phe Ser
1               5                   10                  15

Ile His Asp Gln Asp His Lys Val Leu Val Leu Asp Ser Gly Asn Leu
            20                  25                  30

Ile Ala Val Pro Asp Lys Asn Ala Ile Arg Pro Glu Ile Phe Phe Ala
        35                  40                  45

Leu Ala Ser Ser Leu Ser Ser Ala Ser Ala Glu Lys Gly Ser Pro Ile
50                  55                  60

Leu Leu Gly Val Ser Lys Gly Glu Phe Ile Leu Tyr Cys Asp Lys Asp
65                  70                  75                  80

Lys Gly Gln Ser His Pro Ser Leu Gln Leu Lys Lys Glu Lys Leu Met
                85                  90                  95

Lys Leu Ala Ala Gln Lys Glu Ser Ala Arg Arg Pro Phe Ile Phe Tyr
            100                 105                 110

Arg Ala Gln Val Gly Ser Trp Asn Met Leu Glu Ser Ala Ala His Pro
        115                 120                 125

Gly Trp Phe Ile Cys Thr Ser Ser Asn Ser Asn Glu Pro Val Gly Val
130                 135                 140

Thr Asp Lys Phe Glu Asn Arg Lys His Ile Glu Phe Ser Phe Gln Pro
145                 150                 155                 160

Val Ser Lys Ala Glu Met Ser Pro Ser Glu Val Ser Asp Gly Gly Gly
                165                 170                 175

Gly Ser Gly Gly Gly Gly Ser Gly Gly Gly Gly Ser Asp Lys Thr His
            180                 185                 190

Thr Cys Pro Pro Cys Pro Ala Pro Glu Ala Ala Gly Gly Pro Ser Val
        195                 200                 205

Phe Leu Phe Pro Pro Lys Pro Lys Asp Thr Leu Met Ile Ser Arg Thr
210                 215                 220

Pro Glu Val Thr Cys Val Val Val Asp Val Ser His Glu Asp Pro Glu
225                 230                 235                 240

Val Lys Phe Asn Trp Tyr Val Asp Gly Val Glu Val His Asn Ala Lys
                245                 250                 255

Thr Lys Pro Arg Glu Glu Gln Tyr Asn Ser Thr Tyr Arg Val Val Ser
            260                 265                 270

Val Leu Thr Val Leu His Gln Asp Trp Leu Asn Gly Lys Glu Tyr Lys
        275                 280                 285

Cys Lys Val Ser Asn Lys Ala Leu Gly Ala Pro Ile Glu Lys Thr Ile
290                 295                 300

Ser Lys Ala Lys Gly Gln Pro Arg Glu Pro Gln Val Tyr Thr Leu Pro
305                 310                 315                 320

Pro Cys Arg Asp Glu Leu Thr Lys Asn Gln Val Ser Leu Trp Cys Leu
                325                 330                 335

Val Lys Gly Phe Tyr Pro Ser Asp Ile Ala Val Glu Trp Glu Ser Asn
            340                 345                 350
```

Gly Gln Pro Glu Asn Asn Tyr Lys Thr Thr Pro Pro Val Leu Asp Ser
        355                 360                 365

Asp Gly Ser Phe Phe Leu Tyr Ser Lys Leu Thr Val Asp Lys Ser Arg
    370                 375                 380

Trp Gln Gln Gly Asn Val Phe Ser Cys Ser Val Met His Glu Ala Leu
385                 390                 395                 400

His Asn His Tyr Thr Gln Lys Ser Leu Ser Leu Ser Pro Gly Lys
                405                 410                 415

<210> SEQ ID NO 24
<211> LENGTH: 227
<212> TYPE: PRT
<213> ORGANISM: Artificial Sequence
<220> FEATURE:
<223> OTHER INFORMATION: Y85A, C122L, C181S, C183S, C207S IL-37 (46-218)
      fused to human Fc

<400> SEQUENCE: 24

Asp Lys Thr His Thr Cys Pro Pro Cys Pro Ala Pro Glu Ala Ala Gly
1               5                   10                  15

Gly Pro Ser Val Phe Leu Phe Pro Pro Lys Pro Lys Asp Thr Leu Met
            20                  25                  30

Ile Ser Arg Thr Pro Glu Val Thr Cys Val Val Val Asp Val Ser His
        35                  40                  45

Glu Asp Pro Glu Val Lys Phe Asn Trp Tyr Val Asp Gly Val Glu Val
    50                  55                  60

His Asn Ala Lys Thr Lys Pro Arg Glu Glu Gln Tyr Asn Ser Thr Tyr
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Gly Ala Pro Ile
            100                 105                 110

Glu Lys Thr Ile Ser Lys Ala Lys Gly Gln Pro Arg Glu Pro Gln Val
        115                 120                 125

Cys Thr Leu Pro Pro Ser Arg Asp Glu Leu Thr Lys Asn Gln Val Ser
130                 135                 140

Leu Ser Cys Ala Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Val Ser Lys Leu Thr Val
            180                 185                 190

Asp Lys Ser Arg Trp Gln Gln Gly Asn Val Phe Ser Cys Ser Val Met
        195                 200                 205

His Glu Ala Leu His Asn Arg Phe Thr Gln Lys Ser Leu Ser Leu Ser
    210                 215                 220

Pro Gly Lys
225

<210> SEQ ID NO 25
<211> LENGTH: 415
<212> TYPE: PRT
<213> ORGANISM: Artificial Sequence
<220> FEATURE:
<223> OTHER INFORMATION: Y85A, C122L, C181S, C183S, C207S IL-37 (46-218)
      fused to human Fc

<400> SEQUENCE: 25

```
Val His Thr Ser Pro Lys Val Lys Asn Leu Asn Pro Lys Phe Ser
1               5                   10                  15

Ile His Asp Gln Asp His Lys Val Leu Val Leu Asp Ser Gly Asn Leu
            20                  25                  30

Ile Ala Val Pro Asp Lys Asn Ala Ile Arg Pro Glu Ile Phe Phe Ala
                35                  40                  45

Leu Ala Ser Ser Leu Ser Ser Ala Ser Ala Glu Lys Gly Ser Pro Ile
50                      55                  60

Leu Leu Gly Val Ser Lys Gly Glu Phe Cys Leu Tyr Leu Asp Lys Asp
65                  70                  75                  80

Lys Gly Gln Ser His Pro Ser Leu Gln Leu Lys Glu Lys Leu Met
                85                  90                  95

Lys Leu Ala Ala Gln Lys Glu Ser Ala Arg Arg Pro Phe Ile Phe Tyr
            100                 105                 110

Arg Ala Gln Val Gly Ser Trp Asn Met Leu Glu Ser Ala Ala His Pro
                115                 120                 125

Gly Trp Phe Ile Cys Thr Ser Ser Asn Ser Asn Glu Pro Val Gly Val
        130                 135                 140

Thr Asp Lys Phe Glu Asn Arg Lys His Ile Glu Phe Ser Phe Gln Pro
145                 150                 155                 160

Val Ser Lys Ala Glu Met Ser Pro Ser Glu Val Ser Asp Gly Gly Gly
            165                 170                 175

Gly Ser Gly Gly Gly Gly Ser Gly Gly Gly Gly Ser Asp Lys Thr His
        180                 185                 190

Thr Cys Pro Pro Cys Pro Ala Pro Glu Ala Ala Gly Gly Pro Ser Val
        195                 200                 205

Phe Leu Phe Pro Pro Lys Pro Lys Asp Thr Leu Met Ile Ser Arg Thr
        210                 215                 220

Pro Glu Val Thr Cys Val Val Val Asp Val Ser His Glu Asp Pro Glu
225                 230                 235                 240

Val Lys Phe Asn Trp Tyr Val Asp Gly Val Glu Val His Asn Ala Lys
                245                 250                 255

Thr Lys Pro Arg Glu Glu Gln Tyr Asn Ser Thr Tyr Arg Val Val Ser
            260                 265                 270

Val Leu Thr Val Leu His Gln Asp Trp Leu Asn Gly Lys Glu Tyr Lys
        275                 280                 285

Cys Lys Val Ser Asn Lys Ala Leu Gly Ala Pro Ile Glu Lys Thr Ile
    290                 295                 300

Ser Lys Ala Lys Gly Gln Pro Arg Glu Pro Gln Val Tyr Thr Leu Pro
305                 310                 315                 320

Pro Cys Arg Asp Glu Leu Thr Lys Asn Gln Val Ser Leu Trp Cys Leu
        325                 330                 335

Val Lys Gly Phe Tyr Pro Ser Asp Ile Ala Val Glu Trp Glu Ser Asn
            340                 345                 350

Gly Gln Pro Glu Asn Asn Tyr Lys Thr Thr Pro Pro Val Leu Asp Ser
        355                 360                 365

Asp Gly Ser Phe Phe Leu Tyr Ser Lys Leu Thr Val Asp Lys Ser Arg
    370                 375                 380

Trp Gln Gln Gly Asn Val Phe Ser Cys Ser Val Met His Glu Ala Leu
385                 390                 395                 400

His Asn His Tyr Thr Gln Lys Ser Leu Ser Leu Ser Pro Gly Lys
            405                 410                 415
```

-continued

```
<210> SEQ ID NO 26
<211> LENGTH: 227
<212> TYPE: PRT
<213> ORGANISM: Artificial Sequence
<220> FEATURE:
<223> OTHER INFORMATION: Y85A, C178A, C181S, C183S, C207S IL-37 (46-218)
      fused to human Fc

<400> SEQUENCE: 26

Asp Lys Thr His Thr Cys Pro Pro Cys Pro Ala Pro Glu Ala Ala Gly
1               5                   10                  15

Gly Pro Ser Val Phe Leu Phe Pro Pro Lys Pro Lys Asp Thr Leu Met
            20                  25                  30

Ile Ser Arg Thr Pro Glu Val Thr Cys Val Val Val Asp Val Ser His
        35                  40                  45

Glu Asp Pro Glu Val Lys Phe Asn Trp Tyr Val Asp Gly Val Glu Val
    50                  55                  60

His Asn Ala Lys Thr Lys Pro Arg Glu Glu Gln Tyr Asn Ser Thr Tyr
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Gly Ala Pro Ile
            100                 105                 110

Glu Lys Thr Ile Ser Lys Ala Lys Gly Gln Pro Arg Glu Pro Gln Val
        115                 120                 125

Cys Thr Leu Pro Pro Ser Arg Asp Glu Leu Thr Lys Asn Gln Val Ser
    130                 135                 140

Leu Ser Cys Ala Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Val Ser Lys Leu Thr Val
            180                 185                 190

Asp Lys Ser Arg Trp Gln Gln Gly Asn Val Phe Ser Cys Ser Val Met
        195                 200                 205

His Glu Ala Leu His Asn Arg Phe Thr Gln Lys Ser Leu Ser Leu Ser
    210                 215                 220

Pro Gly Lys
225

<210> SEQ ID NO 27
<211> LENGTH: 415
<212> TYPE: PRT
<213> ORGANISM: Artificial Sequence
<220> FEATURE:
<223> OTHER INFORMATION: Y85A, C178A, C181S, C183S, C207S IL-37 (46-218)
      fused to human Fc

<400> SEQUENCE: 27

Val His Thr Ser Pro Lys Val Lys Asn Leu Asn Pro Lys Lys Phe Ser
1               5                   10                  15

Ile His Asp Gln Asp His Lys Val Leu Val Leu Asp Ser Gly Asn Leu
            20                  25                  30

Ile Ala Val Pro Asp Lys Asn Ala Ile Arg Pro Glu Ile Phe Phe Ala
        35                  40                  45

Leu Ala Ser Ser Leu Ser Ser Ala Ser Ala Glu Lys Gly Ser Pro Ile
    50                  55                  60
```

```
Leu Leu Gly Val Ser Lys Gly Glu Phe Cys Leu Tyr Cys Asp Lys Asp
 65                  70                  75                  80

Lys Gly Gln Ser His Pro Ser Leu Gln Leu Lys Lys Glu Lys Leu Met
                 85                  90                  95

Lys Leu Ala Ala Gln Lys Glu Ser Ala Arg Arg Pro Phe Ile Phe Tyr
            100                 105                 110

Arg Ala Gln Val Gly Ser Trp Asn Met Leu Glu Ser Ala Ala His Pro
        115                 120                 125

Gly Trp Phe Ile Ala Thr Ser Ser Asn Ser Asn Glu Pro Val Gly Val
130                 135                 140

Thr Asp Lys Phe Glu Asn Arg Lys His Ile Glu Phe Ser Phe Gln Pro
145                 150                 155                 160

Val Ser Lys Ala Glu Met Ser Pro Ser Glu Val Ser Asp Gly Gly Gly
                165                 170                 175

Gly Ser Gly Gly Gly Gly Ser Gly Gly Gly Gly Ser Asp Lys Thr His
            180                 185                 190

Thr Cys Pro Pro Cys Pro Ala Pro Glu Ala Ala Gly Gly Pro Ser Val
        195                 200                 205

Phe Leu Phe Pro Pro Lys Pro Lys Asp Thr Leu Met Ile Ser Arg Thr
210                 215                 220

Pro Glu Val Thr Cys Val Val Val Asp Val Ser His Glu Asp Pro Glu
225                 230                 235                 240

Val Lys Phe Asn Trp Tyr Val Asp Gly Val Glu Val His Asn Ala Lys
                245                 250                 255

Thr Lys Pro Arg Glu Glu Gln Tyr Asn Ser Thr Tyr Arg Val Val Ser
            260                 265                 270

Val Leu Thr Val Leu His Gln Asp Trp Leu Asn Gly Lys Glu Tyr Lys
        275                 280                 285

Cys Lys Val Ser Asn Lys Ala Leu Gly Ala Pro Ile Glu Lys Thr Ile
290                 295                 300

Ser Lys Ala Lys Gly Gln Pro Arg Glu Pro Gln Val Tyr Thr Leu Pro
305                 310                 315                 320

Pro Cys Arg Asp Glu Leu Thr Lys Asn Gln Val Ser Leu Trp Cys Leu
                325                 330                 335

Val Lys Gly Phe Tyr Pro Ser Asp Ile Ala Val Glu Trp Glu Ser Asn
            340                 345                 350

Gly Gln Pro Glu Asn Asn Tyr Lys Thr Thr Pro Pro Val Leu Asp Ser
        355                 360                 365

Asp Gly Ser Phe Phe Leu Tyr Ser Lys Leu Thr Val Asp Lys Ser Arg
370                 375                 380

Trp Gln Gln Gly Asn Val Phe Ser Cys Ser Val Met His Glu Ala Leu
385                 390                 395                 400

His Asn His Tyr Thr Gln Lys Ser Leu Ser Leu Ser Pro Gly Lys
                405                 410                 415

<210> SEQ ID NO 28
<211> LENGTH: 227
<212> TYPE: PRT
<213> ORGANISM: Artificial Sequence
<220> FEATURE:
<223> OTHER INFORMATION: Y85A, C178M, C181S, C183S, C207S IL-37 (46-218)
      fused to human Fc

<400> SEQUENCE: 28

Asp Lys Thr His Thr Cys Pro Pro Cys Pro Ala Pro Glu Ala Ala Gly
1               5                   10                  15
```

```
Gly Pro Ser Val Phe Leu Phe Pro Pro Lys Pro Lys Asp Thr Leu Met
            20                  25                  30

Ile Ser Arg Thr Pro Glu Val Thr Cys Val Val Val Asp Val Ser His
            35                  40                  45

Glu Asp Pro Glu Val Lys Phe Asn Trp Tyr Val Asp Gly Val Glu Val
 50                  55                  60

His Asn Ala Lys Thr Lys Pro Arg Glu Glu Gln Tyr Asn Ser Thr Tyr
 65                  70                  75                  80

Arg Val Val Ser Val Leu Thr Val Leu His Gln Asp Trp Leu Asn Gly
                 85                  90                  95

Lys Glu Tyr Lys Cys Lys Val Ser Asn Lys Ala Leu Gly Ala Pro Ile
            100                 105                 110

Glu Lys Thr Ile Ser Lys Ala Lys Gly Gln Pro Arg Glu Pro Gln Val
            115                 120                 125

Cys Thr Leu Pro Pro Ser Arg Asp Glu Leu Thr Lys Asn Gln Val Ser
130                 135                 140

Leu Ser Cys Ala Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Val Ser Lys Leu Thr Val
            180                 185                 190

Asp Lys Ser Arg Trp Gln Gln Gly Asn Val Phe Ser Cys Ser Val Met
            195                 200                 205

His Glu Ala Leu His Asn Arg Phe Thr Gln Lys Ser Leu Ser Leu Ser
        210                 215                 220

Pro Gly Lys
225

<210> SEQ ID NO 29
<211> LENGTH: 415
<212> TYPE: PRT
<213> ORGANISM: Artificial Sequence
<220> FEATURE:
<223> OTHER INFORMATION: Y85A, C178M, C181S, C183S, C207S IL-37 (46-218)
      fused to human Fc

<400> SEQUENCE: 29

Val His Thr Ser Pro Lys Val Lys Asn Leu Asn Pro Lys Lys Phe Ser
 1               5                  10                  15

Ile His Asp Gln Asp His Lys Val Leu Val Leu Asp Ser Gly Asn Leu
            20                  25                  30

Ile Ala Val Pro Asp Lys Asn Ala Ile Arg Pro Glu Ile Phe Phe Ala
            35                  40                  45

Leu Ala Ser Ser Leu Ser Ser Ala Ser Ala Glu Lys Gly Ser Pro Ile
 50                  55                  60

Leu Leu Gly Val Ser Lys Gly Glu Phe Cys Leu Tyr Cys Asp Lys Asp
 65                  70                  75                  80

Lys Gly Gln Ser His Pro Ser Leu Gln Leu Lys Lys Glu Lys Leu Met
                 85                  90                  95

Lys Leu Ala Ala Gln Lys Glu Ser Ala Arg Arg Pro Phe Ile Phe Tyr
            100                 105                 110

Arg Ala Gln Val Gly Ser Trp Asn Met Leu Glu Ser Ala Ala His Pro
            115                 120                 125

Gly Trp Phe Ile Met Thr Ser Ser Asn Ser Asn Glu Pro Val Gly Val
```

```
                130             135             140
Thr Asp Lys Phe Glu Asn Arg Lys His Ile Glu Phe Ser Phe Gln Pro
145                 150                 155                 160

Val Ser Lys Ala Glu Met Ser Pro Ser Glu Val Ser Asp Gly Gly Gly
                165                 170                 175

Gly Ser Gly Gly Gly Gly Ser Gly Gly Gly Gly Ser Asp Lys Thr His
                180                 185                 190

Thr Cys Pro Pro Cys Pro Ala Pro Glu Ala Ala Gly Gly Pro Ser Val
                195                 200                 205

Phe Leu Phe Pro Pro Lys Pro Lys Asp Thr Leu Met Ile Ser Arg Thr
210                 215                 220

Pro Glu Val Thr Cys Val Val Val Asp Val Ser His Glu Asp Pro Glu
225                 230                 235                 240

Val Lys Phe Asn Trp Tyr Val Asp Gly Val Glu Val His Asn Ala Lys
                245                 250                 255

Thr Lys Pro Arg Glu Glu Gln Tyr Asn Ser Thr Tyr Arg Val Val Ser
                260                 265                 270

Val Leu Thr Val Leu His Gln Asp Trp Leu Asn Gly Lys Glu Tyr Lys
                275                 280                 285

Cys Lys Val Ser Asn Lys Ala Leu Gly Ala Pro Ile Glu Lys Thr Ile
290                 295                 300

Ser Lys Ala Lys Gly Gln Pro Arg Glu Pro Gln Val Tyr Thr Leu Pro
305                 310                 315                 320

Pro Cys Arg Asp Glu Leu Thr Lys Asn Gln Val Ser Leu Trp Cys Leu
                325                 330                 335

Val Lys Gly Phe Tyr Pro Ser Asp Ile Ala Val Glu Trp Glu Ser Asn
                340                 345                 350

Gly Gln Pro Glu Asn Asn Tyr Lys Thr Thr Pro Pro Val Leu Asp Ser
                355                 360                 365

Asp Gly Ser Phe Phe Leu Tyr Ser Lys Leu Thr Val Asp Lys Ser Arg
                370                 375                 380

Trp Gln Gln Gly Asn Val Phe Ser Cys Ser Val Met His Glu Ala Leu
385                 390                 395                 400

His Asn His Tyr Thr Gln Lys Ser Leu Ser Leu Ser Pro Gly Lys
                405                 410                 415

<210> SEQ ID NO 30
<211> LENGTH: 227
<212> TYPE: PRT
<213> ORGANISM: Artificial Sequence
<220> FEATURE:
<223> OTHER INFORMATION: Y85A, C178R, C181S, C183S, C207S IL-37 (46-218)
      fused to human Fc

<400> SEQUENCE: 30

Asp Lys Thr His Thr Cys Pro Pro Cys Pro Ala Pro Glu Ala Ala Gly
1               5                   10                  15

Gly Pro Ser Val Phe Leu Phe Pro Pro Lys Pro Lys Asp Thr Leu Met
                20                  25                  30

Ile Ser Arg Thr Pro Glu Val Thr Cys Val Val Val Asp Val Ser His
                35                  40                  45

Glu Asp Pro Glu Val Lys Phe Asn Trp Tyr Val Asp Gly Val Glu Val
                50                  55                  60

His Asn Ala Lys Thr Lys Pro Arg Glu Glu Gln Tyr Asn Ser Thr Tyr
65                  70                  75                  80
```

Arg Val Val Ser Val Leu Thr Val Leu His Gln Asp Trp Leu Asn Gly
                    85                  90                  95

Lys Glu Tyr Lys Cys Lys Val Ser Asn Lys Ala Leu Gly Ala Pro Ile
            100                 105                 110

Glu Lys Thr Ile Ser Lys Ala Lys Gly Gln Pro Arg Glu Pro Gln Val
            115                 120                 125

Cys Thr Leu Pro Pro Ser Arg Asp Glu Leu Thr Lys Asn Gln Val Ser
            130                 135                 140

Leu Ser Cys Ala Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Val Ser Lys Leu Thr Val
                180                 185                 190

Asp Lys Ser Arg Trp Gln Gln Gly Asn Val Phe Ser Cys Ser Val Met
            195                 200                 205

His Glu Ala Leu His Asn Arg Phe Thr Gln Lys Ser Leu Ser Leu Ser
            210                 215                 220

Pro Gly Lys
225

<210> SEQ ID NO 31
<211> LENGTH: 415
<212> TYPE: PRT
<213> ORGANISM: Artificial Sequence
<220> FEATURE:
<223> OTHER INFORMATION: Y85A, C178R, C181S, C183S, C207S IL-37 (46-218)
      fused to human Fc

<400> SEQUENCE: 31

Val His Thr Ser Pro Lys Val Lys Asn Leu Asn Pro Lys Lys Phe Ser
1               5                   10                  15

Ile His Asp Gln Asp His Lys Val Leu Val Leu Asp Ser Gly Asn Leu
                20                  25                  30

Ile Ala Val Pro Asp Lys Asn Ala Ile Arg Pro Glu Ile Phe Phe Ala
            35                  40                  45

Leu Ala Ser Ser Leu Ser Ser Ala Ser Ala Glu Lys Gly Ser Pro Ile
50                  55                  60

Leu Leu Gly Val Ser Lys Gly Glu Phe Cys Leu Tyr Cys Asp Lys Asp
65                  70                  75                  80

Lys Gly Gln Ser His Pro Ser Leu Gln Leu Lys Lys Glu Lys Leu Met
            85                  90                  95

Lys Leu Ala Ala Gln Lys Glu Ser Ala Arg Arg Pro Phe Ile Phe Tyr
            100                 105                 110

Arg Ala Gln Val Gly Ser Trp Asn Met Leu Glu Ser Ala Ala His Pro
            115                 120                 125

Gly Trp Phe Ile Arg Thr Ser Ser Asn Ser Asn Glu Pro Val Gly Val
            130                 135                 140

Thr Asp Lys Phe Glu Asn Arg Lys His Ile Glu Phe Ser Phe Gln Pro
145                 150                 155                 160

Val Ser Lys Ala Glu Met Ser Pro Ser Glu Val Ser Asp Gly Gly Gly
                165                 170                 175

Gly Ser Gly Gly Gly Gly Ser Gly Gly Gly Gly Ser Asp Lys Thr His
                180                 185                 190

Thr Cys Pro Pro Cys Pro Ala Pro Glu Ala Ala Gly Gly Pro Ser Val
            195                 200                 205

```
Phe Leu Phe Pro Pro Lys Pro Lys Asp Thr Leu Met Ile Ser Arg Thr
    210                 215                 220

Pro Glu Val Thr Cys Val Val Asp Val Ser His Glu Asp Pro Glu
225                 230                 235                 240

Val Lys Phe Asn Trp Tyr Val Asp Gly Val Glu Val His Asn Ala Lys
                245                 250                 255

Thr Lys Pro Arg Glu Glu Gln Tyr Asn Ser Thr Tyr Arg Val Val Ser
            260                 265                 270

Val Leu Thr Val Leu His Gln Asp Trp Leu Asn Gly Lys Glu Tyr Lys
        275                 280                 285

Cys Lys Val Ser Asn Lys Ala Leu Gly Ala Pro Ile Glu Lys Thr Ile
290                 295                 300

Ser Lys Ala Lys Gly Gln Pro Arg Glu Pro Gln Val Tyr Thr Leu Pro
305                 310                 315                 320

Pro Cys Arg Asp Glu Leu Thr Lys Asn Gln Val Ser Leu Trp Cys Leu
                325                 330                 335

Val Lys Gly Phe Tyr Pro Ser Asp Ile Ala Val Glu Trp Glu Ser Asn
            340                 345                 350

Gly Gln Pro Glu Asn Asn Tyr Lys Thr Thr Pro Pro Val Leu Asp Ser
        355                 360                 365

Asp Gly Ser Phe Phe Leu Tyr Ser Lys Leu Thr Val Asp Lys Ser Arg
    370                 375                 380

Trp Gln Gln Gly Asn Val Phe Ser Cys Ser Val Met His Glu Ala Leu
385                 390                 395                 400

His Asn His Tyr Thr Gln Lys Ser Leu Ser Leu Ser Pro Gly Lys
                405                 410                 415

<210> SEQ ID NO 32
<211> LENGTH: 227
<212> TYPE: PRT
<213> ORGANISM: Artificial Sequence
<220> FEATURE:
<223> OTHER INFORMATION: Y85A, C178T, C181S, C183S, C207S IL-37 (46-218)
      fused to human Fc

<400> SEQUENCE: 32

Asp Lys Thr His Thr Cys Pro Pro Cys Pro Ala Pro Glu Ala Ala Gly
1               5                   10                  15

Gly Pro Ser Val Phe Leu Phe Pro Pro Lys Pro Lys Asp Thr Leu Met
            20                  25                  30

Ile Ser Arg Thr Pro Glu Val Thr Cys Val Val Val Asp Val Ser His
        35                  40                  45

Glu Asp Pro Glu Val Lys Phe Asn Trp Tyr Val Asp Gly Val Glu Val
50                  55                  60

His Asn Ala Lys Thr Lys Pro Arg Glu Glu Gln Tyr Asn Ser Thr Tyr
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Gly Ala Pro Ile
            100                 105                 110

Glu Lys Thr Ile Ser Lys Ala Lys Gly Gln Pro Arg Glu Pro Gln Val
        115                 120                 125

Cys Thr Leu Pro Pro Ser Arg Asp Glu Leu Thr Lys Asn Gln Val Ser
130                 135                 140

Leu Ser Cys Ala Val Lys Gly Phe Tyr Pro Ser Asp Ile Ala Val Glu
```

```
145             150             155             160
Trp Glu Ser Asn Gly Gln Pro Glu Asn Tyr Lys Thr Thr Pro Pro
                165                 170                 175

Val Leu Asp Ser Asp Gly Ser Phe Phe Leu Val Ser Lys Leu Thr Val
                180                 185                 190

Asp Lys Ser Arg Trp Gln Gln Gly Asn Val Phe Ser Cys Ser Val Met
                195                 200                 205

His Glu Ala Leu His Asn Arg Phe Thr Gln Lys Ser Leu Ser Leu Ser
                210                 215                 220

Pro Gly Lys
225

<210> SEQ ID NO 33
<211> LENGTH: 415
<212> TYPE: PRT
<213> ORGANISM: Artificial Sequence
<220> FEATURE:
<223> OTHER INFORMATION: Y85A, C178T, C181S, C183S, C207S IL-37 (46-218)
      fused to human Fc

<400> SEQUENCE: 33

Val His Thr Ser Pro Lys Val Lys Asn Leu Asn Pro Lys Phe Ser
1               5                   10                  15

Ile His Asp Gln Asp His Lys Val Leu Val Leu Asp Ser Gly Asn Leu
                20                  25                  30

Ile Ala Val Pro Asp Lys Asn Ala Ile Arg Pro Glu Ile Phe Phe Ala
                35                  40                  45

Leu Ala Ser Ser Leu Ser Ser Ala Ser Ala Glu Lys Gly Ser Pro Ile
50                      55                  60

Leu Leu Gly Val Ser Lys Gly Glu Phe Cys Leu Tyr Cys Asp Lys Asp
65                      70                  75                  80

Lys Gly Gln Ser His Pro Ser Leu Gln Leu Lys Lys Glu Lys Leu Met
                85                  90                  95

Lys Leu Ala Ala Gln Lys Glu Ser Ala Arg Arg Pro Phe Ile Phe Tyr
                100                 105                 110

Arg Ala Gln Val Gly Ser Trp Asn Met Leu Glu Ser Ala Ala His Pro
                115                 120                 125

Gly Trp Phe Ile Thr Thr Ser Ser Asn Ser Asn Glu Pro Val Gly Val
                130                 135                 140

Thr Asp Lys Phe Glu Asn Arg Lys His Ile Glu Phe Ser Phe Gln Pro
145                 150                 155                 160

Val Ser Lys Ala Glu Met Ser Pro Ser Glu Val Ser Asp Gly Gly Gly
                165                 170                 175

Gly Ser Gly Gly Gly Gly Ser Gly Gly Gly Gly Ser Asp Lys Thr His
                180                 185                 190

Thr Cys Pro Pro Cys Pro Ala Pro Glu Ala Ala Gly Gly Pro Ser Val
                195                 200                 205

Phe Leu Phe Pro Pro Lys Pro Lys Asp Thr Leu Met Ile Ser Arg Thr
                210                 215                 220

Pro Glu Val Thr Cys Val Val Val Asp Val Ser His Glu Asp Pro Glu
225                 230                 235                 240

Val Lys Phe Asn Trp Tyr Val Asp Gly Val Glu Val His Asn Ala Lys
                245                 250                 255

Thr Lys Pro Arg Glu Glu Gln Tyr Asn Ser Thr Tyr Arg Val Val Ser
                260                 265                 270
```

Val Leu Thr Val Leu His Gln Asp Trp Leu Asn Gly Lys Glu Tyr Lys
            275                 280                 285

Cys Lys Val Ser Asn Lys Ala Leu Gly Ala Pro Ile Glu Lys Thr Ile
        290                 295                 300

Ser Lys Ala Lys Gly Gln Pro Arg Glu Pro Gln Val Tyr Thr Leu Pro
305                 310                 315                 320

Pro Cys Arg Asp Glu Leu Thr Lys Asn Gln Val Ser Leu Trp Cys Leu
                325                 330                 335

Val Lys Gly Phe Tyr Pro Ser Asp Ile Ala Val Glu Trp Glu Ser Asn
            340                 345                 350

Gly Gln Pro Glu Asn Asn Tyr Lys Thr Thr Pro Pro Val Leu Asp Ser
        355                 360                 365

Asp Gly Ser Phe Phe Leu Tyr Ser Lys Leu Thr Val Asp Lys Ser Arg
370                 375                 380

Trp Gln Gln Gly Asn Val Phe Ser Cys Ser Val Met His Glu Ala Leu
385                 390                 395                 400

His Asn His Tyr Thr Gln Lys Ser Leu Ser Leu Ser Pro Gly Lys
            405                 410                 415

<210> SEQ ID NO 34
<211> LENGTH: 227
<212> TYPE: PRT
<213> ORGANISM: Artificial Sequence
<220> FEATURE:
<223> OTHER INFORMATION: Y85A, C169C, C181S, C183S, C207S IL-37 (46-218)
      fused to human Fc

<400> SEQUENCE: 34

Asp Lys Thr His Thr Cys Pro Pro Cys Pro Ala Pro Glu Ala Ala Gly
1               5                   10                  15

Gly Pro Ser Val Phe Leu Phe Pro Pro Lys Pro Lys Asp Thr Leu Met
            20                  25                  30

Ile Ser Arg Thr Pro Glu Val Thr Cys Val Val Val Asp Val Ser His
        35                  40                  45

Glu Asp Pro Glu Val Lys Phe Asn Trp Tyr Val Asp Gly Val Glu Val
50                  55                  60

His Asn Ala Lys Thr Lys Pro Arg Glu Glu Gln Tyr Asn Ser Thr Tyr
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Gly Ala Pro Ile
            100                 105                 110

Glu Lys Thr Ile Ser Lys Ala Lys Gly Gln Pro Arg Glu Pro Gln Val
        115                 120                 125

Cys Thr Leu Pro Pro Ser Arg Asp Glu Leu Thr Lys Asn Gln Val Ser
130                 135                 140

Leu Ser Cys Ala Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Val Ser Lys Leu Thr Val
            180                 185                 190

Asp Lys Ser Arg Trp Gln Gln Gly Asn Val Phe Ser Cys Ser Val Met
        195                 200                 205

His Glu Ala Leu His Asn Arg Phe Thr Gln Lys Ser Leu Ser Leu Ser
210                 215                 220

Pro Gly Lys
225

<210> SEQ ID NO 35
<211> LENGTH: 415
<212> TYPE: PRT
<213> ORGANISM: Artificial Sequence
<220> FEATURE:
<223> OTHER INFORMATION: Y85A, C169C, C181S, C183S, C207S IL-37 (46-218) fused to human Fc

<400> SEQUENCE: 35

Val His Thr Ser Pro Lys Val Lys Asn Leu Asn Pro Lys Lys Phe Ser
1               5                   10                  15

Ile His Asp Gln Asp His Lys Val Leu Val Leu Asp Ser Gly Asn Leu
            20                  25                  30

Ile Ala Val Pro Asp Lys Asn Ala Ile Arg Pro Glu Ile Phe Phe Ala
        35                  40                  45

Leu Ala Ser Ser Leu Ser Ser Ala Ser Ala Glu Lys Gly Ser Pro Ile
    50                  55                  60

Leu Leu Gly Val Ser Lys Gly Glu Phe Cys Leu Tyr Cys Asp Lys Asp
65                  70                  75                  80

Lys Gly Gln Ser His Pro Ser Leu Gln Leu Lys Lys Glu Lys Leu Met
                85                  90                  95

Lys Leu Ala Ala Gln Lys Glu Ser Ala Arg Arg Pro Phe Ile Phe Tyr
            100                 105                 110

Arg Ala Gln Val Gly Ser Trp Asn Met Leu Glu Cys Ala Ala His Pro
        115                 120                 125

Gly Trp Phe Ile Cys Thr Ser Ser Asn Ser Asn Glu Pro Val Gly Val
    130                 135                 140

Thr Asp Lys Phe Glu Asn Arg Lys His Ile Glu Phe Ser Phe Gln Pro
145                 150                 155                 160

Val Ser Lys Ala Glu Met Ser Pro Ser Glu Val Ser Asp Gly Gly Gly
                165                 170                 175

Gly Ser Gly Gly Gly Ser Gly Gly Gly Ser Asp Lys Thr His
            180                 185                 190

Thr Cys Pro Pro Cys Pro Ala Pro Glu Ala Ala Gly Gly Pro Ser Val
        195                 200                 205

Phe Leu Phe Pro Pro Lys Pro Lys Asp Thr Leu Met Ile Ser Arg Thr
    210                 215                 220

Pro Glu Val Thr Cys Val Val Val Asp Val Ser His Glu Asp Pro Glu
225                 230                 235                 240

Val Lys Phe Asn Trp Tyr Val Asp Gly Val Glu Val His Asn Ala Lys
                245                 250                 255

Thr Lys Pro Arg Glu Glu Gln Tyr Asn Ser Thr Tyr Arg Val Val Ser
            260                 265                 270

Val Leu Thr Val Leu His Gln Asp Trp Leu Asn Gly Lys Glu Tyr Lys
        275                 280                 285

Cys Lys Val Ser Asn Lys Ala Leu Gly Ala Pro Ile Glu Lys Thr Ile
    290                 295                 300

Ser Lys Ala Lys Gly Gln Pro Arg Glu Pro Gln Val Tyr Thr Leu Pro
305                 310                 315                 320

Pro Cys Arg Asp Glu Leu Thr Lys Asn Gln Val Ser Leu Trp Cys Leu
                325                 330                 335

Val Lys Gly Phe Tyr Pro Ser Asp Ile Ala Val Glu Trp Glu Ser Asn

```
                340            345           350
Gly Gln Pro Glu Asn Asn Tyr Lys Thr Thr Pro Pro Val Leu Asp Ser
            355               360              365

Asp Gly Ser Phe Phe Leu Tyr Ser Lys Leu Thr Val Asp Lys Ser Arg
        370              375              380

Trp Gln Gln Gly Asn Val Phe Ser Cys Ser Val Met His Glu Ala Leu
385             390             395             400

His Asn His Tyr Thr Gln Lys Ser Leu Ser Leu Ser Pro Gly Lys
                405             410              415

<210> SEQ ID NO 36
<211> LENGTH: 227
<212> TYPE: PRT
<213> ORGANISM: Artificial Sequence
<220> FEATURE:
<223> OTHER INFORMATION: Y85A, C119I, C122L, C178T, C181S, C183S, C207S
      IL-37 (46-218) fused to human Fc

<400> SEQUENCE: 36

Asp Lys Thr His Thr Cys Pro Pro Cys Pro Ala Pro Glu Ala Ala Gly
1               5                   10                  15

Gly Pro Ser Val Phe Leu Phe Pro Pro Lys Pro Lys Asp Thr Leu Met
            20                  25                  30

Ile Ser Arg Thr Pro Glu Val Thr Cys Val Val Val Asp Val Ser His
        35                  40                  45

Glu Asp Pro Glu Val Lys Phe Asn Trp Tyr Val Asp Gly Val Glu Val
    50                  55                  60

His Asn Ala Lys Thr Lys Pro Arg Glu Glu Gln Tyr Asn Ser Thr Tyr
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Gly Ala Pro Ile
            100                 105                 110

Glu Lys Thr Ile Ser Lys Ala Lys Gly Gln Pro Arg Glu Pro Gln Val
        115                 120                 125

Cys Thr Leu Pro Pro Ser Arg Asp Glu Leu Thr Lys Asn Gln Val Ser
130                 135                 140

Leu Ser Cys Ala Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Val Ser Lys Leu Thr Val
            180                 185                 190

Asp Lys Ser Arg Trp Gln Gln Gly Asn Val Phe Ser Cys Ser Val Met
        195                 200                 205

His Glu Ala Leu His Asn Arg Phe Thr Gln Lys Ser Leu Ser Leu Ser
    210                 215                 220

Pro Gly Lys
225

<210> SEQ ID NO 37
<211> LENGTH: 415
<212> TYPE: PRT
<213> ORGANISM: Artificial Sequence
<220> FEATURE:
<223> OTHER INFORMATION: Y85A, C119I, C122L, C178T, C181S, C183S, C207S
      IL-37 (46-218) fused to human Fc
```

```
<400> SEQUENCE: 37

Val His Thr Ser Pro Lys Val Lys Asn Leu Asn Pro Lys Lys Phe Ser
1               5                   10                  15

Ile His Asp Gln Asp His Lys Val Leu Val Leu Asp Ser Gly Asn Leu
            20                  25                  30

Ile Ala Val Pro Asp Lys Asn Ala Ile Arg Pro Glu Ile Phe Phe Ala
        35                  40                  45

Leu Ala Ser Ser Leu Ser Ser Ala Ser Ala Glu Lys Gly Ser Pro Ile
    50                  55                  60

Leu Leu Gly Val Ser Lys Gly Glu Phe Ile Leu Tyr Leu Asp Lys Asp
65                  70                  75                  80

Lys Gly Gln Ser His Pro Ser Leu Gln Leu Lys Lys Glu Lys Leu Met
                85                  90                  95

Lys Leu Ala Ala Gln Lys Glu Ser Ala Arg Arg Pro Phe Ile Phe Tyr
            100                 105                 110

Arg Ala Gln Val Gly Ser Trp Asn Met Leu Glu Ser Ala Ala His Pro
        115                 120                 125

Gly Trp Phe Ile Thr Thr Ser Ser Asn Ser Asn Glu Pro Val Gly Val
    130                 135                 140

Thr Asp Lys Phe Glu Asn Arg Lys His Ile Glu Phe Ser Phe Gln Pro
145                 150                 155                 160

Val Ser Lys Ala Glu Met Ser Pro Ser Glu Val Ser Asp Gly Gly Gly
                165                 170                 175

Gly Ser Gly Gly Gly Gly Ser Gly Gly Gly Gly Ser Asp Lys Thr His
            180                 185                 190

Thr Cys Pro Pro Cys Pro Ala Pro Glu Ala Ala Gly Gly Pro Ser Val
        195                 200                 205

Phe Leu Phe Pro Pro Lys Pro Lys Asp Thr Leu Met Ile Ser Arg Thr
    210                 215                 220

Pro Glu Val Thr Cys Val Val Val Asp Val Ser His Glu Asp Pro Glu
225                 230                 235                 240

Val Lys Phe Asn Trp Tyr Val Asp Gly Val Glu Val His Asn Ala Lys
                245                 250                 255

Thr Lys Pro Arg Glu Glu Gln Tyr Asn Ser Thr Tyr Arg Val Val Ser
            260                 265                 270

Val Leu Thr Val Leu His Gln Asp Trp Leu Asn Gly Lys Glu Tyr Lys
        275                 280                 285

Cys Lys Val Ser Asn Lys Ala Leu Gly Ala Pro Ile Glu Lys Thr Ile
    290                 295                 300

Ser Lys Ala Lys Gly Gln Pro Arg Glu Pro Gln Val Tyr Thr Leu Pro
305                 310                 315                 320

Pro Cys Arg Asp Glu Leu Thr Lys Asn Gln Val Ser Leu Trp Cys Leu
                325                 330                 335

Val Lys Gly Phe Tyr Pro Ser Asp Ile Ala Val Glu Trp Glu Ser Asn
            340                 345                 350

Gly Gln Pro Glu Asn Asn Tyr Lys Thr Thr Pro Pro Val Leu Asp Ser
        355                 360                 365

Asp Gly Ser Phe Phe Leu Tyr Ser Lys Leu Thr Val Asp Lys Ser Arg
    370                 375                 380

Trp Gln Gln Gly Asn Val Phe Ser Cys Ser Val Met His Glu Ala Leu
385                 390                 395                 400

His Asn His Tyr Thr Gln Lys Ser Leu Ser Leu Ser Pro Gly Lys
                405                 410                 415
```

```
<210> SEQ ID NO 38
<211> LENGTH: 227
<212> TYPE: PRT
<213> ORGANISM: Artificial Sequence
<220> FEATURE:
<223> OTHER INFORMATION: Y85A, C119I, S169C, C178R, C181S, C183S, C207S
      IL-37 (46-218) fused to human Fc

<400> SEQUENCE: 38

Asp Lys Thr His Thr Cys Pro Pro Cys Pro Ala Pro Glu Ala Ala Gly
1               5                   10                  15

Gly Pro Ser Val Phe Leu Phe Pro Pro Lys Pro Lys Asp Thr Leu Met
            20                  25                  30

Ile Ser Arg Thr Pro Glu Val Thr Cys Val Val Val Asp Val Ser His
            35                  40                  45

Glu Asp Pro Glu Val Lys Phe Asn Trp Tyr Val Asp Gly Val Glu Val
50                  55                  60

His Asn Ala Lys Thr Lys Pro Arg Glu Glu Gln Tyr Asn Ser Thr Tyr
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Gly Ala Pro Ile
            100                 105                 110

Glu Lys Thr Ile Ser Lys Ala Lys Gly Gln Pro Arg Glu Pro Gln Val
            115                 120                 125

Cys Thr Leu Pro Pro Ser Arg Asp Glu Leu Thr Lys Asn Gln Val Ser
130                 135                 140

Leu Ser Cys Ala Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Val Ser Lys Leu Thr Val
            180                 185                 190

Asp Lys Ser Arg Trp Gln Gln Gly Asn Val Phe Ser Cys Ser Val Met
            195                 200                 205

His Glu Ala Leu His Asn Arg Phe Thr Gln Lys Ser Leu Ser Leu Ser
        210                 215                 220

Pro Gly Lys
225

<210> SEQ ID NO 39
<211> LENGTH: 415
<212> TYPE: PRT
<213> ORGANISM: Artificial Sequence
<220> FEATURE:
<223> OTHER INFORMATION: Y85A, C119I, S169C, C178R, C181S, C183S, C207S
      IL-37 (46-218) fused to human Fc

<400> SEQUENCE: 39

Val His Thr Ser Pro Lys Val Lys Asn Leu Asn Pro Lys Lys Phe Ser
1               5                   10                  15

Ile His Asp Gln Asp His Lys Val Leu Val Leu Asp Ser Gly Asn Leu
            20                  25                  30

Ile Ala Val Pro Asp Lys Asn Ala Ile Arg Pro Glu Ile Phe Phe Ala
            35                  40                  45

Leu Ala Ser Ser Leu Ser Ser Ala Ser Ala Glu Lys Gly Ser Pro Ile
50                  55                  60
```

Leu Leu Gly Val Ser Lys Gly Glu Phe Ile Leu Tyr Cys Asp Lys Asp
65                  70                  75                  80

Lys Gly Gln Ser His Pro Ser Leu Gln Leu Lys Lys Glu Lys Leu Met
                85                  90                  95

Lys Leu Ala Ala Gln Lys Glu Ser Ala Arg Arg Pro Phe Ile Phe Tyr
            100                 105                 110

Arg Ala Gln Val Gly Ser Trp Asn Met Leu Glu Cys Ala Ala His Pro
        115                 120                 125

Gly Trp Phe Ile Arg Thr Ser Ser Asn Ser Asn Glu Pro Val Gly Val
    130                 135                 140

Thr Asp Lys Phe Glu Asn Arg Lys His Ile Glu Phe Ser Phe Gln Pro
145                 150                 155                 160

Val Ser Lys Ala Glu Met Ser Pro Ser Glu Val Ser Asp Gly Gly Gly
                165                 170                 175

Gly Ser Gly Gly Gly Gly Ser Gly Gly Gly Gly Ser Asp Lys Thr His
                180                 185                 190

Thr Cys Pro Pro Cys Pro Ala Pro Glu Ala Ala Gly Gly Pro Ser Val
        195                 200                 205

Phe Leu Phe Pro Pro Lys Pro Lys Asp Thr Leu Met Ile Ser Arg Thr
210                 215                 220

Pro Glu Val Thr Cys Val Val Val Asp Val Ser His Glu Asp Pro Glu
225                 230                 235                 240

Val Lys Phe Asn Trp Tyr Val Asp Gly Val Glu Val His Asn Ala Lys
                245                 250                 255

Thr Lys Pro Arg Glu Glu Gln Tyr Asn Ser Thr Tyr Arg Val Val Ser
            260                 265                 270

Val Leu Thr Val Leu His Gln Asp Trp Leu Asn Gly Lys Glu Tyr Lys
        275                 280                 285

Cys Lys Val Ser Asn Lys Ala Leu Gly Ala Pro Ile Glu Lys Thr Ile
290                 295                 300

Ser Lys Ala Lys Gly Gln Pro Arg Glu Pro Gln Val Tyr Thr Leu Pro
305                 310                 315                 320

Pro Cys Arg Asp Glu Leu Thr Lys Asn Gln Val Ser Leu Trp Cys Leu
                325                 330                 335

Val Lys Gly Phe Tyr Pro Ser Asp Ile Ala Val Glu Trp Glu Ser Asn
            340                 345                 350

Gly Gln Pro Glu Asn Asn Tyr Lys Thr Thr Pro Pro Val Leu Asp Ser
        355                 360                 365

Asp Gly Ser Phe Phe Leu Tyr Ser Lys Leu Thr Val Asp Lys Ser Arg
    370                 375                 380

Trp Gln Gln Gly Asn Val Phe Ser Cys Ser Val Met His Glu Ala Leu
385                 390                 395                 400

His Asn His Tyr Thr Gln Lys Ser Leu Ser Leu Ser Pro Gly Lys
                405                 410                 415

<210> SEQ ID NO 40
<211> LENGTH: 227
<212> TYPE: PRT
<213> ORGANISM: Artificial Sequence
<220> FEATURE:
<223> OTHER INFORMATION: C119I, S169C, C178R, C181S, C183S, C207S IL-37
      (46-218) fused to human Fc

<400> SEQUENCE: 40

Asp Lys Thr His Thr Cys Pro Pro Cys Pro Ala Pro Glu Ala Ala Gly

-continued

```
              1               5                  10                 15
            Gly Pro Ser Val Phe Leu Phe Pro Pro Lys Pro Lys Asp Thr Leu Met
                            20                  25                 30

Ile Ser Arg Thr Pro Glu Val Thr Cys Val Val Val Asp Val Ser His
                            35                  40                 45

Glu Asp Pro Glu Val Lys Phe Asn Trp Tyr Val Asp Gly Val Glu Val
                50                          55                 60

His Asn Ala Lys Thr Lys Pro Arg Glu Gln Tyr Asn Ser Thr Tyr
            65                  70                  75                 80

Arg Val Val Ser Val Leu Thr Val Leu His Gln Asp Trp Leu Asn Gly
                            85                  90                 95

Lys Glu Tyr Lys Cys Lys Val Ser Asn Lys Ala Leu Gly Ala Pro Ile
                            100                 105                110

Glu Lys Thr Ile Ser Lys Ala Lys Gly Gln Pro Arg Glu Pro Gln Val
                            115                 120                125

Cys Thr Leu Pro Pro Ser Arg Asp Glu Leu Thr Lys Asn Gln Val Ser
            130                 135                 140

Leu Ser Cys Ala Val Lys Gly Phe Tyr Pro Ser Asp Ile Ala Val Glu
            145                 150                 155                160

Trp Glu Ser Asn Gly Gln Pro Glu Asn Asn Tyr Lys Thr Thr Pro Pro
                            165                 170                175

Val Leu Asp Ser Asp Gly Ser Phe Phe Leu Val Ser Lys Leu Thr Val
                            180                 185                190

Asp Lys Ser Arg Trp Gln Gln Gly Asn Val Phe Ser Cys Ser Val Met
                            195                 200                205

His Glu Ala Leu His Asn Arg Phe Thr Gln Lys Ser Leu Ser Leu Ser
                210                 215                 220

Pro Gly Lys
            225

<210> SEQ ID NO 41
            <211> LENGTH: 415
            <212> TYPE: PRT
            <213> ORGANISM: Artificial Sequence
            <220> FEATURE:
            <223> OTHER INFORMATION: C119I, S169C, C178R, C181S, C183S, C207S IL-37
                  (46-218) fused to human Fc

<400> SEQUENCE: 41

Val His Thr Ser Pro Lys Val Lys Asn Leu Asn Pro Lys Lys Phe Ser
            1               5                  10                 15

Ile His Asp Gln Asp His Lys Val Leu Val Leu Asp Ser Gly Asn Leu
                            20                  25                 30

Ile Ala Val Pro Asp Lys Asn Tyr Ile Arg Pro Glu Ile Phe Phe Ala
                            35                  40                 45

Leu Ala Ser Ser Leu Ser Ser Ala Ser Ala Glu Lys Gly Ser Pro Ile
                50                          55                 60

Leu Leu Gly Val Ser Lys Gly Glu Phe Ile Leu Tyr Cys Asp Lys Asp
            65                  70                  75                 80

Lys Gly Gln Ser His Pro Ser Leu Gln Leu Lys Lys Glu Lys Leu Met
                            85                  90                 95

Lys Leu Ala Ala Gln Lys Glu Ser Ala Arg Arg Pro Phe Ile Phe Tyr
                            100                 105                110

Arg Ala Gln Val Gly Ser Trp Asn Met Leu Glu Cys Ala Ala His Pro
                            115                 120                125
```

```
Gly Trp Phe Ile Arg Thr Ser Ser Asn Ser Asn Glu Pro Val Gly Val
130                 135                 140

Thr Asp Lys Phe Glu Asn Arg Lys His Ile Glu Phe Ser Phe Gln Pro
145                 150                 155                 160

Val Ser Lys Ala Glu Met Ser Pro Ser Glu Val Ser Asp Gly Gly Gly
            165                 170                 175

Gly Ser Gly Gly Gly Ser Gly Gly Gly Ser Asp Lys Thr His
            180                 185                 190

Thr Cys Pro Pro Cys Pro Ala Pro Glu Ala Ala Gly Gly Pro Ser Val
            195                 200                 205

Phe Leu Phe Pro Pro Lys Pro Lys Asp Thr Leu Met Ile Ser Arg Thr
210                 215                 220

Pro Glu Val Thr Cys Val Val Val Asp Val Ser His Glu Asp Pro Glu
225                 230                 235                 240

Val Lys Phe Asn Trp Tyr Val Asp Gly Val Glu Val His Asn Ala Lys
            245                 250                 255

Thr Lys Pro Arg Glu Glu Gln Tyr Asn Ser Thr Tyr Arg Val Val Ser
            260                 265                 270

Val Leu Thr Val Leu His Gln Asp Trp Leu Asn Gly Lys Glu Tyr Lys
            275                 280                 285

Cys Lys Val Ser Asn Lys Ala Leu Gly Ala Pro Ile Glu Lys Thr Ile
290                 295                 300

Ser Lys Ala Lys Gly Gln Pro Arg Glu Pro Gln Val Tyr Thr Leu Pro
305                 310                 315                 320

Pro Cys Arg Asp Glu Leu Thr Lys Asn Gln Val Ser Leu Trp Cys Leu
            325                 330                 335

Val Lys Gly Phe Tyr Pro Ser Asp Ile Ala Val Glu Trp Glu Ser Asn
            340                 345                 350

Gly Gln Pro Glu Asn Asn Tyr Lys Thr Thr Pro Pro Val Leu Asp Ser
            355                 360                 365

Asp Gly Ser Phe Phe Leu Tyr Ser Lys Leu Thr Val Asp Lys Ser Arg
            370                 375                 380

Trp Gln Gln Gly Asn Val Phe Ser Cys Ser Val Met His Glu Ala Leu
385                 390                 395                 400

His Asn His Tyr Thr Gln Lys Ser Leu Ser Leu Ser Pro Gly Lys
            405                 410                 415

<210> SEQ ID NO 42
<211> LENGTH: 4
<212> TYPE: PRT
<213> ORGANISM: Artificial Sequence
<220> FEATURE:
<223> OTHER INFORMATION: peptide linker to IL-37 polypeptide

<400> SEQUENCE: 42

Gly Gly Gly Ser
1

<210> SEQ ID NO 43
<211> LENGTH: 5
<212> TYPE: PRT
<213> ORGANISM: Artificial Sequence
<220> FEATURE:
<223> OTHER INFORMATION: peptide linker to IL-37 polypeptide

<400> SEQUENCE: 43

Gly Gly Gly Gly Ser
1               5
```

```
<210> SEQ ID NO 44
<211> LENGTH: 9
<212> TYPE: PRT
<213> ORGANISM: Artificial Sequence
<220> FEATURE:
<223> OTHER INFORMATION: SS-linked peptide (Cys54)

<400> SEQUENCE: 44

Gly Glu Phe Leu Leu Tyr Cys Asp Lys
1               5

<210> SEQ ID NO 45
<211> LENGTH: 20
<212> TYPE: PRT
<213> ORGANISM: Artificial Sequence
<220> FEATURE:
<223> OTHER INFORMATION: SS-linked peptide (Cys94)

<400> SEQUENCE: 45

Ala Gln Val Gly Ser Trp Asn Met Leu Glu Cys Ala Ala His Pro Gly
1               5                   10                  15

Trp Phe Ile Arg
            20
```